US006286482B1

(12) United States Patent
Flynn et al.

(10) Patent No.: US 6,286,482 B1
(45) Date of Patent: *Sep. 11, 2001

(54) PREMIXED CHARGE COMPRESSION IGNITION ENGINE WITH OPTIMAL COMBUSTION CONTROL

(75) Inventors: Patrick F. Flynn; Gary L. Hunter; Axel O. zur Loye; Omowoleoia C. Akinyemi; Russ P. Durrett, all of Columbus; Greg A. Moore, Grammer; Jackie M. Mudd, Columbus; George G. Muntean, Columbus; Julie A. Wagner, Columbus; John F. Wright, Columbus, all of IN (US)

(73) Assignee: Cummins Engine Company, Inc., Columbus, IN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 117 days.

(21) Appl. No.: 08/916,437

(22) Filed: Aug. 22, 1997

Related U.S. Application Data

(60) Provisional application No. 60/024,515, filed on Aug. 23, 1996.

(51) Int. Cl.$^7$ ................. F02M 7/00; F02P 5/14; G01M 15/00
(52) U.S. Cl. ............... 123/435; 128/25 C; 128/295; 128/480; 128/436; 701/101
(58) Field of Search ................. 123/435, 436, 123/480, 443, 492, 491, 406.42, 406.43, 406.22, 25 C, 304, 294, 295; 701/101, 102, 103, 111, 115

(56) References Cited

U.S. PATENT DOCUMENTS 608,845   8/1898   Diesel .................. 123/27 R (List continued on next page.)

FOREIGN PATENT DOCUMENTS 64477   9/1892   (DE) .

(List continued on next page.)

OTHER PUBLICATIONS

"Small DI Diesel Engine Development at Nissan," *Engine Technology Progress in Japan—Compression–Ignition Engine Technology*, Chapter 1, Apr. 1998, pp. 1–11.

(List continued on next page.)

Primary Examiner—Willis R. Wolfe
Assistant Examiner—Hieu T. Vo
(74) Attorney, Agent, or Firm—Nixon Peabody LLP; Charles M. Leedom, Jr.; Tim L. Brackett, Jr.

(57) ABSTRACT

A premixed charge compression ignition engine, and a control system, is provided which effectively initiates combustion by compression ignition and maintains stable combustion while achieving extremely low oxides of nitrogen emissions, good overall efficiency and acceptable combustion noise and cylinder pressures. The present engine and control system effectively controls the combustion history, that is, the time at which combustion occurs, the rate of combustion, the duration of combustion and/or the completeness of combustion, by controlling the operation of certain control variables providing temperature control, pressure control, control of the mixture's autoignition properties and equivalence ratio control. The combustion control system provides active feedback control of the combustion event and includes a sensor, e.g. pressure sensor, for detecting an engine operating condition indicative of the combustion history, e.g. the start of combustion, and generating an associated engine operating condition signal. A processor receives the signal and generates control signals based on the engine operating condition signal for controlling various engine components to control the temperature, pressure, equivalence ratio and\or autoignition properties so as to variably control the combustion history of future combustion events to achieve stable, low emission combustion in each cylinder and combustion balancing between the cylinders.

156 Claims, 36 Drawing Sheets

U.S. PATENT DOCUMENTS

| | | | |
|---|---|---|---|
| 673,160 | 4/1901 | Diesel . | |
| 1,128,463 | 2/1915 | Lake | 123/27 R |
| 1,132,581 | 3/1915 | Hein | 123/27 R |
| 1,707,005 | 3/1929 | Hall | 123/47 R |
| 2,146,265 | 2/1939 | Moore, Jr. | 123/294 |
| 2,183,674 | 12/1939 | Erren | 123/27 GE |
| 2,199,625 | 5/1940 | Fiala-Fernbrugg | 123/51 AA |
| 2,206,571 | 7/1940 | Kinslow | 123/65 VB |
| 2,400,219 | 5/1946 | Barnaby et al. | 123/1 AR |
| 2,400,247 | 5/1946 | Miller et al. | 123/299 |
| 2,612,880 | 10/1952 | Schowalter | 123/27 GE |
| 2,728,643 | 12/1955 | Vaughn | 44/380 |
| 2,728,644 | 12/1955 | Vaughn | 44/342 |
| 2,728,646 | 12/1955 | Vaughn | 44/380 |
| 2,728,647 | 12/1955 | Vaughn | 44/381 |
| 2,767,691 | 10/1956 | Mengelkamp et al. | 123/1 R |
| 2,896,596 | 7/1959 | Abraham | 123/51 R |
| 2,909,159 | 10/1959 | Britton | 123/1 R |
| 2,977,942 | 4/1961 | Reynolds | 123/301 |
| 2,986,129 | 5/1961 | Henry-Biabaud | 123/275 |
| 3,230,939 | 1/1966 | Goossak | 123/259 |
| 3,975,900 | 8/1976 | Pfefferle | 60/39.03 |
| 4,010,611 | 3/1977 | Zachery | 123/51 A |
| 4,030,455 | 6/1977 | Van Eeck | 123/25 E |
| 4,078,377 | 3/1978 | Owens et al. | 60/39.23 |
| 4,091,772 | 5/1978 | Heater et al. | 123/575 |
| 4,094,142 | 6/1978 | Pfefferle | 60/39.03 |
| 4,112,826 | 9/1978 | Cataldo | 92/13.1 |
| 4,179,881 | 12/1979 | Faucher et al. | 60/737 |
| 4,185,595 | 1/1980 | Muhlberg | 123/3 |
| 4,197,701 | 4/1980 | Boyum | 60/39.06 |
| 4,218,992 | 8/1980 | Latsch et al. | 123/263 |
| 4,246,757 | 1/1981 | Heberling | 60/737 |
| 4,271,674 | 6/1981 | Marshall et al. | 60/737 |
| 4,351,298 | 9/1982 | Franke | 123/25 E |
| 4,401,072 | 8/1983 | Ito et al. | 123/292 |
| 4,414,940 | 11/1983 | Loyd | 123/299 |
| 4,416,229 | 11/1983 | Wood | 123/304 |
| 4,451,367 | 5/1984 | Ruggeri | 201/207 |
| 4,499,872 | 2/1985 | Ward et al. | 123/344 |
| 4,499,885 | 2/1985 | Weissenbach et al. | 123/525 |
| 4,520,765 | 6/1985 | Gerace | 123/27 R |
| 4,520,766 | 6/1985 | Akeroyd | 123/27 GE |
| 4,524,730 | 6/1985 | Doell et al. | 123/27 GE |
| 4,527,516 | 7/1985 | Foster | 123/27 GE |
| 4,543,917 | 10/1985 | Lapeyre | 123/51 B |
| 4,572,133 | 2/1986 | Bago | 123/431 |
| 4,603,674 | 8/1986 | Tanaka | 123/575 |
| 4,621,603 * | 11/1986 | Matekunas | 123/435 |
| 4,622,939 * | 11/1986 | Matekunas | 123/435 |
| 4,624,229 * | 11/1986 | Matekunas | 123/435 |
| 4,635,590 | 1/1987 | Gerace | 123/27 R |
| 4,641,617 | 2/1987 | Aoyama et al. | 123/262 |
| 4,694,802 | 9/1987 | Lowi, Jr. | 123/431 |
| 4,708,094 | 11/1987 | Helmich et al. | 123/27 GE |
| 4,754,733 | 7/1988 | Steiger | 123/299 |
| 4,768,481 | 9/1988 | Wood | 123/254 |
| 4,779,587 | 10/1988 | Schweinzer et al. | 123/276 |
| 4,831,993 | 5/1989 | Kelgard | 123/525 |
| 4,838,213 | 6/1989 | Gerace | 123/27 R |
| 4,854,290 | 8/1989 | Richardt | 123/556 |
| 4,856,484 | 8/1989 | Wilson et al. | 123/525 |
| 4,920,937 | 5/1990 | Sasaki et al. | 123/305 |
| 4,924,828 | 5/1990 | Oppenheim | 123/299 |
| 4,932,379 | 6/1990 | Tang et al. | 123/436 |
| 4,955,328 | 9/1990 | Sobotowski | 123/51 R |
| 4,966,103 | 10/1990 | Schaub et al. | 123/276 |
| 5,012,777 | 5/1991 | Baker et al. | 123/254 |
| 5,035,206 | 7/1991 | Welch et al. | 123/27 GE |
| 5,050,550 | 9/1991 | Gao | 123/275 |
| 5,050,571 | 9/1991 | Daniels | 123/557 |
| 5,060,610 | 10/1991 | Paro | 123/300 |
| 5,063,890 | 11/1991 | Hironaka | 123/145 A |
| 5,069,183 | 12/1991 | Nagano et al. | 123/406.22 |
| 5,092,305 | 3/1992 | King | 123/575 |
| 5,099,429 * | 3/1992 | Onari et al. | 123/492 |
| 5,119,780 | 6/1992 | Ariga | 123/300 |
| 5,123,397 * | 6/1992 | Richeson | 123/443 |
| 5,127,378 | 7/1992 | Ito | 123/300 |
| 5,139,002 | 8/1992 | Lynch et al. | 123/575 |
| 5,148,776 | 9/1992 | Connor | 123/255 |
| 5,156,002 | 10/1992 | Mowill | 60/738 |
| 5,170,759 | 12/1992 | Ito | 123/276 |
| 5,203,288 | 4/1993 | Melchior et al. | 123/65 VD |
| 5,205,254 | 4/1993 | Ito et al. | 123/305 |
| 5,211,145 | 5/1993 | Ichikawa et al. | 123/295 |
| 5,213,067 | 5/1993 | Kramer | 123/51 BA |
| 5,224,457 | 7/1993 | Arsenault et al. | 123/526 |
| 5,237,812 | 8/1993 | Mumford | 60/39.06 |
| 5,243,932 | 9/1993 | Herrmann | 123/25 E |
| 5,265,562 | 11/1993 | Kruse | 123/27 R |
| 5,271,357 | 12/1993 | Hsu et al. | 123/23 |
| 5,274,559 * | 12/1993 | Takahashi et al. | 123/480 |
| 5,284,116 * | 2/1994 | Richeson, Jr. | 701/103 |
| 5,291,865 | 3/1994 | Sasaki | 123/298 |
| 5,315,973 | 5/1994 | Hill et al. | 123/304 |
| 5,365,902 | 11/1994 | Hsu | 123/299 |
| 5,398,653 | 3/1995 | Merritt | 123/292 |
| 5,425,233 | 6/1995 | Ma et al. | 60/274 |
| 5,450,829 | 9/1995 | Beck | 123/435 |
| 5,457,955 | 10/1995 | Costello | 60/274 |
| 5,458,102 | 10/1995 | Tomisawa et al. | 123/435 |
| 5,467,757 | 11/1995 | Yanagihara et al. | 123/305 |
| 5,476,072 | 12/1995 | Inventor | 123/48 AA |
| 5,515,829 | 5/1996 | Wear et al. | 123/446 |
| 5,520,161 | 5/1996 | Klopp | 123/676 |
| 5,526,786 | 6/1996 | Beck et al. | 123/357 |
| 5,535,708 | 7/1996 | Valentine | 123/25 C |
| 5,535,716 | 7/1996 | Sato et al. | 123/279 |
| 5,549,087 | 8/1996 | Gray, Jr. et al. | 123/254 |
| 5,555,868 | 9/1996 | Neumann | 123/275 |
| 5,623,412 | 4/1997 | Masson et al. | 701/102 |
| 5,636,614 | 6/1997 | Morikawa | 123/435 |
| 5,682,856 | 11/1997 | Tomisawa et al. | 123/406.22 |
| 5,692,481 | 12/1997 | Miller | 123/539 |
| 5,713,328 | 2/1998 | Anderson et al. | 123/299 |
| 5,806,305 | 9/1998 | Miller et al. | 60/274 |
| 5,832,880 | 11/1998 | Dickey | 123/25 C |
| 5,863,413 | 1/1999 | Caren et al. | 205/688 |
| 5,875,743 | 3/1999 | Dickey | 123/25 C |
| 5,890,459 | 4/1999 | Hedrick et al. | 123/27 GE |

FOREIGN PATENT DOCUMENTS

| | | |
|---|---|---|
| 287366 | 9/1915 | (DE) . |
| 306418 | 10/1920 | (DE) . |
| 326994 | 10/1920 | (DE) . |
| 332524 | 1/1921 | (DE) . |
| 481 070 | 8/1929 | (DE) . |
| 820 226 | 11/1951 | (DE) . |
| 823 233 | 12/1951 | (DE) . |
| 864 476 | 1/1953 | (DE) . |
| 895 393 | 11/1953 | (DE) . |
| 898 094 | 11/1953 | (DE) . |
| 934 798 | 11/1955 | (DE) . |
| 1 020 484 | 12/1957 | (DE) . |
| 2450953 | 12/1975 | (DE) . |
| 3032656 | 4/1982 | (DE) . |
| 195 19 663 | 5/1996 | (DE) . |
| 19519663 | 5/1996 | (DE) . |
| 196 21 297 | 12/1997 | (DE) . |
| 198 04 988 | 6/1999 | (DE) . |

| | | |
|---|---|---|
| 198 04 983 | 8/1999 | (DE). |
| 198 10 935 | 9/1999 | (DE). |
| 198 18 596 | 11/1999 | (DE). |
| 0195736 | 9/1986 | (EP). |
| 0459429 | 12/1991 | (EP). |
| 0747636 | 12/1996 | (EP). |
| 0810405 | 12/1997 | (EP). |
| 903454 | 10/1945 | (FR). |
| 1137667 | 6/1957 | (FR). |
| 2679604 | 1/1993 | (FR). |
| 144302 | 12/1921 | (GB). |
| 334018 | 8/1930 | (GB). |
| 372534 | 5/1932 | (GB). |
| 2008191 | 5/1979 | (GB). |
| 2277776 | 11/1994 | (GB). |
| 2315297 | 1/1998 | (GB). |
| 9-151771 | 6/1997 | (JP). |
| 9-228882 | 9/1997 | (JP). |
| 9-324675 | 12/1997 | (JP). |
| 38145 | 5/1936 | (NL). |
| 75804 | 9/1954 | (NL). |
| 2066381 | 9/1996 | (RU). |

OTHER PUBLICATIONS

Bob Brooks, "EPA 'Secret' Engine Development Explained," *Ward's Engine and Vehicle Technology Update*, Aug. 1, 1999.

Shuji Kimura et al., "A New Combustion Technology Concept for Small DI Diesel Engines—$6^{th}$ Report, Possibility of Obtaining Ultra–Clean Emissions and High Thermal Efficiency Simultaneously," 1999, pp. 13–16.

Eiju Aiyoshizawa et al., "Combustion Characteristics of a Small DI Diesel Engine," 1999, pp. 17–20.

Yasushi Mase et al., "Nissan's New Multivalve DI Diesel Engine Series," SAE Technical Paper No. 981039, (1998).

Eiji Aiyoshizawa et al., "Development of a Clean Small DI Diesel Engine with MK Concept," JSAE, vol. 52, No. 7, 1998, pp. 56–62.

Shuji Kimura et al., "A New Concept of Combustion Technology in Small DI Diesel Engines—$4^{th}$ Report: The Effects of Fuel Injection Rates on MK Compustion," 1997, pp. 45–48.

Steven W. Beyerlein et al., "A Lean–Burn Catalytic Engine," SAE Technical Paper No. 880574, (1988).

Józef Jarosiński et al., "Investigation of a Lean–Burn Piston Engine with Catalytic Prechamber," SAE Technical Paper No. 960083, Feb. 26–29, 1996.

"Swirl Optimization for Low Emissions and a Variable Swirl Intake Port," *Engine Technology Progress in Japan—Compression–Ignition Engine Technology*, Chapter 2, Apr. 1997, pp. 13–23.

Unknown Japanese Article, 1997, vol. 100, No. 947, pp. 97–98.

Quentin A. Baker, "Expanding Diesel Engine Cetane Limits through Staged Injection," SAE Technical Paper No. 830246, (1983).

Mark A. Cherry et al., "Extending Lean Limit with Mass-Timed Compression Ignition Using a Catalytic Plasma Torch," SAE Technical Paper No. 921556, Aug. 10–13, 1992.

Yoshinaka Takeda et al., "Emission Characteristics of Premixed Lean Diesel Combustion with Extremely Early Staged Fuel Injection," SAE Technical Paper No. 961163, May 6–8, 1996.

Mark A. Gottschalk, "Catalytic Ignition Replaces Spark Plugs," *Design News*, May 22, 1995.

Portions of Honda CR250AR Manual.

J. Ray Smith et al., "Homogeneous Diesel Combustion," Jun. 18, 1996, pp. 1–4.

Shigeru Onishi et al., "Active Thermo–Atmosphere Combustion (ATAC)—A New Combustion Process for Internal Combustion Engines," SAE Technical Paper No. 790501, Feb. 26–Mar. 2, 1979.

Masaaki Noguchi et al., "A Study on Gasoline Engine Combustion by Observation of Intermediate Reactive Products during Combustion," SAE Technical Paper No. 790840, Sep. 10–13, 1979.

J.A. Harrington, "Water Addition to Gasoline—Effect on Combustion, Emissions, Performance, and Knock," SAE Technical Paper No. 820314 (1982).

Paul M. Najt et al., "Compression–Ignited Homogeneous Charge Combustion," SAE Technical Paper No. 830264 (1983).

R.H. Thring, "Homogeneous–Charge Compression–Ignition (HCCI) Engines," SAE Technical Paper No. 892968, (1989).

Taro Aoyama et al., "An Experimental Study on Premixed–Charge Compression Ignition Gasoline Engine," SAE Technical Paper No. 960081, Feb. 26–29, 1996.

Yoichi Ishibashi et al., "Improving the Exhaust Emissions of Two–Stroke Engines by Applying the Activated Radical Combustion," SAE Technical Paper No. 960742, Feb. 26–29, 1996.

"Lohmann Bicycle Motor," Product Brochure/Operating Directions, Oct. 1951 Edition.

Jack Yamaguchi, "Honda Readies Activated Radical Combustion Two–Stroke Engine for Production Motorcycle," *Automotive Engineering*, Jan. 1977, 90–92.

Al Demmler, "Diesel Emissions Reduced," *Automotive Engineering International*, May 1998, 63–64.

"EXP–2," *Cycle World*, 70.

Kevin Cameron, "Big Red's Green Machine," *Cycle World*, 28.

"Quick Ride: Honda CRM250 Evolution of EXP," *Cycle World*, 30.

Eric Murray, "Quick Take: Honda EXP–2," http://cgi.motorcycle.com/mo/mchonda/exp2.html.

Ely Kumli, "Honda EXP–2," http://ftp.motorcycle.com/mo/mchonda/exp2_tech.html.

Kit Palmer, "First Look: Honda's EXP–2," http://www-.cyclenews.com/cycle/archives/exp2.html.

Steven Ashley, "A Radical Way to Burn," *Mechanical Engineering*, Aug. 1996, 64–67.

Don Williams, "Editor's EXP–2 Impression: Riding the $500,000 Honda," 14–15.

Jesse Snyder, "Hydrid 2–Stroke Design Advancing at Honda," *Ward's Automotive Weekly*, Apr. 15, 1996.

Shi–wai S. Cheng et al., "Effect of Engine Operating Parameters on Engine Combustion Chamber Deposits," SAE Technical Paper No. 902108, (1990).

Rob H. Thring et al., "The Stratified Charge Glowplug Ignition (SCGI) Engine with Natural Gas Fuel," SAE Technical Paper No. 911767, (1991).

Song–Charng Kong et al., "Modeling Combustion in Compression Ignition Homogeneous Charge Engines," SAE Technical Paper No. 920512, (1992).

Norimasa Iida, "Combustion Analysis of Methanol–Fueled Active Thermo–Atmosphere Combustion (ATAC) Engine Using a Spectroscopic Observation," SAE Technical Paper No. 940684, Feb. 28–Mar. 3, 1994.

Jiang Lu et al., "A Preliminary Study of Chemically Enhanced Autoignition in an Internal Combustion Engine," SAE Technical Paper No. 940758, Feb. 28–Mar. 3, 1994.

Donald J. Nakic et al., "Effect of Elevated Piston Temperature on Combustion Chamber Deposit Growth," SAE Technical Paper No. 940948, Feb. 28–Mar. 3, 1994.

Jeffrey D. Naber et al., "Natural Gas Autoignition Under Diesel Conditions: Experiments and Chemical Kinetic Modeling," SAE Technical Paper No. 942034, Oct. 17–20, 1994.

G.K. Fraidl et al., "Gasoline Direct Injection: Actual Trends and Future Strategies for Injection and Combustion Systems," SAE Technical Paper No. 960465, Feb. 26–29, 1996.

Thomas W. Ryan et al., "Homogeneous Charge Compression Ignition of Diesel Fuel," SAE Technical Paper No. 961160, May 6–8, 1996.

N.E. Carabateas et al., "The Effect of Injector and Intake Port Design on In–Cylinder Fuel Droplet Distribution, Airflow and Lean Burn Performance for a Honda VTEC–E Engine," SAE Technical Paper No. 961923, Oct. 14–17, 1996.

Simon Ho et al., "A Comprehensive Knock Model for Application in Gas Engines," SAE Technical Paper No. 961938, Oct. 14–17, 1996.

Greg R. Pucher et al., "Alternative Combustion Systems for Piston Engines Involving Homogeneous Charge Compression Ignition Concepts—A Review of Studies Using Methanol, Gasoline and Diesel Fuel," SAE Technical Paper No. 962063, Oct. 14–17, 1996.

Hisakazu Suzuki et al., "Exhaust Purification of Diesel Engines by Homogeneous Charge with Compression Ignition Part 1: Experimental Investigation of Combustion and Exhaust Emission Behavior Under Pre–Mixed Homogeneous Charge Compression Ignition Method," SAE Technical Paper No. 970313, Feb. 24–27, 1997.

Hajime Ishii et al., "Exhaust Purification of Diesel Engines by Homogeneous Charge with Compression Ignition Part 2: Analysis of Combustion Phenomena and NOx Formation by Numerical Simulation with Experiment," SAE Technical Paper No. 970315, Feb. 24–27, 1997.

Terutoshi Tomoda et al., "Development of Direct Injection Gasoline Engine—Study of Stratified Mixture Formation," SAE Technical Paper No. 970539, Feb. 24–27, 1997.

Jun Harada et al., "Development of Direct Injection Gasoline Engine," SAE Technical Paper No. 970540, Feb. 24–27, 1997.

Y. Iwamoto et al., "Development of Gasoline Direct Injection Engine," SAE Technical Paper No. 970541, Feb. 24–27, 1997.

Haruyuki Yokota et al., "A New Concept for Low Emission Diesel Combustion," SAE Technical Paper No. 970891, Feb. 24–27, 1997.

U. Pfahl et al., "Self–Ignition of Diesel–Engine Model Fuels At High Pressures," SAE Technical Paper No. 970897, Feb. 24–27, 1997.

Keiichi Nakagome et al., "Combustion and Emission Characteristics of Premixed Lean Diesel Combustion Engine," SAE Technical Paper No. 970898, Feb. 24–27, 1997.

Simon Y. Ho et al., "A Hydrocarbon Autoignition Model for Knocking Combustion in SI Engines," SAE Technical Paper No. 971672, May 5–8, 1997.

Allen W. Gray et al., "Homogeneous Charge Compression Ignition (HCCI) of Diesel Fuel," SAE Technical Paper No. 971676, May 5–8, 1997.

Norimasa Iida, "Alternative Fuels and Homogeneous Charge Compression Ignition Combustion Technology," SAE Technical Paper No. 972071, (1997).

Magnus Christensen et al., "Homogeneous Charge Compression Ignition (HCCI) Using Isooctane, Ethanol and Natural Gas—A Comparison with Spark Ignition Operation," SAE Technical Paper No. 972874, Oct. 13–16, 1997.

Hisakazu Suzuki et al., "Combustion Control Method of Homogeneous Charge Diesel Engines," SAE Technical Paper No. 980509, Feb. 23–26, 1998.

Toshiyuki Seko et al., "Methanol Lean Burn in an Auto–Ignition DI Engine," SAE Technical Paper No. 980531, Feb. 23–26, 1998.

Yoichi Ishibashi et al., "A Low Pressure Pneumatic Direct Injection Two–Stroke Engine by Activated Radical Combustion Concept," SAE Technical Paper No. 980757, Feb. 23–26, 1998.

Magnus Christensen et al., "Supercharged Homogeneous Charge Compression Ignition," SAE Technical Paper No. 980787, Feb. 23–26, 1998.

P.D. Ronney et al., "Throttleless Premixed–Charge Engines: Concept and Experiment," Part D Journal of Automobile Engineering, Proc. Instn. Mech. Engrs., vol. 208, 1994, 13–24.

Norimasa Iida et al., "Self–Ignition and Combustion Stability in a Methanol Fueled Low Heat Rejection Ceramic ATAC Engine—Analysis of Cyclic Variation at High Wall Temperatures and Lean Burn Operation," *JSAE Review*, vol. 18, 1997, 233–240.

J. Ray Smith et al., "Modeling of Homogeneous Charge Compression Ignition (HCCI) of Methane," UCR-L–JC–127387, ASME Internal Combustion Engine 1997 Fall Conference, May 6, 1997.

Hajime Oguma et al., "A Study on Adaptability of Alternative Fuels for Lean Burn Two–Stroke ATAC Engine."

Von Max Stockinger et al., "Versuche an einem gemischansaugenden Verbrennungsmotor mit Selbstzündung," Motortechnische Zeitschrift, 53 (1992) 80–85.

Haruyuki Yokota et al., "A New Concept for Low Emission Diesel Combustion," JASE Automobile Technology, vol. 51, No. 9, 1997, 47–52.

Hiromichi Yanagihara et al., "Simultaneous Reduction of $NO_x$ and Soot in Diesel Engines Using a New Combustion System (UNIBUS—Uniform Bulky Combustion System)," Proc. of the 17th International Viena Motor Symposium, 1997.

Masahiro Furutani et al., "A New Concept of Ultra–Lean Premixed Compression–Ignition Engine," Document No. 958614—Document Summary with English Abstract, Jul. 1995.

"Clean Heavy–Duty Diesel Engine–II Program—Homogeneous Charge Compression Ignition (HCCI) of Diesel Fuel," SWRI Project No. 03–7479, Southwest Research Institute, Nov. 1997.

Patent Abstracts of Japan, No. 08312394, Nov. 26, 1996.

Patent Abstracts of Japan, No. 55029011, Mar. 1, 1980.

* cited by examiner

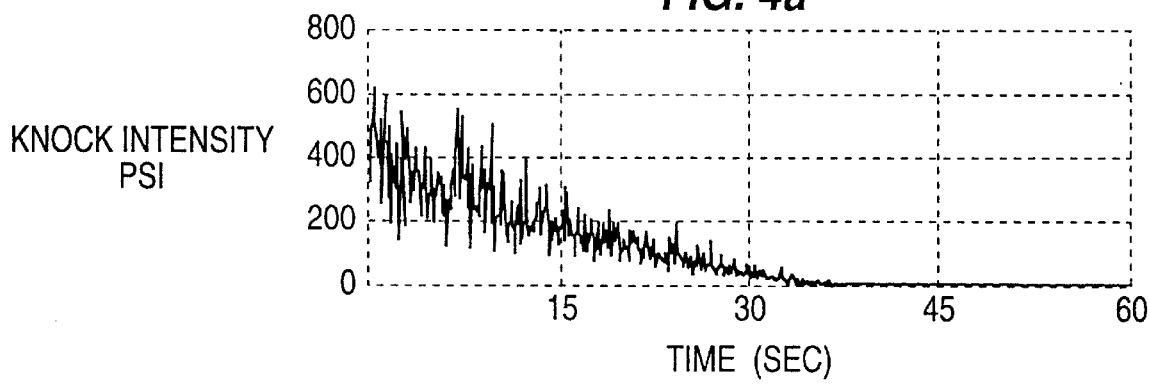
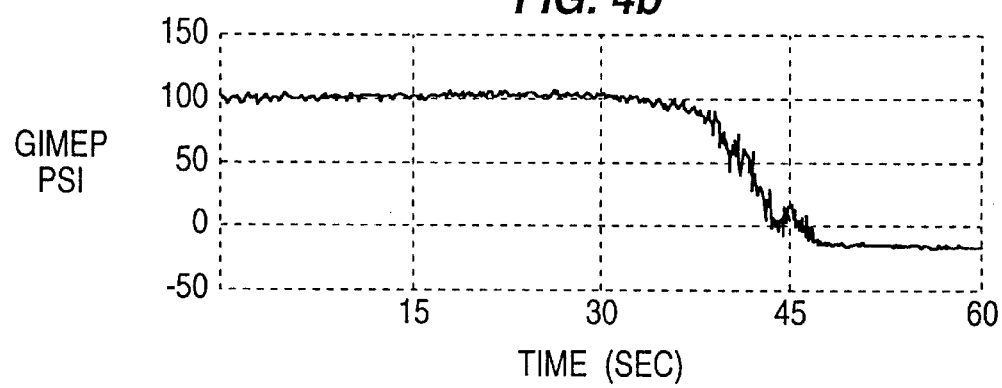
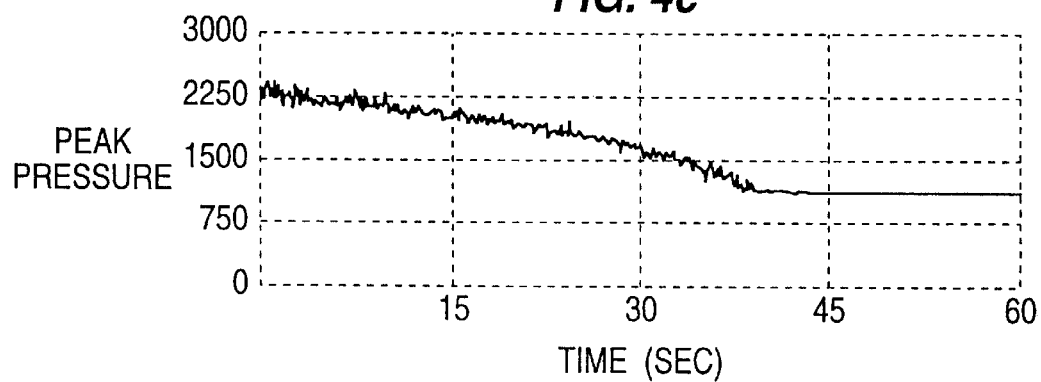

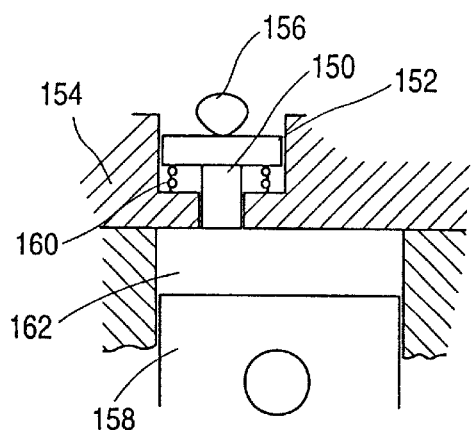
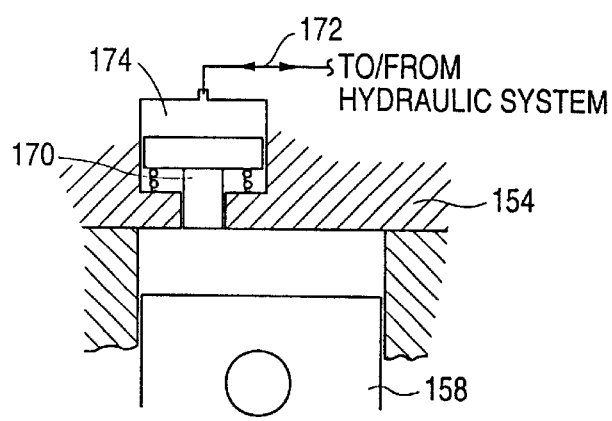
FIG. 22a  FIG. 22b
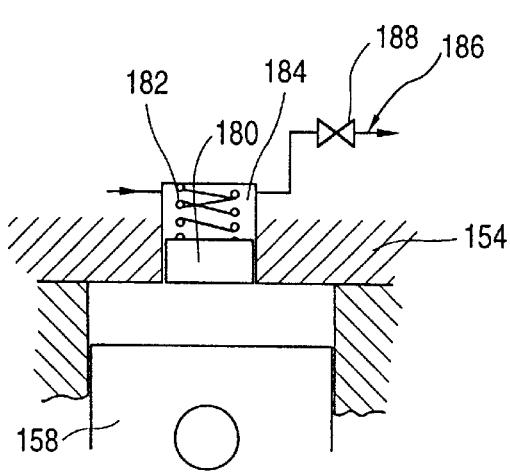
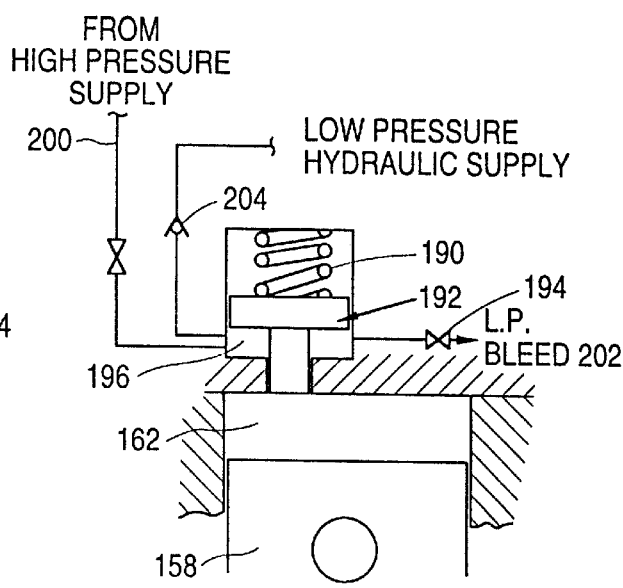
FIG. 22c  FIG. 22d

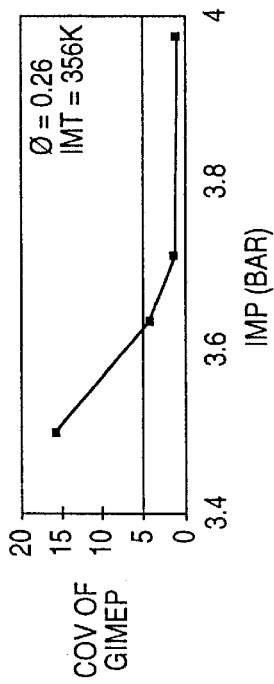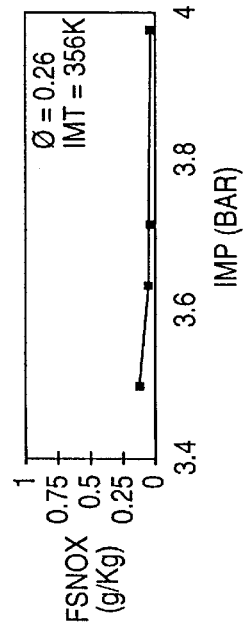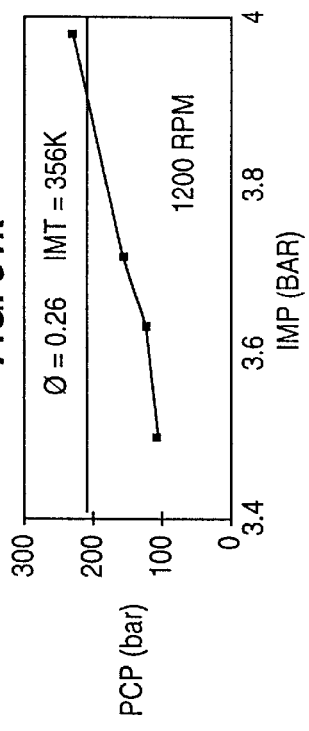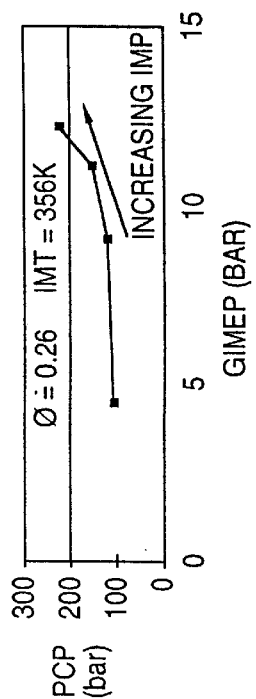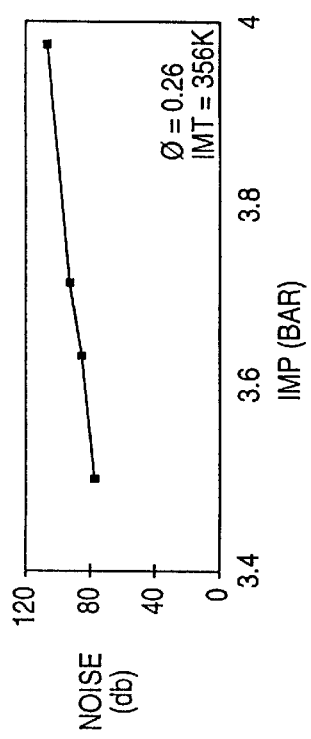

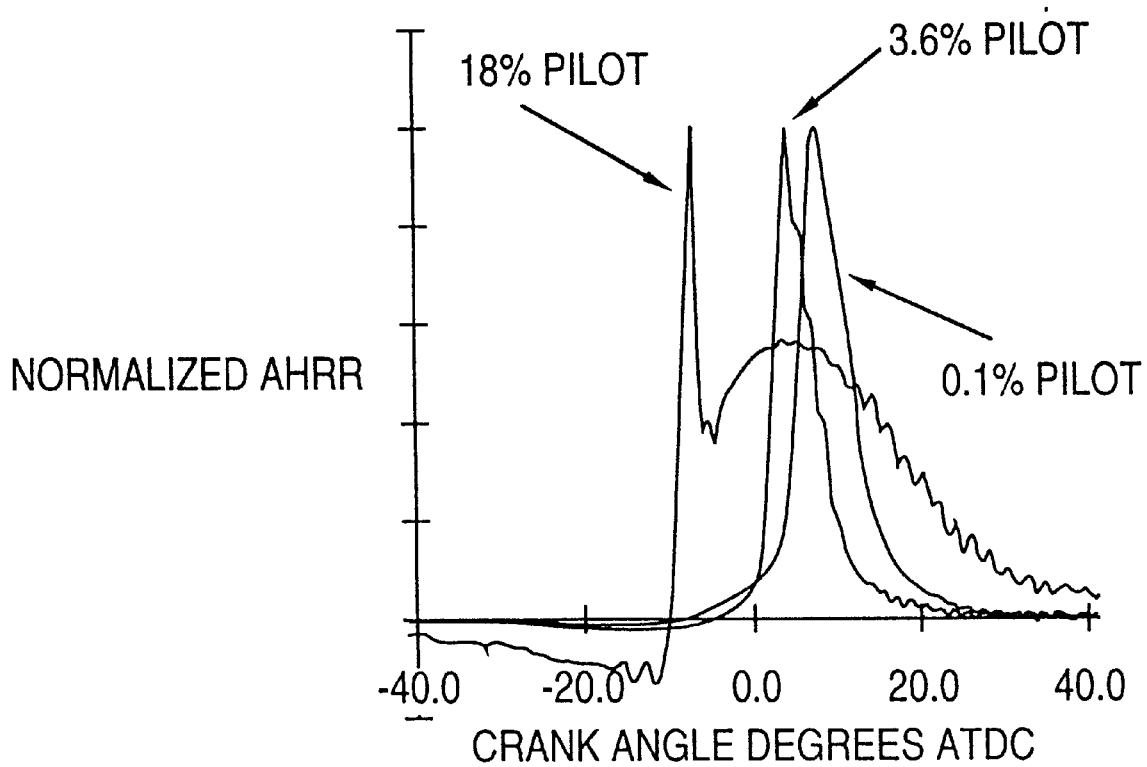

PREMIXED CHARGE COMPRESSION IGNITION ENGINE WITH OPTIMAL COMBUSTION CONTROL

This application is a continuation of Ser. No. 60/024,515 filed Aug. 23, 1996.

TECHNICAL FIELD

This invention relates generally to a compression ignition engine arranged to internally burn a premixed charge of fuel and air using autoignition to achieve reduced emissions while maintaining the desired fuel economy.

BACKGROUND OF THE INVENTION

For well over 75 years the internal combustion engine has been mankind's primary source of motive power. It would be difficult to overstate its importance or the engineering effort expended in seeking its perfection. So mature and well understood are merely designs made up of choices among a variety of known alternatives. For example, an improved output torque curve can easily be achieved by sacrificing engine fuel economy. Emissions abatement or improved reliability can also be achieved with an increase in cost. Still other objectives can be achieved such as increased power and reduced size and/or weight but normally at a sacrifice of both fuel efficiency and low cost.

The challenge to contemporary designers has been significantly increased by the need to respond to governmentally mandated emissions abatement standards while maintaining or improving fuel efficiency. In view of the mature nature of engine design, it is extremely difficult to extract both improved engine performance and emissions abatement from further innovations of the basic engine designs commercially available today. Yet the need for such innovations has never been greater in view of the series of escalating emissions standards mandated for the future by the United States government and other countries. Attempts to meet these standards includes some designers looking for a completely new engine design.

Traditionally, there have been two primary forms of reciprocating piston or rotary internal combustion engines: diesel and spark ignition engines. While these engine types have similar architecture and mechanical workings, each has distinct operating properties which are vastly different from each other. Diesel and spark ignited engines effectively control the start of combustion (SOC) using simple, yet distinct means. The diesel engine controls the SOC by the timing of fuel injection. In a spark ignited engine, the SOC is controlled by the spark timing. As a result, there are important differences in the advantages and disadvantages of diesel and spark-ignited engines. The major advantage that a spark-ignited natural gas, or gasoline, engine has over a diesel engine is the ability to achieve extremely low NOx and particulate emissions levels. The major advantage that diesel engines have over premixed charge spark ignited engines (such as passenger car gasoline engines and lean burn natural gas engines) is higher thermal efficiency. One key reason for the higher efficiency of diesel engines is the ability to use higher compression ratios than premixed charge spark ignited engines (the compression ratio in premixed charge spark ignited engines has to be kept relatively low to avoid knock). A second key reason for the higher efficiency of diesel engines lies in the ability to control the diesel engine's power output without a throttle. This eliminates the throttling losses of premixed charge spark ignited engines and results in significantly higher efficiency at part load for diesel engines. Typical diesel engines, however, cannot achieve the very low NOx and particulate emissions levels which are possible with premixed charge spark ignited engines. Due to the mixing nature of diesel combustion a large fraction of the fuel exists at a very fuel rich equivalence ratio which is known to lead to particulate emissions. Premixed charge spark ignited engines, on the other hand, have nearly homogeneous air fuel mixtures which tend to be either lean or close to stoichiometric, resulting in very low particulate emissions. A second consideration is that the mixing controlled combustion in diesel engines occurs when the fuel and air exist at a near stoichiometric equivalence ratio which leads to high temperatures. The high temperatures, in turn, cause high NOx emissions. Lean burn premixed charge spark ignited engines, on the other hand, burn their fuel at much leaner equivalence ratios which results in significantly lower temperatures leading to much lower NOx emissions. Stoichiometric premixed charge spark ignited engines, on the other hand, have high NOx emissions due to the high flame temperatures resulting from stoichiometric combustion. However, the virtually oxygen free exhaust allows the NOx emissions to be reduced to very low levels with a three-way catalyst.

Relatively recently, some engine designers have directed their efforts to another type of engine which utilizes premixed charge compression ignition (PCCI) or homogeneous charge compression ignition (HCCI), hereinafter collectively referred to as PCCI. Engines operating on PCCI principles rely on autoignition of a relatively well premixed fuel/air mixture to initiate combustion. Importantly, the fuel and air are mixed, in the intake port or the cylinder, long before ignition occurs. The extent of the mixture may be varied depending on the combustion characteristics desired. Some engines are designed and/or operated to ensure the fuel and air are mixed into a homogeneous, or nearly homogeneous, state. Also, an engine may be specifically designed and/or operated to create a somewhat less homogeneous charge having a small degree of stratification. In both instances, the mixture exists in a premixed state well before ignition occurs and is compressed until the mixture autoignites. Importantly, PCCI combustion is characterized in that: 1) the vast majority of the fuel is sufficiently premixed with the air to form a combustible mixture throughout the charge by the time of ignition and throughout combustion; and 2) combustion is initiated by compression ignition. Unlike a diesel engine, the timing of the fuel delivery, for example the timing of injection, in a PCCI engine does not strongly affect the timing of ignition. The early delivery of fuel in a PCCI engine results in a premixed charge which is very well mixed, and preferably nearly homogeneous, thus reducing emissions, unlike the stratified charge combustion of a diesel which generates higher emissions. Preferably, PCCI combustion is characterized in that most of the mixture is significantly leaner than stoichiometric to advantageously reduce emissions, unlike the typical diesel engine cycle in which a large portion, or all, of the mixture exists in a rich state during combustion.

An engine operating on PCCI combustion principles has the potential for providing the excellent fuel economy of the diesel engine while providing NOx and particulate emissions levels that are much lower than that of current spark-ignited or diesel engine. For example, U.S. Pat. No. 4,768,481 to Wood discloses a process and engine that is intended to use a homogeneous mixture of fuel and air which is spontaneously ignited. A controlled rate of combustion is said to be obtained by adding exhaust products to the air-fuel mixture. A combustion chamber is connected to the engine cylinder and fuel gas is supplied to the chamber via a check valve. A glow plug is positioned between the combustion chamber and the cylinder. The mixture entering the combustion is heated by the glow plug and by the hot walls of the combustion chamber. The mixture ignites due to the increase in temperature and the increase in pressure resulting from compression. The Wood patent is specifically directed to a two-stroke engine, but generally mentions that the technology could be applied to a four-stroke engine. However, this reference fails to discuss how the exhaust gas recirculation and glow plug would be controlled to optimize the start of combustion and to maintain the optimal start, and duration, of combustion, as load and ambient conditions change. A practical embodiment of this engine is unlikely to be capable of effectively controlling and maintaining PCCI combustion without additional controls.

U.S. Pat. No. 5,535,716 issued to Soto et al., discloses a compression ignition type engine which greatly reduces NOS emissions by introducing an evaporated fuel/air mixture into the combustion chamber during the intake event and early in the compression event for self-ignited combustion later in the compression event. The amount of NOx emissions produced by this engine is about one-thirtieth of that produced by a diesel engine. These principles are also set forth in SAE Technical Paper No. 960081, Aoyama, T. et al., "An Experimental Study on Premixed-Charge Compression Ignition Gasoline Engine", Feb. 26, 1996. However, these references do not specifically discuss controlling the timing of the start of combustion and the rate of combustion. Moreover, the engine disclosed in these references only uses the heat generated by compression to ignite the charge, without the use of any preheating. Also, these references do not suggest the controls, nor the manner of operating the controls, necessary to maintain stable combustion. Also, these references only disclose the use of gasoline.

U.S. Pat. No. 5,467,757 issued to Yanagihara et al., discloses a direct injection compression-ignition type engine in which fuel is injected into a combustion chamber during the intake stroke or compression stroke, before 60 degrees BTDC of the compression stroke, so as to reduce the amount of soot and NOx generated to substantially zero. These advantages are achieved by considerably enlarging the mean particle size of the injected fuel from the mean particle size used in conventional combustion processes to prevent the early vaporization of injected fuel after injection and by making the injection timing considerably earlier than conventional injection timing to ensure a uniformed fusion of the injected fuel in the combustion chamber. However, this reference nowhere suggests a manner of actively controlling the combustion history, such as the timing of the start of combustion and/or the duration of combustion.

Researchers have used various other names to refer to PCCI combustion. For example, Onishi, et al. (SAE Technical Paper No. 790501, Feb. 26–Mar. 2, 1979) called it "ATAC", which stands for "Active Thermo-Atmosphere Combustion." Noguchi, et al. (SAE Technical Paper No. 790840, Sep. 10–13, 1979) called it "TS", which stands for "Toyota-Soken", and Najt, et al. (SAE Paper No. 830264, 1983) called it "CIHC", which stands for "compression-ignited homogeneous charge."

Onishi, et al., worked with two-stroke engines. They found that PCCI combustion (ATAC) could be made to occur in a two-stroke engine at low load over a wide speed range. Combustion stability was much better than in the standard engine and there were significant improvements in fuel economy and exhaust emissions. Schlieren photography of the combustion was carried out with results quite similar to those obtained in their combustion studies. It was found that combustion was initiated at many points in the combustion chamber. However, there were small time differences between the start of combustion of these many points. Also, the combustion reactions were found to require a relatively long time compared to conventional spark-ignited flame propagation. To attain PCCI combustion, the following conditions were found to be important. The quantity of mixture and the air/fuel ratio supplied to the cylinder must be uniform from cycle to cycle. The scavenging "directivity" and velocity must have cyclic regularity to ensure the correct condition of the residual gases remaining in the cylinder. The temperature of the combustion chamber walls must be suitable. The scavenging passage inlet must be located at the bottom of the crankcase. It was found that at very light loads, PCCI was not successful because charge temperatures were too low. At very high loads, PCCI was not successful because the residual gas quantity was too low. In between these regions, PCCI combustion was successful.

Noguchi also obtained PCCI combustion in a two-stroke engine. Very stable combustion was observed, with low emissions of hydrocarbons (HC) and improved fuel consumption. Operation in PCCI mode was possible between 800 and 3200 rpm and air/fuel ratios between 11 and 22. Delivery ratios of up to 0.5 could be achieved at idle conditions. They observed that combustion could start at lower temperatures and pressures than those required for conventional diesel combustion. The combustion behavior was different from that of conventional spark-ignited combustion. Ignition occurred at numerous points around the center of the combustion chamber and the flame spread rapidly in all directions. The combustion duration was shorter than that of conventional combustion. It was proven that ignition kernels were not generated from contaminants deposited on the combustion chamber walls (generally presumed to be the cause of "run-on" phenomena in conventional gasoline engines). To gain a better understanding of the combustion, they set up an experimental apparatus for detecting radicals in the combustion chamber. It was found that the radicals showed higher peaks of luminous intensity that disappeared at an earlier time than with conventional spark-ignited combustion. In the case of conventional spark-ignition combustion, all the radicals such as OH, CH, $C_2$, H, and CHO, $HO_2$, O were observed at almost the same crank angle. However, with PCCI combustion, CHO, $HO_2$ and O radicals were detected first, followed by HC, $C_2$, and H radicals, and finally the OH radical.

Najt, et al. were able to achieve PCCI combustion in a four-stroke engine. They used a CFR single-cylinder engine with a shrouded intake valve. Several compression ratios were tried, and it was found that, although higher ratios would allow combustion at lower charge gas temperatures, they also resulted in excessively fast heat release rates. While a compression ratio of 7.5:1 was satisfactory, a compression ratio of 10:1 was not. Intake temperatures were in the range of 480° K. to 800° K. Their average energy release rates were considerably higher than those measured by Onishi and Noguchi.

SAE Paper No. 960742, entitled "Improving the Exhaust Emissions of Two-Stroke Engines by Applying the Activated Radical Combustion", Ishibashi, Y. et al., 1996, is noted as disclosing yet another study of PCCI combustion in a two-stroke engine.

Although Onishi et al., Noguchi et al., Naijt et al. and Ishibashi, et al. have made significant progress in understanding PCCI combustion, these references fail to suggest a practical PCCI engine having a control system capable of maintaining stable, efficient PCCI combustion with low emissions by controlling the time at which combustion occurs, the duration of combustion, the rate of combustion and/or the completeness of combustion. Specifically, these references do not suggest a PCCI engine and control system capable of effectively controlling the start of combustion. Moreover, these references do not suggest a system capable of actively enhancing the engine startability and achieving combustion balancing between the cylinders in a multi-cylinder engine.

SAE Technical Paper No. 892068, entitled "Homogeneous-Charge Compression Ignition (HCCI) Engines", Thring, R., Sept. 15, 1989, investigated PCCI operation of a four stroke engine. The paper found that PCCI required high exhaust gas recirculation (EGR) rates and high intake temperatures. It was shown that PCCI combustion produces fuel economy results comparable to a direct injection diesel engine and, that under favorable conditions, i.e. equivalence ratio of 0.5 and EGR rate of 23%, produces very low cyclic irregularity. This study also concluded that before PCCI can be made practical, it will be necessary to operate an engine in the PCCI mode without the need to supply large amounts of heat energy to the intake. The paper suggests two possibilities: the use of heated surfaces in the combustion chamber and the use of multi-stage turbocharging without intercoolers. However, although this paper suggests further investigating the effects of EGR and intake temperature on the timing of the start of combustion, this paper fails to disclose a system for effectively achieving active control of the start and duration of combustion.

U.S. Pat. No. 5,476,072 to inventor discloses another example of a PCCI engine which includes a cylinder head design that prevents excessive stresses and structural damage that PCCI engines inherently tend to cause. Specifically, the head includes a movable accumulator piston which moves to limit the peak cylinder pressure and temperature; however, control over the movement of the piston is merely passive and, therefore, this engine is unlikely to effectively stabilize combustion. Moreover, this reference nowhere suggests controlling the timing at which rapid combustion occurs, nor how such control could be accomplished.

An October 1951 publication entitled "Operating directions—LOHMANN BICYCLE MOTOR" discloses a two-stroke engine operating on PCCI combustion principles. Compression ratio is continuously adjustable based on outside temperature, fuel, speed and load. However, this engine requires the operator control the compression ratio manually. Therefore, this engine could not provide effective active control of combustion to ensure efficient combustion with low emissions throughout all operating conditions. Also, manual adjustment of compression ratio alone, without automatic temperature, equivalence ratio and\or autoignition property control, will not result in stable, optimized combustion throughout all operating conditions.

Conventional "dual fuel" engines operate on both a gaseous fuel mixture and diesel fuel. However, conventional dual fuel engines utilize the timing of the injection of diesel fuel to control the SOC of the fuel/air mixture received from the intake duct. In order to achieve this result, dual fuel engines inject the diesel fuel at approximately top dead center. In addition, the quantity of diesel fuel injected in a dual fuel engine is sufficient to ensure that the gaseous fuel in the combustion chamber ignites and burns virtually completely. As a result, dual fuel engines produce emissions similar to most conventional diesel and natural gas engines. In particular, in known dual fuel engines using diesel fuel and natural gas at high load, only a small amount of diesel fuel is required to start ignition and the emissions produced would be similar to a spark ignited natural gas engine. Under other conditions when substantial diesel fuel is injected, the emissions produced would be similar to a conventional diesel engine.

Consequently, there is a need for an engine operating on PCCI principles which includes a combustion control system capable of effectively controlling the timing of the start of combustion or location of combustion, and the rate or duration of combustion during engine operation.

SUMMARY OF THE INVENTION

A general objective of the subject invention is to overcome the deficiencies of the prior art by providing a practical PCCI engine and a control system for effectively and efficiently operating the PCCI engine.

Another object of the present invention is to provide a PCCI engine and control scheme for controlling the engine in a manner to optimally minimize emissions, especially oxides of nitrogen and particulate emissions, while maximizing efficiency.

Yet another object of the present invention is to provide a PCCI engine and control system for optimally controlling the combustion history of subsequent combustion events to effectively control the combustion event.

Still another object of the present invention is to provide a PCCI engine and control system for effectively controlling PCCI combustion in such a manner to achieve acceptable cylinder pressure while minimizing combustion noise.

A further object of the present invention is to provide a PCCI engine and control system which operates to actively control the combustion history of future combustion events during engine operation by sensing an engine operating condition indicative of the combustion history.

A still further object of the present invention is to provide a PCCI engine and control system which effectively controls various engine operating control variables to control the time at which the combustion event occurs during the compression and expansion events of the engine.

Yet another object of the present invention is to provide a PCCI engine and control system which effectively ensures that combustion occurs at an appropriate crank angle during the engine cycle to ensure stable combustion, low emissions, acceptable pressure levels and optimum efficiency.

Another object of the present invention is to provide a PCCI engine and control system which effectively controls the temperature, pressure, equivalence ratio and/or air/fuel mixture autoignition properties to precisely control the timing of the start of combustion.

A still further object of the present invention is to provide a PCCI engine and control system which effectively achieves continuous, stable PCCI combustion while achieving acceptable cylinder pressures and the desired brake mean effective pressure.

Yet another object of the present invention is to provide a PCCI engine and control system which effectively controls the commencement of combustion and the combustion rate so as to ensure that substantially all of the combustion process occurs within an optimal crank angle limit, i.e. 20 degrees through 35 degrees ATDC, while minimizing emissions and maximizing efficiency.

Another object of the present invention is to provide a PCCI engine which can be easily started.

Still another object of the present invention is to provide a multi-cylinder PCCI engine and control system which effectively minimizes variations in the combustion events of the cylinders.

Yet another object of the present invention is to provide a multi-cylinder PCCI engine and control system which effectively controls the start of combustion to achieve stable, low emission, efficient combustion throughout exposure to changes in engine load and ambient conditions.

Another object of the present invention is to provide a control system for a PCCI engine which effectively detects or senses the start of combustion to provide feedback control and then controls the operating conditions of the engine to optimize the start of combustion.

Still another object of the present invention is to provide a PCCI engine and control system which effectively minimizes the unburned hydrocarbon and carbon monoxide emissions.

The above objects and others are achieved by providing a premixed charge compression ignition internal combustion engine, comprising an engine body, a combustion chamber formed in the engine body and combustion history control system for controlling a combustion history of future combustion events to reduce emissions and optimize efficiency. The combustion history control system includes at least one of a temperature control system for varying the temperature of the mixture of fuel and air, a pressure control system for varying the pressure of the mixture, an equivalence ratio control system for varying an equivalence ratio of the mixture and a mixture autoignition property control system for varying an autoignition property of the mixture. The engine further includes an operating condition detecting device for detecting an engine operating condition indicative of the combustion history and generating an engine operating condition signal indicative of the engine operating condition, and a processor for receiving the engine operating condition signal, determining a combustion history value based on the engine operating condition signal, and generating one or more control signals based on the combustion history value. The one or more control signals are used to control at least one of the temperature control system, the pressure control system, the equivalence ratio control system and the mixture autoignition property control system to variably control the combustion history of future combustion events.

The engine operating condition detecting device may include a start of combustion sensor for sensing the start of combustion and generating a start of combustion signal. Also, the combustion history value may be determined based on the start of combustion signal. The engine operating condition detecting device may be a cylinder pressure sensor.

BRIEF DESCRIPTION OF THE DRAWINGS

FIG. 4a is a graph showing knock intensity as a function of time for a given set of operating conditions;

FIG. 4b is a graph showing gross indicated mean effective pressure (GIMEP) as a function of time;

FIG. 4c is a graph showing peak pressure as a function of time for the same conditions of FIGS. 4a and 4b;

FIG. 22a is a partial cross sectional view of one cylinder of the PCCI engine of the present invention including one embodiment of a compression ratio varying device;

FIG. 22b is a partial cross sectional view of one cylinder of the PCCI engine of the present invention showing a second embodiment of a compression ratio varying device;

FIG. 22c is a partial cross sectional view of one cylinder of the present PCCI engine showing a third embodiment of the compression ratio varying device;

FIG. 22d is a partial cross sectional view of a single cylinder of the present PCCI engine showing a fourth embodiment of the compression ratio varying device of the present invention;

FIG. 31i is a graph showing fuel specific oxides of nitrogen emissions as a function of IMP;

FIG. 31j is a graph showing the coefficient of variation of GIMEP as a function of IMP;

FIG. 31k is a graph showing the peak cylinder pressure as a function of IMP;

FIG. 31l is a graph showing noise as a function of IMP;

FIG. 31m is a graph showing the effects of increasing IMP on peak cylinder pressure and GIMEP;

FIG. 51 is a graph showing the effects of various percentages of diesel pilot injections on the heat release rate location and shape.

DETAILED DESCRIPTION OF THE INVENTION

The present invention is directed to an improved premixed charge compression ignition (PCCI) engine and control scheme for controlling the engine in a manner to optimally minimize emissions while maximizing efficiency. For the purposes of this application, PCCI refers to any engine or combustion process in which: 1) the vast majority of the fuel is sufficiently premixed with the air to form a combustible mixture throughout the charge by the time of ignition and throughout combustion; and 2) combustion is initiated by compression ignition. PCCI also refers to any compression ignition engine or combustion process in which the fuel and air are premixed long before ignition. As a result, the timing of injection of the fuel in the PCCI engine does not affect the timing of ignition of the fuel/air mixture. Also, it should be understood that PCCI is meant to encompass homogeneous charge compression ignition (HCCI) engines and processes wherein the mixture exists in a homogeneous, or nearly homogeneous state, at the start of combustion. In the present invention, the fuel/air mixture is thoroughly mixed to form a very lean homogeneous mixture, or is mixed in a manner to form a less homogeneous mixture with a desired air/fuel stratification, to ensure relatively even, low flame temperatures which result in extremely low oxides of nitrogen (NOx) emissions. It should be understood the some engines operate under PCCI conditions continuously while other engines may operate under PCCI conditions for only a limited period of operation either by design or inadvertently.

Applicants have recognized that the key to producing a commercially viable PCCI engine lies in the control of the combustion history of subsequent or future combustion events in such a manner so as to result in extremely low NOx emissions combined with very good overall efficiency, combustion noise control and with acceptable cylinder pressure. The combustion history may include the time at which combustion occurs (combustion timing), the rate of combustion (heat release rate), the duration of combustion and/or the completeness of combustion. Applicants have determined that the combustion history, and especially the combustion timing, is sensitive to, and varies depending on, a variety of factors including changes in load and ambient conditions. The engine and control system of the present invention operates to actively control the combustion history of future combustion events during engine operation to ensure the desired combustion and engine operation is maintained. In the preferred embodiment, the present engine and control system controls the combustion timing during the compression and expansion events of the engine.

Figure 1A:
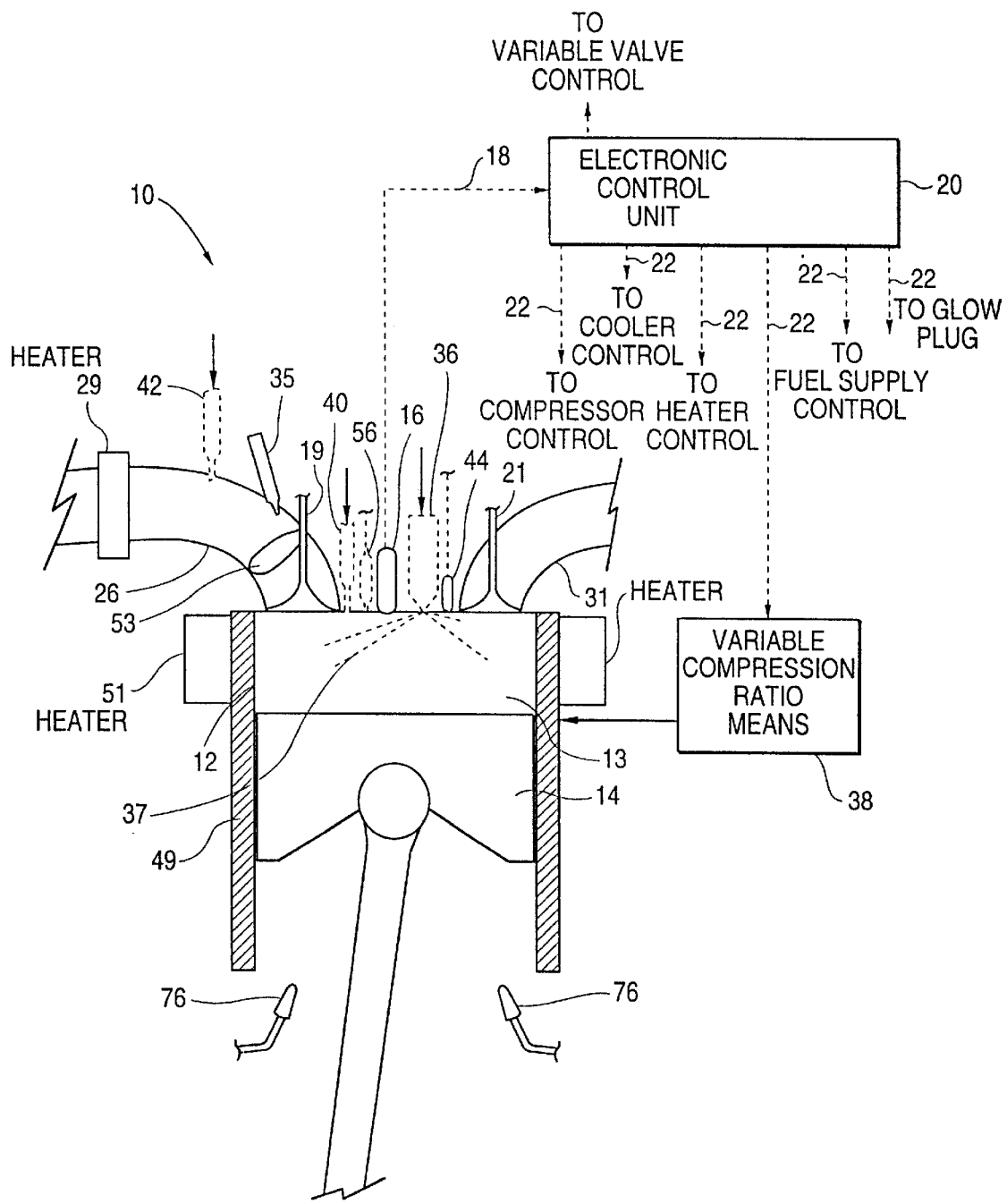
FIG. 1a is a schematic diagram of one embodiment of the present invention showing a single cylinder of the engine of FIG. 1b and associated control system.
Figure 1B:
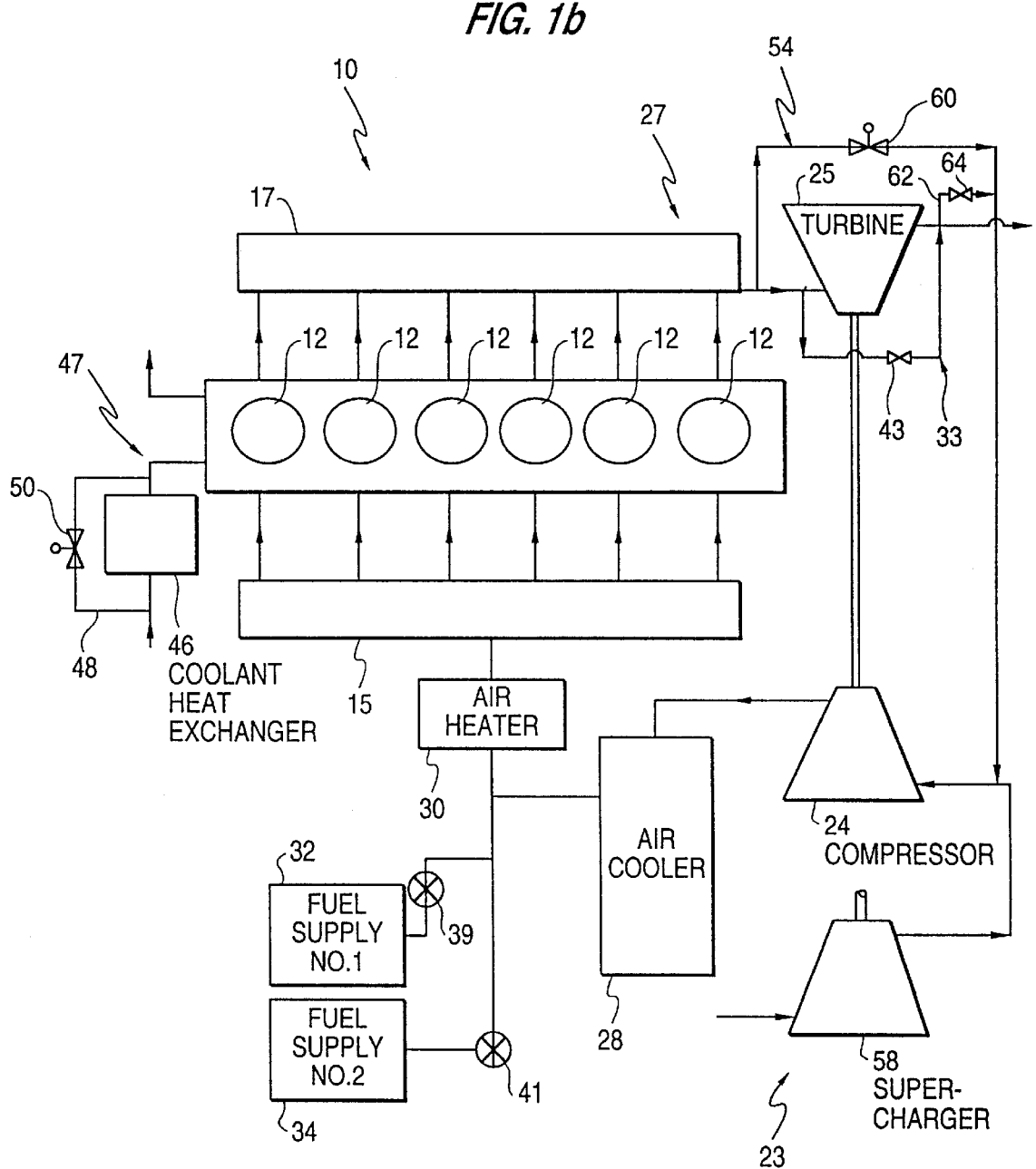
FIG. 1b is a schematic diagram of a multi-cylinder engine of the present invention.

FIGS. 1a and 1b illustrates the PCCI engine and control system of the present invention, indicated generally at 10. FIG. 1a shows a single engine cylinder 12 of the multi-cylinder reciprocating piston type engine shown in FIG. 1b. Of course, the PCCI control system of the present invention could be used to control PCCI combustion in an engine having only a single cylinder or any number of cylinders, for example, a four, six, eight or twelve cylinder internal combustion engine. In addition, although the present PCCI control system is primarily discussed with reference to a four stroke engine, the present control system could be applied to a two stroke engine. Also, the PCCI system of the present invention may be adapted for use on any internal combustion engine having compression, combustion and expansion events, including a rotary engine and a free piston engine.

As shown in FIG. 1a, a piston 14 is reciprocally mounted in the cylinder to form a combustion chamber 13. The piston transmits forces generated by a combustion event into a conventional engine drive system. Referring to FIGS. 1a and 1b, an intake air system 23 including an intake manifold supplies intake air, or an air/fuel mixture to a respective intake port 26 associated with each cylinder 12. Likewise, an exhaust gas system 27 including an exhaust manifold 17 receives exhaust gases flowing from exhaust ports 31. One or more intake valves, such an intake valve 19 and one or more exhaust valves, such as exhaust valve 21, are moved between open and closed positions by a conventional valve control system, or a variable valve timing system, to control the flow of intake air or air/fuel mixture into, and exhaust gases out of, the cylinder, respectively.

The PCCI system 10 includes a combustion sensor 16 for sensing or detecting an engine operating condition indicative of the combustion history and generating a corresponding signal 18. In the preferred embodiment, sensor 16 permits effective combustion control capability by detecting an engine operating condition or parameter directly related to, or indicative of, the time at which the combustion event occurs during the compression and/\or expansion strokes, i.e. preferably the start of combustion (SOC). For example, a cylinder pressure sensor may be provided on any or all engine cylinders for sensing, on a cycle-by-cycle basis, the SOC. In this case, the sensor 16 also provides other engine condition data, such as the combustion rate, combustion duration, combustion event or heat release location and end of combustion data, any one of which may be used instead of the start of combustion data. Any conventional means for detecting the start of combustion may be used, for example, by sensing the very rapid increase in the cylinder pressure. Other forms of sensors could be used including accelerometers, ion probes, optical diagnostics, strain gages and/or fast thermocouples in the cylinder head, liner or piston. Also, torque or RPM sensors could be used to detect changes in engine torque and RPM associated with each combustion event. Alternatively, or additionally, an emissions sensor could be used to detect emissions having a known correlation to the completeness of combustion.

Sensor 16 provides feedback control to an electronic control unit 20 (ECU). ECU 20 receives signal 18, processes the signal and determines an actual combustion history value, i.e. start of combustion value. The actual combustion history value is then compared to a predetermined desired combustion history value obtained, for example, from a look-up table. Based on the comparison of the actual combustion history value to the desired combustion history value, ECU 20 then generates a plurality of output signals, indicated at 22, for variably controlling respective components of the system so as to effectively ensure, in the preferred embodiment, that the SOC and completion of combustion occur between 20 degrees before top dead center (BTDC) during the compression stroke and 35 degrees after top dead center (ATDC) during the power stroke of the piston thereby minimizing NOx emissions while maximizing engine efficiency. The PCCI combustion control scheme is most preferably implemented in software contained in ECU 20 that includes a central processing unit such as a micro-controller, micro-processor, or other suitable micro-computing unit.

As discussed herein, PCCI system 10 may include various components for optimizing the combustion event. The objectives of the present system, i.e. low oxides of nitrogen (NOx) emissions, high efficiency, etc, may be achieved using any one of the various control components, or any combination of the components. In particular, as shown in FIG. 1b, a compressor 24 may be provided along an intake air system 23 upstream of intake manifold 15 for varying the boost intake pressure. Compressor 24 may be driven by any conventional means, such as an exhaust gas driven turbine 25. A bypass circuit 33 including a waste gate valve 43 may be provided in a conventional manner. A second compressor or supercharger 58 may be provided upstream of compressor 24. Supercharger 58 is mechanically driven by the engine drive system. A charge air cooler 28 may also be provided downstream of compressor 24. Also, an intake air heater 30 (such as a burner, heat exchanger or an electric heater) may be provided, for example, after cooler 28 as shown in FIG. 1b, or alternatively, upstream of compressor 24. Also, an individual heater 29 may be provided in the intake port 26 associated with each cylinder 12 to provide quicker control of the intake manifold temperature for each cylinder to enhance both individual cylinder combustion control and balancing of combustion between the cylinders. Compressor 24, cooler 28 and heater 30 each include control devices for varying the effect of the particular component on the pressure/temperature of the intake air or mixture. For example, a bypass valve or waste gate 43 could be used to regulate the amount of exhaust gas supplied from the associated exhaust system, which is connected to an exhaust duct 31, to turbine 25 thereby varying the intake pressure as desired. Similarly, a control valve could be provided in the cooling fluid flow path supplied to cooler 28 to permit variable control of the cooling effect of cooler 28. Likewise, various types of variable controls could be used to vary the heating effect of heater 30. Output signals 22 from ECU 20 are supplied to the various control devices to control compressor 24, cooler 28 and heater 30 so as to variably control the pressure preferably and temperature of the intake air or mixture on a cycle-by-cycle basis.

In addition, the PCCI system 10 may include a plurality of fuel supplies 32 and 34 for supplying fuels having different autoignition properties (for example, different octane or methane ratings, or activation energy levels) into the intake air flow. Fuel control valves 39 and 41 are used to control the amount of each fuel supply 32, 34 delivered, respectively. For example, fuel may be supplied along the intake air path between cooler 28 and air heater 30 as shown in FIG. 1b. Of course, fuel could be introduced at various locations along the intake of the engine, such as upstream of the cooler, e.g. upstream of the compressor. Alternatively, the fuel could be injected, by for example an injector 35, into the respective intake duct 26 associated with each cylinder, as shown in FIG. 1a.

The present PCCI system 10 also importantly includes a variable compression ratio means 38 for varying the compression ratio so as to advantageously advance or retard the combustion event as desired. For example, variable compression ratio means 38 may be in the form of a control mechanism for varying the shape of the combustion chamber or height of the piston to vary the effective compression ratio. The effective compression ratio could also be varied by varying the timing of closing of intake valve 19 as discussed more fully hereinbelow. The variations in the timing of opening and closing of the intake and exhaust valves may be accomplished using any conventional variable valve timing actuator system capable of receiving signals from ECU 20 and effectively varying the opening and/or closing of the valves in accordance with the principles set forth hereinbelow.

In addition, in-cylinder diluent injection may be accomplished using an injector 40 for injecting a gas or liquid, e.g. air, nitrogen, carbon dioxide, exhaust gas, water, etc., into the cylinder to vary the temperature and the temperature distribution in the cylinder so as to control the combustion event. Similarly, a diluent may be injected into intake duct 26 using, for example, an injector 42.

The present PCCI system may also include a fuel injector 36 for injecting fuel 37, e.g. diesel fuel, directly into the combustion chamber. Fuel 37 would be injected either early in the compression event, preferably approximately between 180 degrees and 60 degrees BTDC, as described below, or later in the compression event near TDC.

By injecting the fuel 37 early in the compression event, it is much more thoroughly mixed with the fuel/air mixture received from the intake duct than would be the case for a diesel engine, thus ensuring a more desirable combustion process, in particular the fuel will burn at a leaner equivalence ratio which results in much lower NOx emissions. The start or initiation of the combustion (SOC) of the fuel/air mixture received from the intake duct may be varied by controlling the quantity of fuel 37 injected. For instance, an earlier combustion event may be achieved by increasing the quantity of fuel 37 while the timing of the combustion event may be delayed by decreasing the quantity of fuel 37 injected.

By injecting the fuel 37 later in the compression stroke, that is near TDC, conventional diesel fuel injection systems can be used. This approach could be combined with the introduction of one or more additional types of fuel in the intake manifold to achieve a PCCI mode of operation. In particular, the fuel injected into the intake manifold would have a higher excess air ratio. The excess air ratio is the actual air-fuel ratio of the engine divided by the air-fuel ratio at stoichiometric conditions. For the very lean excess air ratio, combustion along a flame front is impossible. However, autoignition is possible thereby allowing combustion of a mixture that would be too lean to burn in a typical spark-ignited engine. Applicants have determined that PCCI combustion does not initiate at, and propagate out from, a single location. On the contrary, the results show that combustion includes multiple ignition sites distributed throughout the combustion chamber.

For efficient, low emission PCCI combustion, it is important to have combustion occur during an appropriate crank angle range during the engine cycle. If combustion starts too early, cylinder pressures will be excessively high and efficiency will suffer. If combustion starts too late, then combustion will be incomplete resulting in poor HC emissions, poor efficiency, high carbon monoxide (CO) emissions, and poor stability. Applicants have determined that the timing of the SOC and the combustion rate, and therefore combustion duration, in a PCCI engine primarily depend on the temperature history; the pressure history; fuel autoignition properties, e.g. octane/methane rating or activation energy, and trapped cylinder charge air composition (oxygen content, EGR, humidity, equivalence ratio etc.). The present invention presents a structured approach to affecting these variables in such a way that the start of combustion and/or the combustion rate (heat release rate) can be controlled through various combinations of features discussed more fully hereinbelow.

The various control features for controlling the start of combustion and the combustion rate are controlled/varied to ensure optimum combustion throughout engine operating conditions so as to achieve low NOx emissions and high efficiency. Application of these control features will cause combustion to occur within a preferred crank angle range relative to the top dead center position of the engine piston. Specifically, applicants have recognized that substantially all of the combustion event should occur between 20 crank angle degrees BTDC and 35 crank angle degrees ATDC. Also, combustion would be initiated, preferably between 20 crank angle degrees BTDC and 10 crank angle degrees ATDC, and ideally, approximately between 10 degrees BTDC and 5 degrees ATDC. In addition, the duration of the combustion event will typically correspond to a crank angle in the range of 5–30 crank angle degrees. Preferably, however, one or more of the control features listed below will be controlled to prolong the duration of combustion to approximately 30–40 degrees to achieve desirable peak cylinder pressures and reduced noise. Thus, optimal control of one or more of the following features will effectively control the start of combustion and/or the rate of combustion such that substantially all of the combustion event occurs between 20 crank angle degrees BTDC and 35 crank angle degrees ATDC. Of course, there may be conditions under which the start of combustion occurs outside the above-stated crank angle range and/or the duration of combustion in the PCCI engine occurs over a broader crank angle range, or may extend beyond the limit described above.

Figure 2:
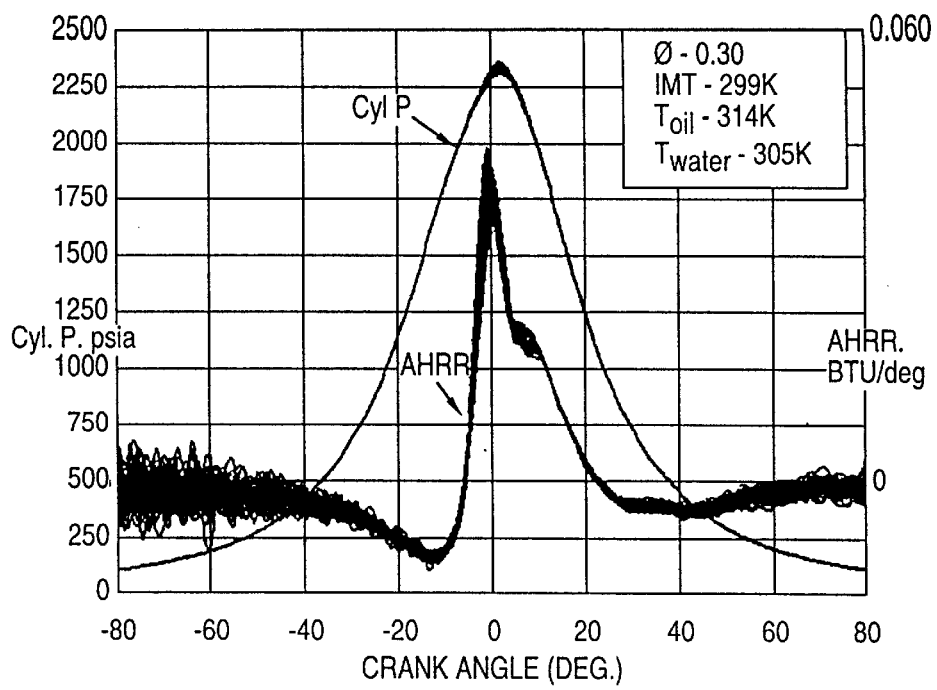
FIG. 2 is a graph showing cylinder pressure and heat release rate as a function of crank angle for the PCCI engine of the present invention.
Figure 3:
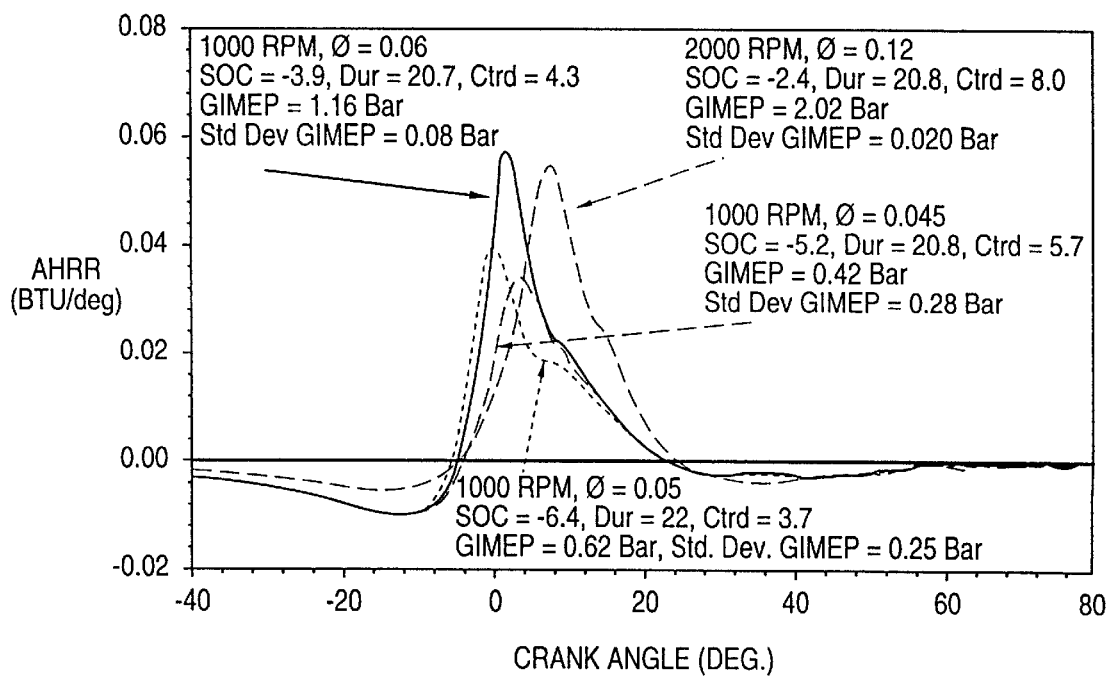
FIG. 3 is a graph showing the apparent heat release rate as a function of crank angle for several different engine operating conditions.

Applicants have shown that stable, efficient PCCI combustion can be achieved with most of the heat release occurring after TDC. For example, as shown in FIG. 2, the centroid of heat release may be positioned at 5° ATDC. Applicant have determined that, at light load and lean conditions, as shown in FIG. 3, heat release duration may be in the range of approximately 21.5–25 crank angle degrees.

Figure 5:
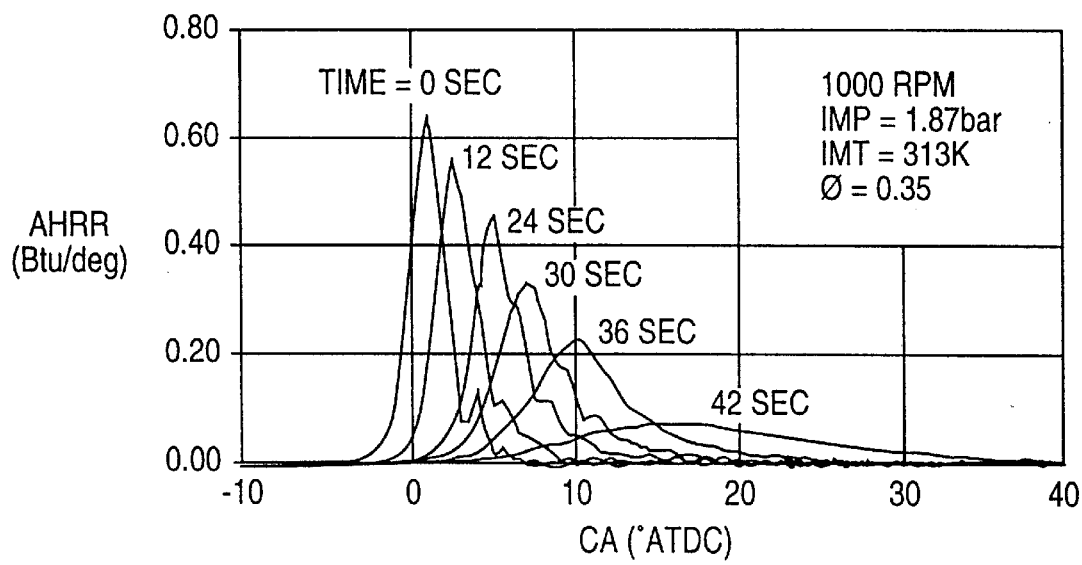
FIG. 5 is a graph showing apparent heat release rate as a function of crank angle and illustrating the increase in the heat release rate duration as the combustion or heat release location or timing is retarded.
Figure 6:
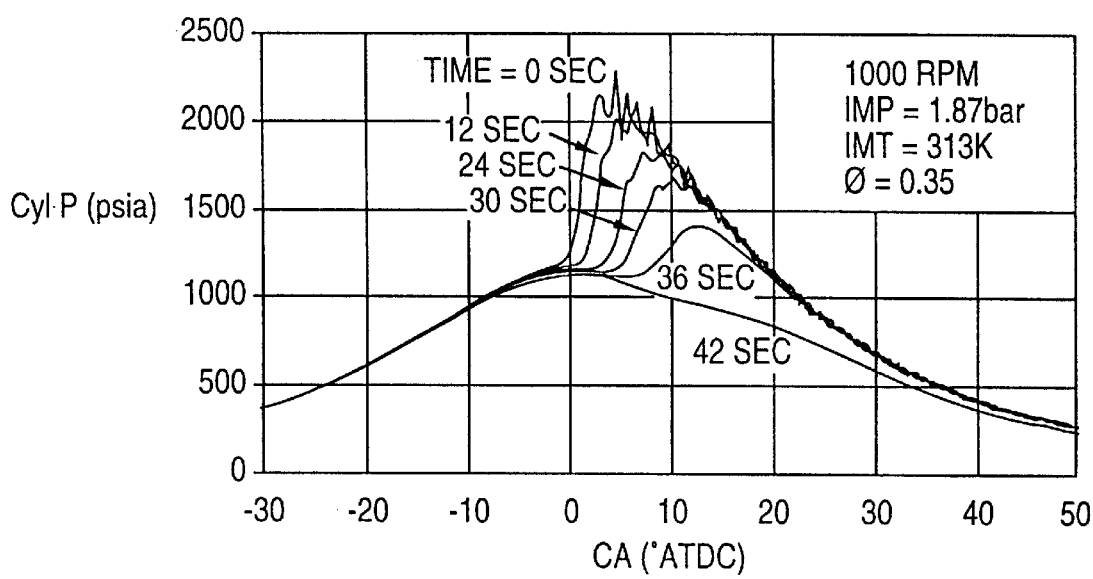
FIG. 6 is a graph showing cylinder pressure as a function of crank angle and illustrating the decrease in peak cylinder pressure as the heat release rate retards.

As shown in FIGS. 4a, 4b and 4c, applicants have determined that with an engine running close to its misfire limit, the SOC and end of combustion (EOC) progressively retard and heat release duration lengthens. Gross indicated mean effective pressure (GIMEP) passes through a maximum as the SOC retards to after TDC. Meanwhile, the knock intensity and peak cylinder pressure (PCP) decrease substantially close to the misfire limit, while GIMEP remains acceptable. As shown in FIG. 5, the peak heat release rate also decreases and the heat release duration increases as the misfire limit is approached. Meanwhile, as shown in FIG. 6, the peak cylinder pressure decreases as the heat release rate retards. Clearly, the engine cannot sustain this reaction process without providing the appropriate controls discussed herein. Applicants have determined that the best operating point occurs with the SOC occurring a few degrees after TDC. Certainly, improving the PCP-GIMEP tradeoff for PCCI combustion requires a SOC after TDC. As a result, it is clear that variable, active control is necessary to maintain the SOC and duration of combustion at the desired location and at the desired length, respectively, to achieve effective, efficient PCCI combustion.

Variation in the SOC, between sequential combustion events in a single cylinder engine and between cylinders in a multi-cylinder engine, is due to the sensitivity of PCCI combustion to the pressure and temperature history leading up to the particular combustion event. Very small variations in the compression ratio, the amount of trapped residual, wall temperatures, etc. have a significant effect on the pressure and temperature history. The present PCCI engine and method of operating the engine include control variables/features capable of compensating for, and controlling, these variations to achieve optimum PCCI combustion.

Generally, the control variables, which can be used to effectively control the commencement of combustion and the combustion rate so as to ensure that substantially all of the combustion process occurs within the optimal crank angle limit, i.e. 20 degrees BTDC through 35 degrees ATDC while minimizing emissions and maximizing efficiency, may be classified in four categories of control: temperature control; pressure control; control of the mixture's autoignition characteristic; and equivalence ratio control.

Temperature Control

The temperature of the in-cylinder air/fuel mixture (in-cylinder temperature) plays an important role in determining the start of combustion. The in-cylinder temperature may be varied to control the start of combustion by varying certain key control features, such as compression ratio (CR), intake manifold temperature (IMT), exhaust gas recirculation (EGR), residual mass fraction (RMF), heat transfer and temperature stratification.

Figure 7A:
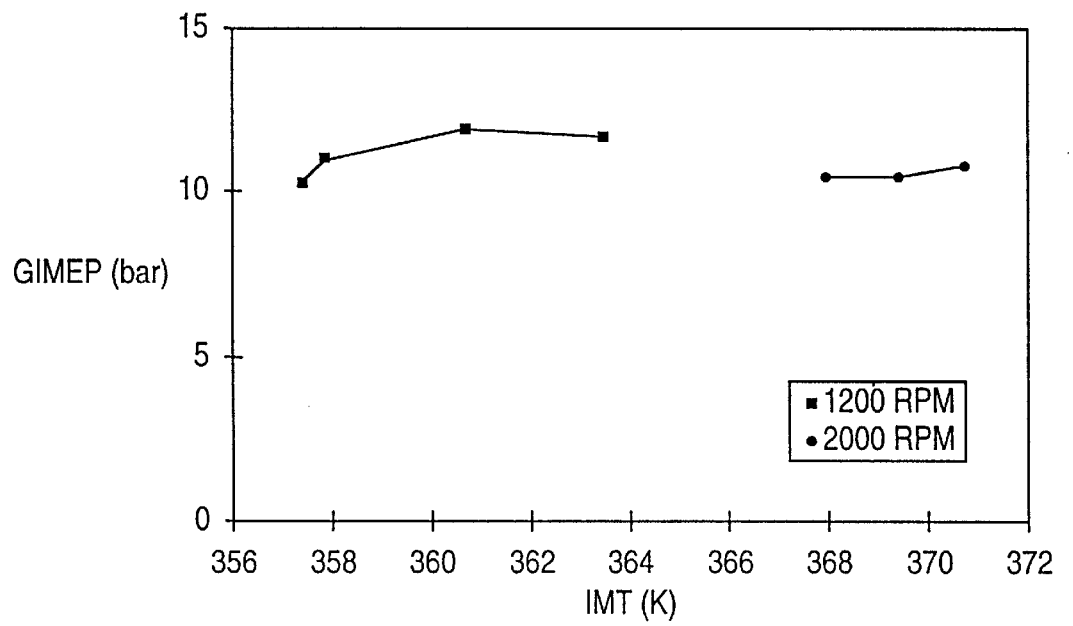
FIG. 7a. is a graph showing GIMEP as a function of intake manifold temperature for two different engine speed cases.
Figure 7B:
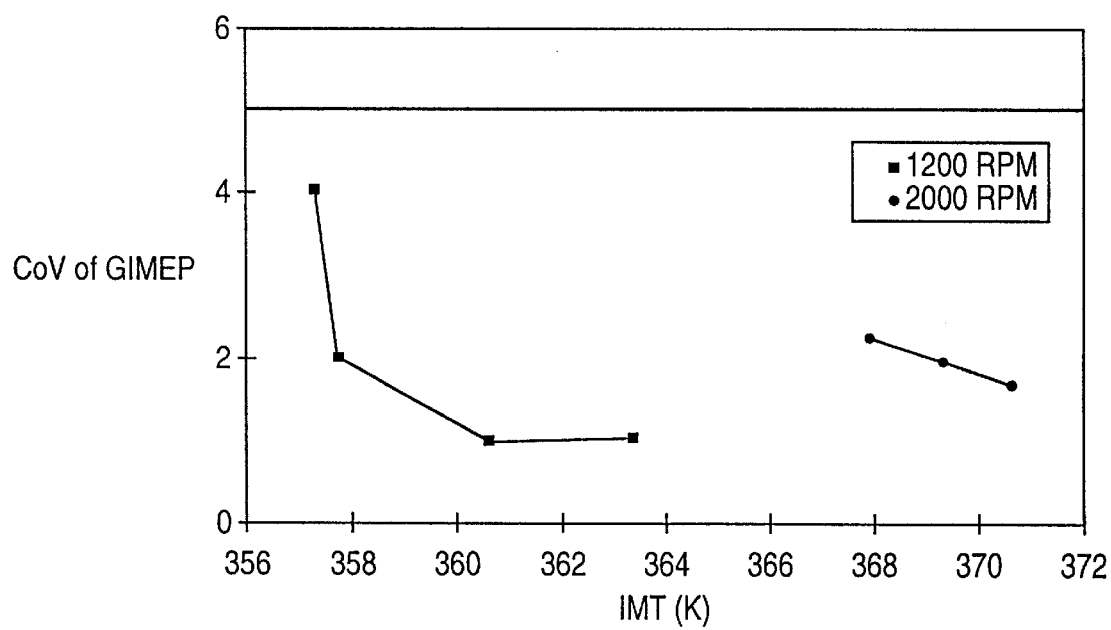
FIG. 7b is a graph showing the coefficient of variation of GIMEP as a function of intake manifold temperature for two different engine speed cases.
Figure 7C:
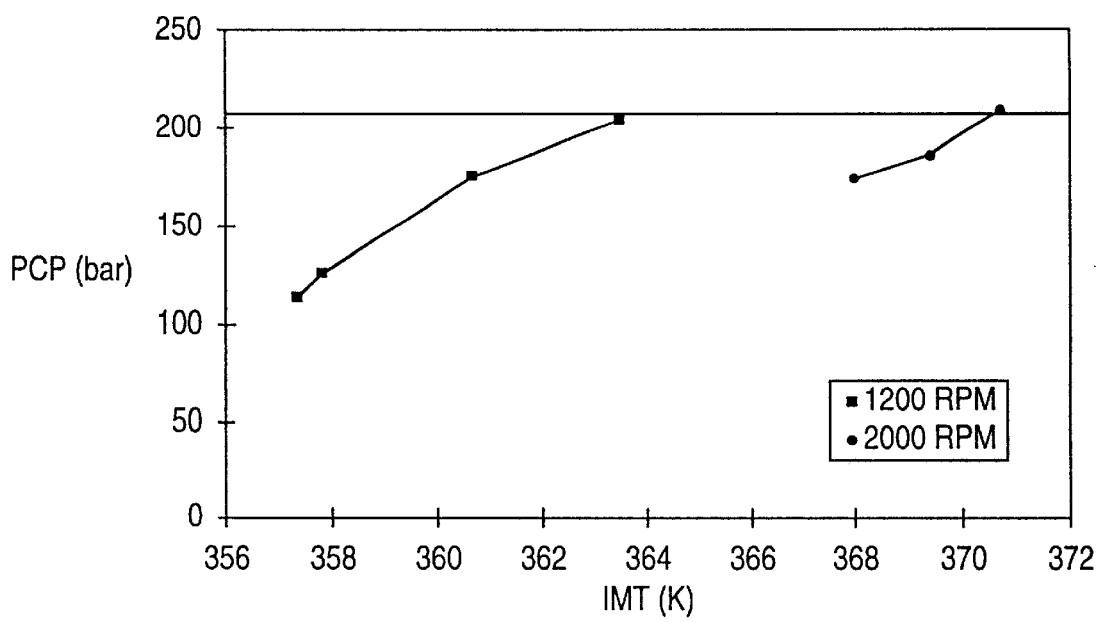
FIG. 7c is a graph showing peak cylinder pressure as a function of intake manifold temperature for two different engine speeds.
Figure 7D:
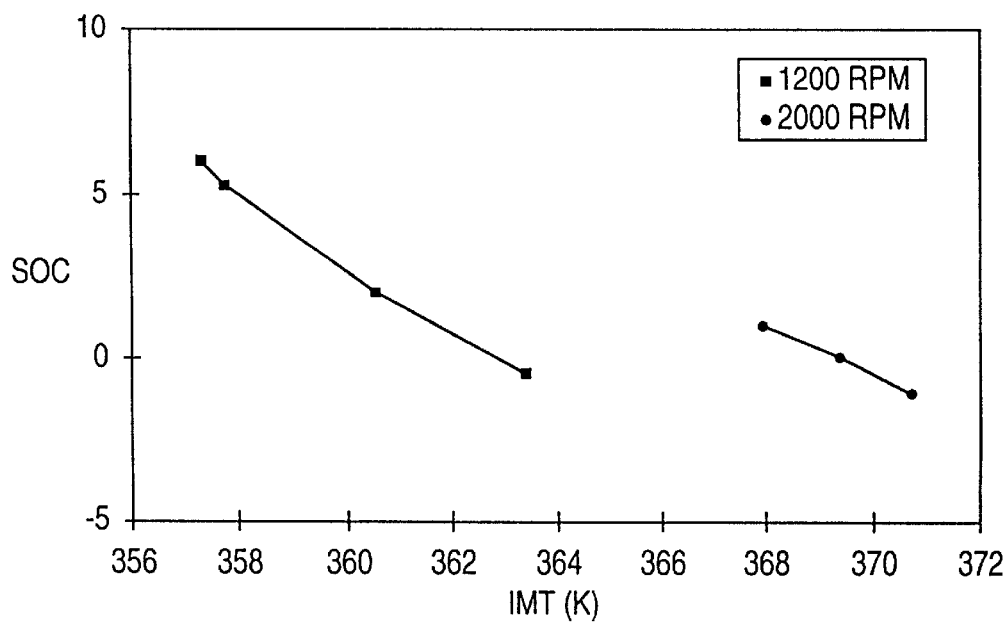
FIG. 7d is a graph showing the start of combustion as a function of intake manifold temperature for two different engine speeds.
Figure 7E:
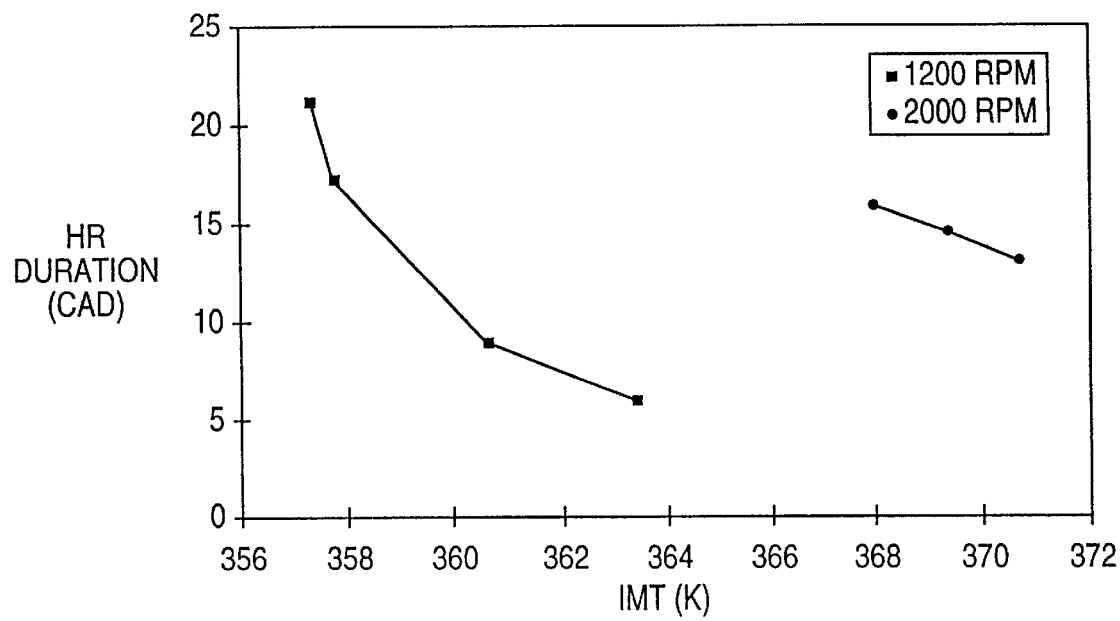
FIG. 7e is a graph showing heat release duration in crank angle degrees as a function of intake manifold temperature for two different engine speeds.
Figure 7F:
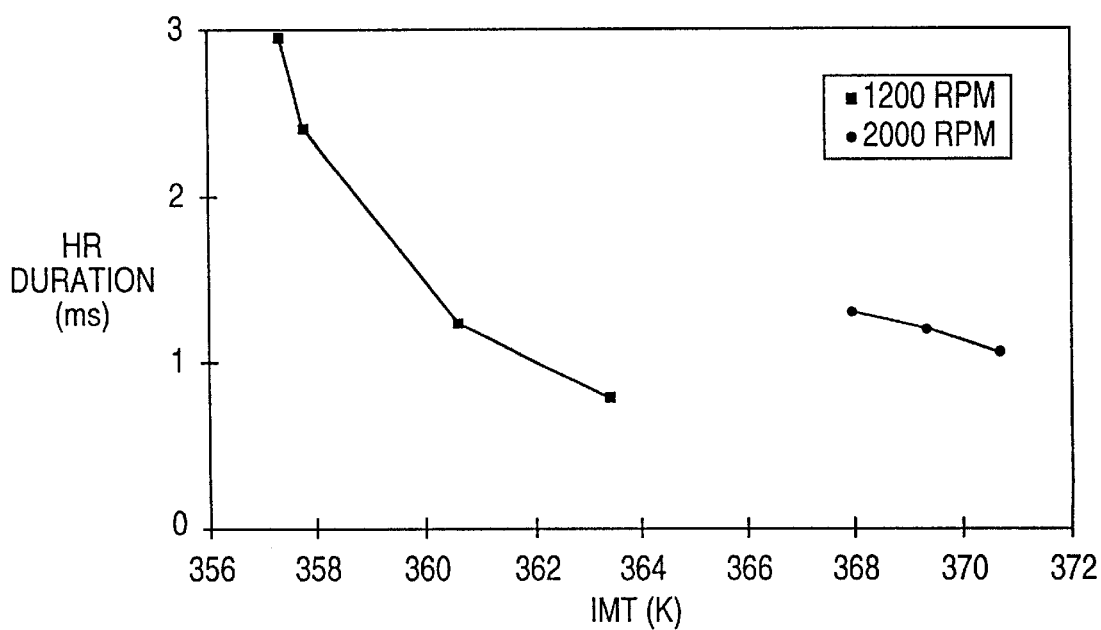
FIG. 7f is a graph showing heat release duration in time as a function of intake manifold temperature for two different engine speeds.
Figure 7G:
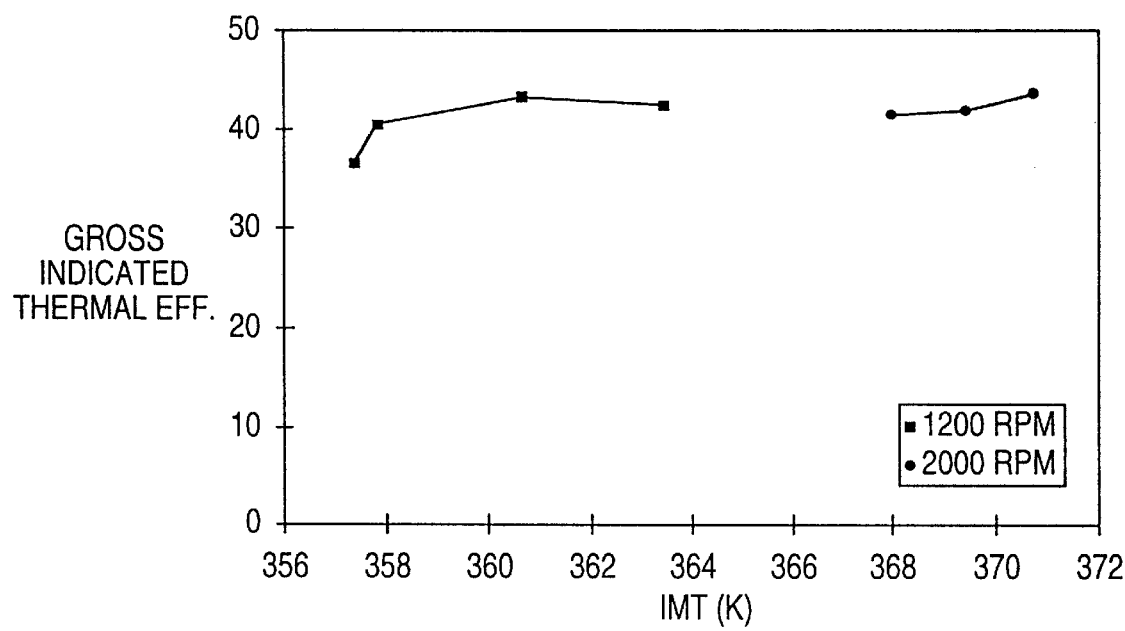
FIG. 7g is a graph showing gross indicated thermal efficiency as a function of intake manifold temperature for two different engine speeds.
Figure 7H:
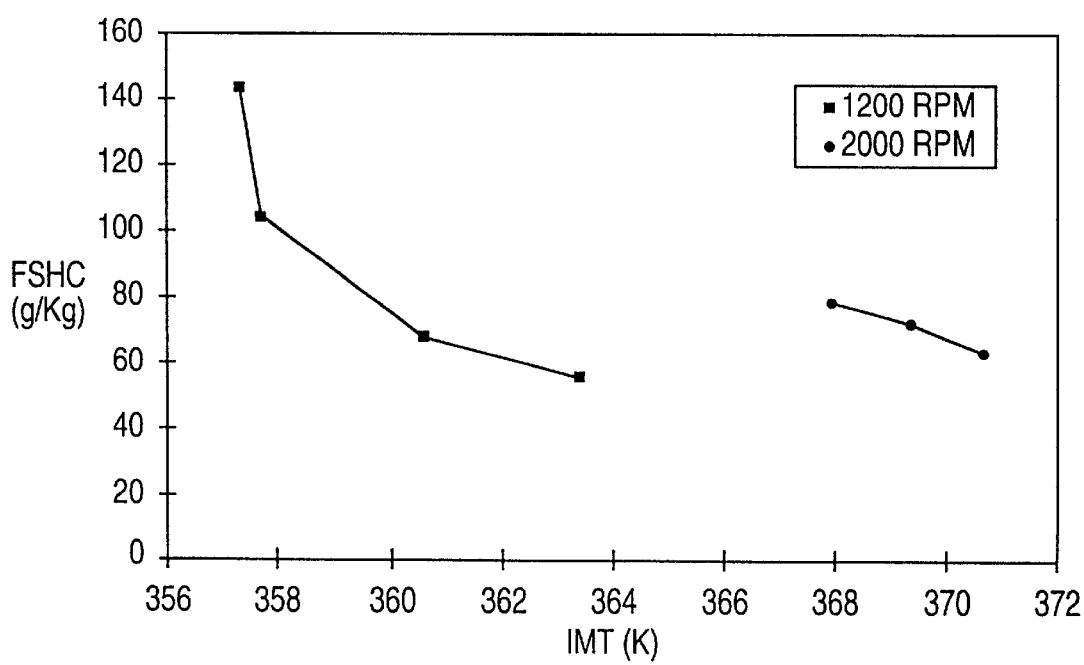
FIG. 7h is a graph showing fuel specific hydrocarbons as a function of intake manifold temperature for two different engine speeds.
Figure 7I:
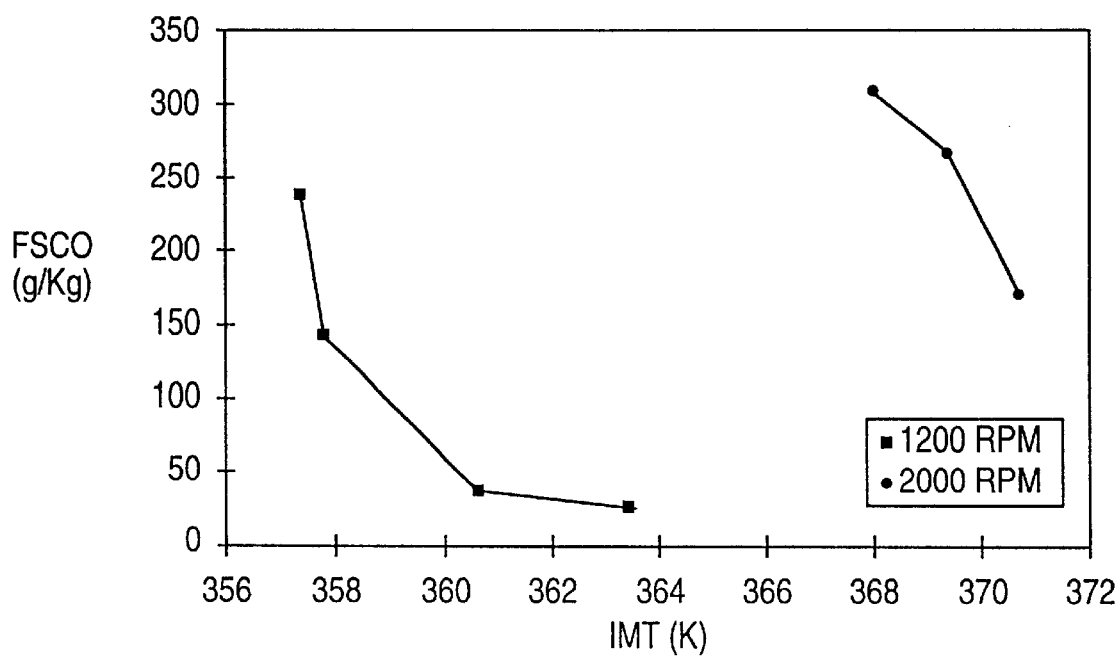
FIG. 7i is a graph showing fuel specific carbon monoxide as a function of intake manifold temperature for two different engine speeds.
Figure 7J:
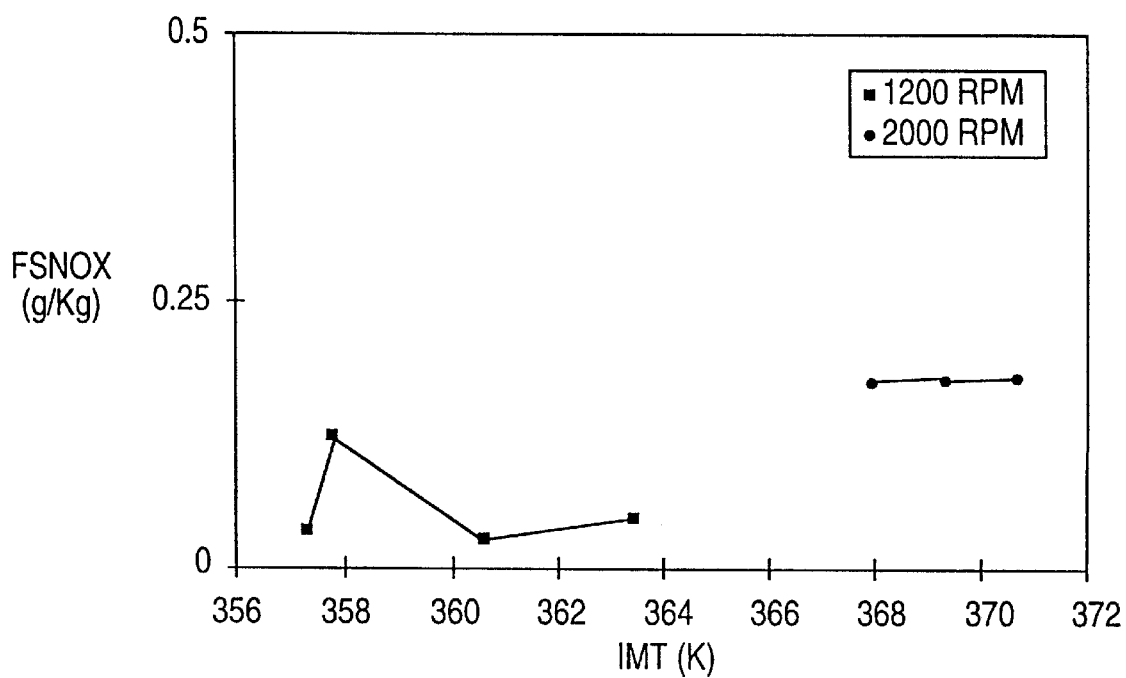
FIG. 7j is a graph showing fuel specific oxides of nitrogen emissions as a function of intake manifold temperature for two different engine speeds.
Figure 7K:
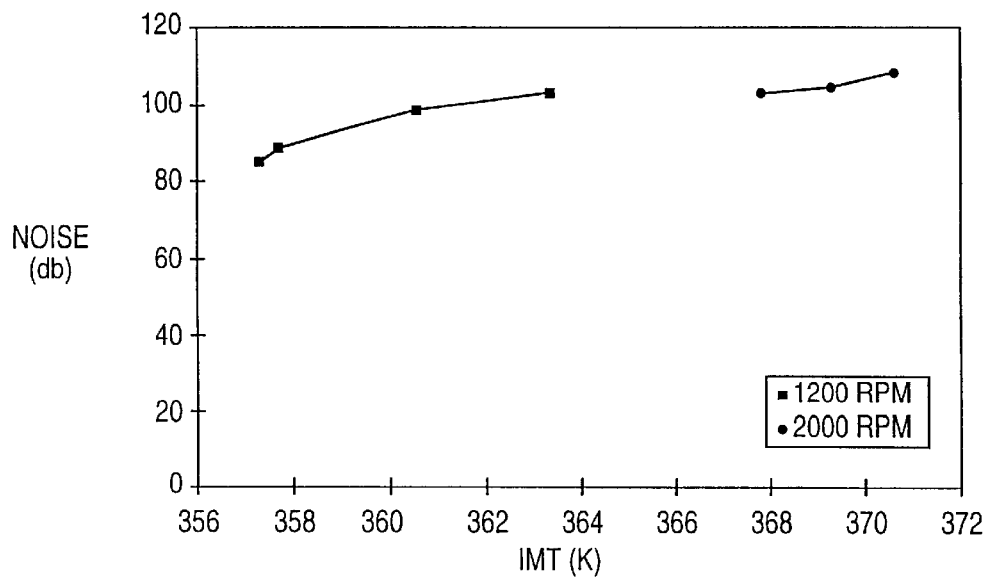
FIG. 7k is a graph showing noise as a function of intake manifold temperature for two different engine speeds.

Applicants have determined that intake manifold temperature (IMT) has a significant effect on propane-fueled PCCI combustion. During two of Applicants' studies, engine speed, equivalence ratio ($\phi$) and intake manifold pressure (IMP) were held constant while IMT was swept through the practical operating range. The lowest IMT was limited by unstable operation and the highest IMT was limited by maximum allowable peak cylinder pressure (PCP). The conditions of the first and second studies, respectively, included engine speed=1200 rpm and 2000 rpm; equivalence ratio=0.30 and 0.24; and IMP=3.3 bar and 4.1 bar. As shown in FIGS. 7a and 7b, increasing IMT resulted in increased GIMEP and a decreased coefficient of variation (CoV) of GIMEP. Also, increasing IMT increased the PCP as shown in FIG. 7c, while advancing the SOC and decreasing combustion duration (FIGS. 7d–7f). Increasing IMT also increased gross indicated thermal efficiency (FIG. 7g) and the estimated noise (FIG. 7k). With respect to emissions, increasing IMT decreased FSHC emissions (FIG. 7h), decreased fuel specific carbon monoxide (FSCO) emissions (FIG. 7i), but had no observable effect on FSNOx (FIG. 7j).

In summary, Applicants have determined that small changes in IMT have large effects on many aspects of propane-fueled PCCI combustion. By varying the intake temperature, the combustion event can be advanced or retarded. Increasing the intake temperature will advance the start of combustion; decreasing the intake temperature will retard the start of combustion, as shown graphically in FIG. 8. This temperature control may be accomplished using heat exchangers or burners. For example, a charge air cooler may be positioned along the intake manifold. A burner or heater in combination with a cooler offers exceptional intake temperature control. The exhaust products of the burner may be directly mixed with the intake air, the burner could use the intake air directly for its air supply, or the heat generated by the burner could be added to the intake air through a heat exchanger. The heat exchanger may use waste heat in engine coolant or exhaust gases to heat the intake air. Also, rapid control of IMT can be achieved by using a charge air cooler bypass. A regenerator (similar to that used in a Stirling engine) could be used to recover and transfer exhaust heat into the intake air through a heat exchanger thereby controlling the intake temperature. In addition, IMT could be varied by injecting fuel into the manifold in different phases, e.g. as a liquid or a gas. The change in the heat required for vaporization of a liquid fuel would reduce IMT. Of course, different types of fuels would have different effects on IMT.

Applicants have also determined how residual and intake temperature, boost and combustion chamber and port wall heat transfer, affect in-cylinder bulk temperature throughout intake and compression, and also the effect on spatial temperature distribution at TDC. Specifically, Applicants compared the intake and compression events for an engine running on an air and propane mixture. Applicants determined that the temperature at the SOC is also determined in part by the reheating of the intake charge by existing heat energy. For the purposes of this application, reheat is defined as T(average in-cylinder @ intake valve closing (IVC))—T(average intake manifold), that is, the difference between intake manifold temperature, i.e. temperature assigned at the inlet to the port and the in-cylinder bulk temperature at IVC. Applicants determined that reheat starts in the port and continues in-cylinder. Moreover, 56% of reheat was due to wall heat transfer and 44% due to mixing and boost for the condition examined. Clearly, heat transfer is very important in determining reheat.

One study that elucidates the importance of the wall temperatures on the in-cylinder heat transfer is the following. In comparing the firing cylinder to the misfiring cylinder, it was noted that the misfiring cylinder's reheat was 63% of the firing case (27 vs 43 K). Lower wall temperatures for a misfiring cylinder compared to a firing cylinder are the main reason for its lower in-cylinder temperatures. The firing cylinder had a TDC in-cylinder temperature 46 K higher than a misfiring cylinder, compared to a 16 K higher temperature at IVC. If compression were done adiabatically for each case, the temperature difference at TDC would have been ~35 K given the initial 16 K difference. Therefore, ~11 K (46–35 K) temperature loss from IVC to TDC is due to cooler misfiring wall temperatures. Interestingly, although walls heat the in-cylinder gases for the majority of the intake and compression event, relatively fast rates of heat transfer out of the gas near TDC compression can result in cooler in-cylinder contents than if there were no heat transfer at all. Also, mass flow rate decreased 7.5% due to heat transfer when comparing a normally firing cylinder with wall heat transfer to a firing cylinder with adiabatic walls, primarily due to the density effect.

Figure 9:
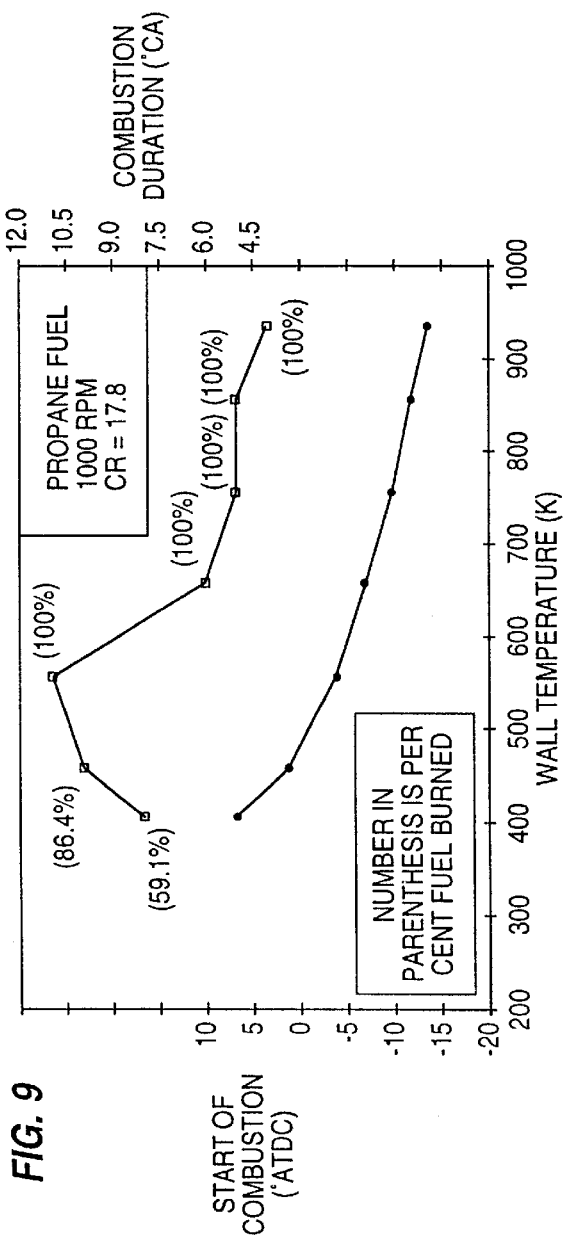
FIG. 9 is a graph showing both the start of combustion and combustion duration as a function of wall temperature.

Referring to FIG. 9, with respect to the effect of wall temperatures, i.e. piston temperature, head temperature, and liner temperature, on the SOC, Applicants have determined that as wall temperatures are increased, SOC becomes more advanced. The increased surface temperatures cause lower heat transfer to the combustion chamber surfaces thereby advancing combustion. Applicants have shown that with wall temperature varying from 255 to 933 K and all other parameters kept constant (IMT=342 K, reheat=43 K, $\phi$=0.24), the mixture did not ignite with a wall temperature below 400 K. From about 400 K to 550 K combustion duration increases as a larger percent of the fuel burns. Above 550 K all the fuel burns and the combustion duration decreases with increasing temperature. Varying in-cylinder surface temperatures can be achieved by varying the cooling effect of the engine coolant and/or the lubricating oil on the cylinder/piston assembly. Although cylinder wall temperature may be difficult to use as a lever for effectively controlling SOC, cylinder wall temperatures are one of the parameters considered when controlling SOC, particularly for starting or transient operation. Applicants have shown that there is a region of operating conditions where there are two stable solutions: one without combustion and cool walls, and one with combustion and hot walls. Also, varying the surface to volume ratio in the combustion chamber can change the heat transfer and, therefore, can be used to control the combustion.

By comparing a normally firing cylinder with wall heat transfer to a firing cylinder with adiabatic walls, wall heat transfer is seen to be the major contributor to spatial temperature distribution at TDC. Spatial temperature distribution is defined as the manner in which the temperature varies throughout a region, be it in the port, or in the cylinder at a particular crank angle. By varying the in-cylinder temperature distribution, the start of combustion and/or the overall combustion rate can be positively affected. One way to vary in-cylinder temperature distribution is to use split intake ports arranged so that some of the incoming air/fuel mixture is warmer/colder than the rest of the incoming mixture. Another method is to introduce hot spots in the cylinder or to use a glow plug 44 (FIG. 1*a*). Also, in-cylinder temperature distribution may be controlled by varying the temperature of the combustion chamber walls (e.g. the wall temperature of the cylinder liner, piston and/or engine head) by varying, for example, the temperature of the engine coolant, the temperature of the engine oil or the rate of cooling of the combustion chamber walls. As shown in FIG. 1*b*, the temperature of the engine coolant may be varied by controlling the flow through a coolant heat exchanger 46 positioned in the engine coolant circuit 47 by varying the flow through a bypass circuit 48 using a bypass valve 50. It was determined that wall heat transfer has similar impact on spatial temperature distribution for both firing and misfiring cylinders. Similarly, applicants also determined how residual temperature and wall heat transfer affect in-cylinder temperature distribution throughout intake and compression. The determination included three studies of the intake and compression events of an air and propane mixture. These studies revealed that, during most of intake and compression, hot residual is the main source of spatial temperature variation. However, near TDC compression, residual history is of minor importance compared to heat transfer with the walls in setting up temperature variations in the combustion chamber. As a result, it is believed that to promote a combustion event that uses more of the fuel that is available, fuel may be introduced in such a way that at SOC, fuel and air exist in proper proportion in regions where the temperature field is adequate to sustain combustion. Two areas where the temperature field is inadequate to sustain combustion are in the crevices and adjacent cooled surfaces. It is therefore desirable to keep the fuel away from both the crevices and cooled surfaces.

Figure 10:
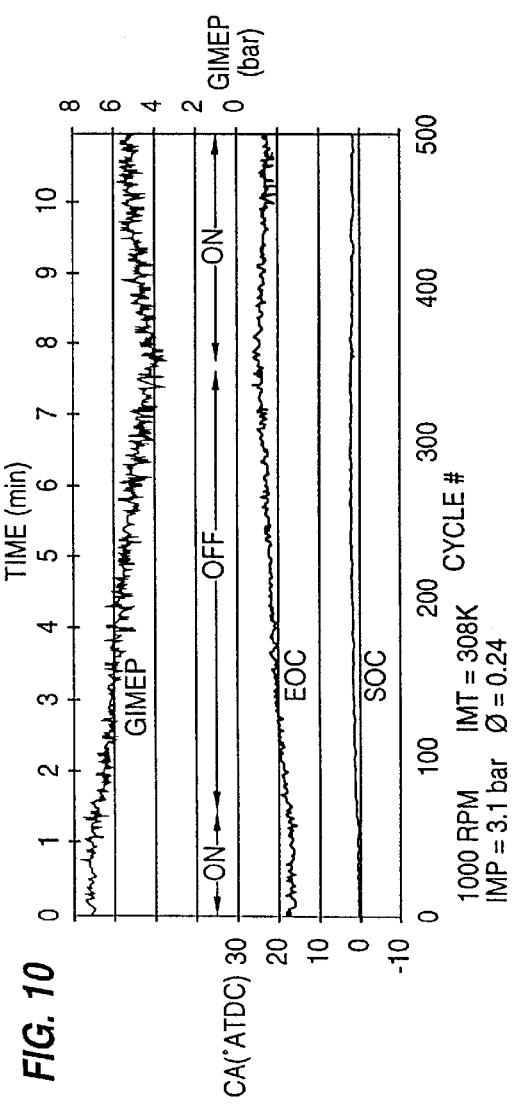
FIG. 10 is a graph showing both the start and end of combustion as a function of crank angle for a given time period, and GIMEP for the same time period, wherein a glow plug is cycled.
Figure 11:
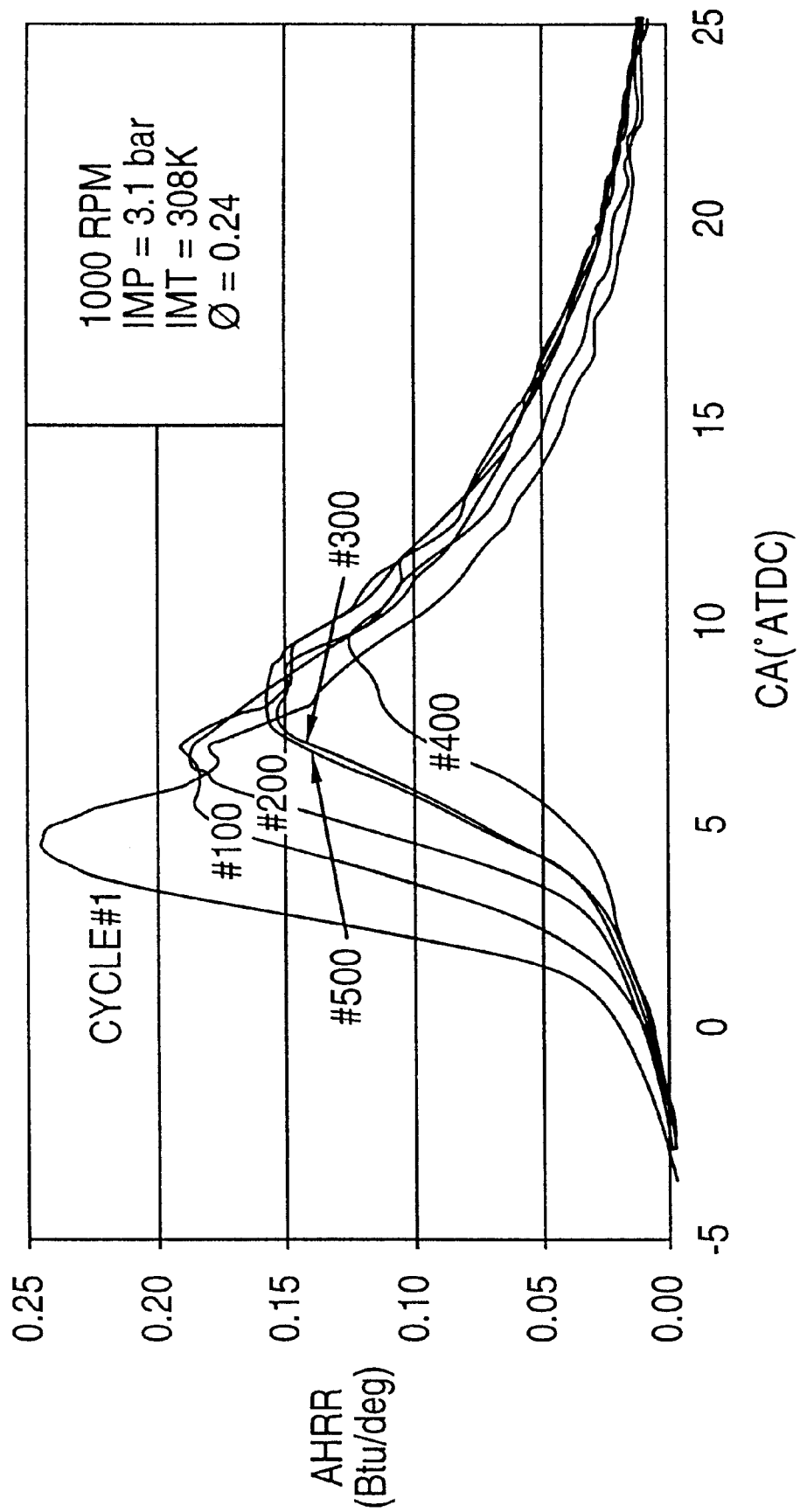
FIG. 11 is a graph showing the apparent heat release rate as a function of crank angle for the glow plug transient of FIG. 10.

Clearly, heat transfer into the in-cylinder mixture increases the temperature of the in-cylinder mixture thus advancing SOC. Applicants have shown that a glow plug can be used to effectively control the SOC to a small degree. As shown in FIG. 10, once the glow plug is turned off, the SOC and EOC retard slightly. Also, GIMEP decreases significantly since less fuel is being burned. The decrease in the amount of fuel being burned also results in a decrease in the heat release rate as shown in FIG. 11. Between cycles #1 and #100, the glow plug was turned off and remained off until a time between cycles #300 and #400, at which point it was turned back on. Perhaps most importantly, when the glow plug is turned off, the start of rapid combustion is significantly delayed without an increase in duration, which in combination with the decrease in heat release rate, causes the cumulative heat release to decrease. Thus, glow plug 44 (FIG. 1b) could be used to positively control combustion to a limited degree.

In any practical reciprocating engine, heat will be lost from the combustion chamber during the compression process. The heat loss depends upon many factors, but primarily upon engine speed and the temperature difference between inside and the outside of the cylinder. This heat transfer during the compression process becomes a problem for diesel engines during cold ambient starts as combustion can be difficult to initiate and sustain in cylinders where the combustion chamber surfaces are cold. Typically, the cylinders located at the ends of each bank of cylinders run the coldest and are the least likely to fire. It is quite common under such conditions for the charge in the end cylinders to fail to combust due to excessive heat exchange with the colder cylinder walls. With diesel engines, however, once all the cylinders warm up, combustion is quite consistent and much less dependent on combustion chamber surface temperatures.

Figure 12:
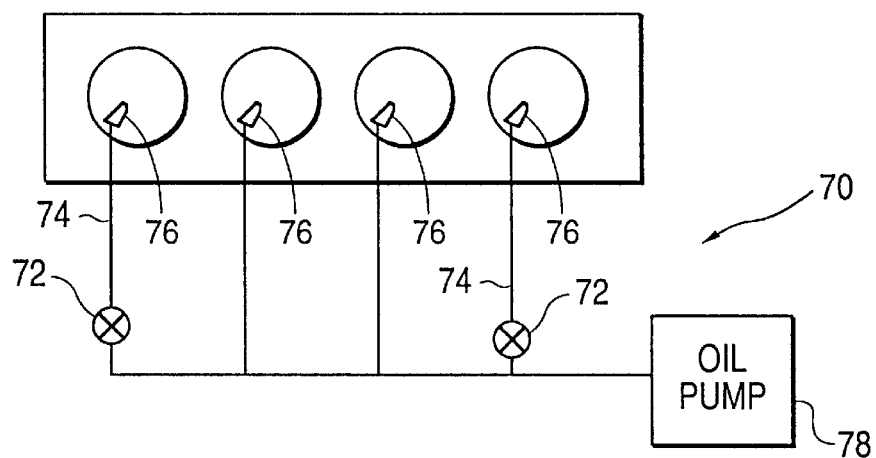
FIG. 12 discloses one embodiment of an end cylinder compensating system of the present invention for providing cylinder-to-cylinder temperature control.

With PCCI, the combustion process is initiated by obtaining a certain pressure and temperature "history". Thus, as discussed hereinabove, the PCCI combustion process is strongly dependent upon, and sensitive to, the surface temperatures of the combustion chamber. The present PCCI engine may include an end cylinder compensating means for achieving desired combustion chamber surface temperatures in the end cylinders to ensure better cylinder-to-cylinder temperature control thereby increasing the likelihood of stable combustion and very low NOx emissions. The end cylinder compensating means may include a system for reducing the effective cooling of specific cylinders, such as reducing piston cooling nozzle flow; increasing coolant temperature; or reducing coolant flow rate. Specifically, referring to FIG. 12, the end cylinder compensating means may include an oil flow control system 70 including oil flow control valves 72 positioned in branch flow passages 74 delivering cooling oil to piston cooling nozzles 76 from an oil pump 78. Thus, control valves 72 can be controlled to vary the flow of cooling oil to the piston assemblies to vary the temperature of the piston and thus favorably influence the in-cylinder temperature. Alternatively, flow restrictions could be used instead of valves 72, or the nozzles 76 associated with the end cylinders may be designed with a smaller effective flow area than the remaining nozzles to permanently reduce the flow to these piston cooling nozzles. In addition, if more than one nozzle 76 is provided as shown in FIG. 1a, the number of nozzles operating could be varied by controlling the respective control valves associated with each nozzle.

Figure 13:
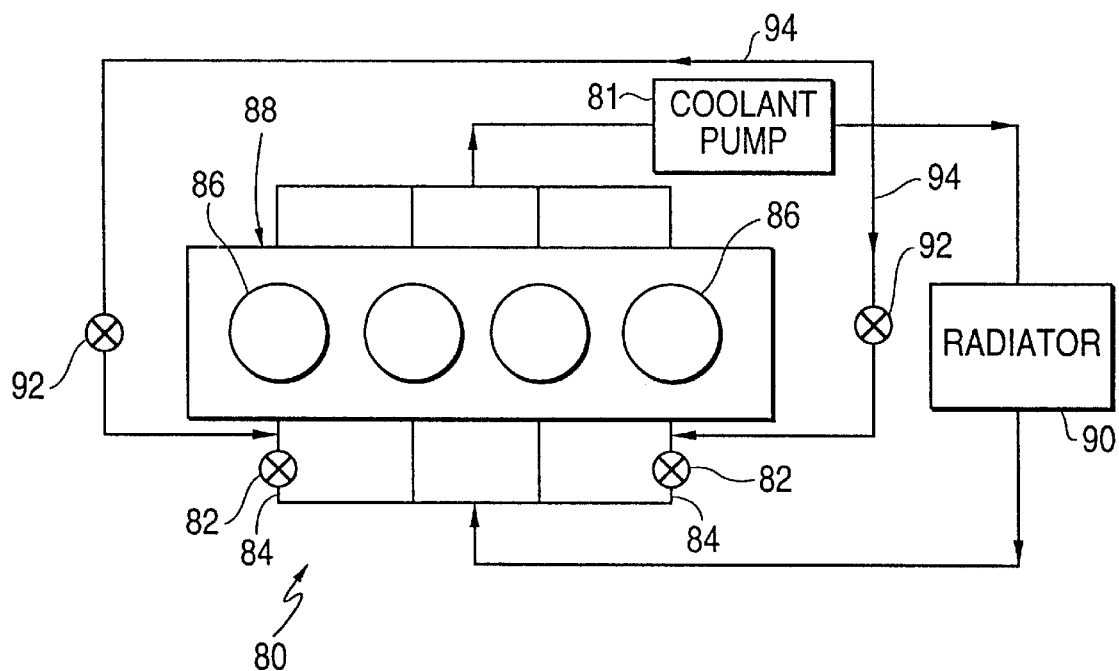
FIG. 13 is a schematic diagram of a second embodiment of the end cylinder compensating device for providing cylinder-to-cylinder temperature control.

Referring to FIG. 13, end cylinder compensating means may include an engine coolant flow control system 80 including a coolant pump 81 and coolant flow control valves or restrictions 82 positioned in branch passages 84 leading to the end cylinders 86 of the engine 88. The valves 82 are operated to reduce the flow of cold coolant delivered from a radiator 90. Also, control valves 92, positioned in hot coolant return passages 94, are used to control the flow of higher temperature coolant, bypassing radiator 90, and delivered directly to the end cylinders. These systems all function to control the flow of coolant to the end cylinders to compensate for the fact that they are cooled more by the ambient surroundings so that the total cooling to each end cylinder is equal to each of the other cylinders. These systems can be used to assist in cylinder warm-up to improve engine startability and to provide enhanced control of cylinder combustion and cylinder-to-cylinder balancing.

The end cylinder compensating means may, alternatively, or additionally, include end cylinders having an effective compression ratio nominally greater than the other cylinders to offset the extra heat loss. This compression ratio could be designed into the end cylinders so that the end cylinder compression temperature is equal to the middle cylinders. This approach is advantageous from a performance perspective since end cylinder combustion chamber surface temperatures would be enhanced for both start-up as well as warmed-up operation. This compression ratio difference may alternatively be accomplished through the camshaft valve lobe phasing. In this scenario, the end cylinders would have intake valve closing (IVC) near bottom dead center (BDC) so that the effective compression ratio (CR) is approximately equal to the geometric CR. The middle cylinders could then have a retarded IVC which would produce a lower nominal effective CR than the end cylinders. The effect of varying the compression ratio on PCCI combustion is discussed more fully hereinbelow.

One of the biggest challenges with premixed charge, compression ignition (PCCI) engine technology is in the placement of the heat release profile. Start of combustion with standard diesel or spark ignition engines is controlled with injection timing or spark timing. With PCCI engines, the start of combustion is dictated by the in-cylinder temperatures and pressures. As SOC timings near TDC (and after) are approached on the PCCI engine, the sensitivity to small geometric and/or operational variations in temperatures, pressures, etc. increase dramatically. As retarded heat release profiles are sought for PCCI engines (to minimize peak cylinder pressures and improve efficiency), the risk of misfire or partial burn increases dramatically. This is due to the fact that the cylinder temperatures decrease after top dead center due to the expansion of the charge. If autoignition has not yet occurred by TDC, autoignition will not likely occur much after top dead center. This problem is further aggravated if one cylinder begins to misfire. The misfiring cylinder cools down making it even more likely that the misfiring will continue.

In a multi-cylinder engine variations inevitably exist between cylinders with respect to compression ratio, wall temperatures, reheat and residual mass fraction. This variability makes it quite difficult to operate a PCCI engine with the desired retarded combustion timing while maintaining optimum combustion without having individual cylinders (which happen to be running slightly cool) begin to misfire.

Figure 14:
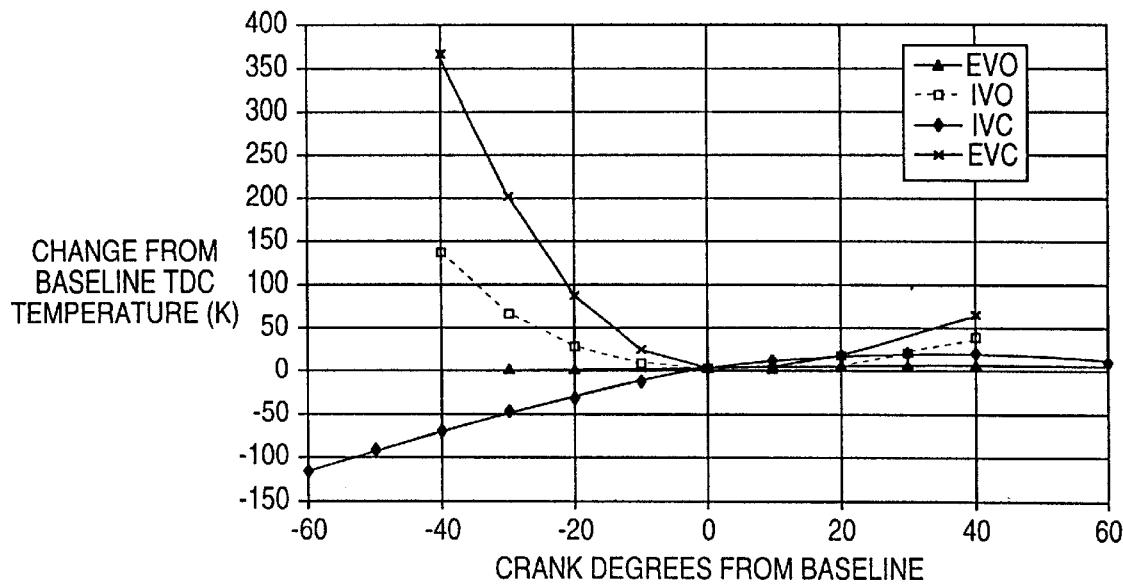
FIG. 14 is a graph showing the effects of changing intake and exhaust valve opening and closing events on top dead center (TDC) temperature.

Applicants have determined that manipulating valve events can have a significant effect on the temperature at TDC and therefore is an effective tool for controlling the start of combustion as suggested by analytical results shown in FIG. 14. Specifically, referring to Table I, varying valve events has the following effects:

TABLE I

| modified event | baseline | effect of advancing valve timing relative to baseline | effect of retarding valve timing relative to baseline |
| --- | --- | --- | --- |
| EVC | −357° | traps hot residual which advances SOC | exhaust blown back into intake which advances SOC |
| EVO | 135° | no effect | no effect |
| IVC | −167° | Miller cycle - lowers effective CR which retards SOC | at these particular conditions, retarding slightly improves breathing; retarding further reduces effective CR which retards SOC |

TABLE I-continued

| modified event | baseline | effect of advancing valve timing relative to baseline | effect of retarding valve timing relative to baseline |
|---|---|---|---|
| IVO | 341° | allow hot exhaust to flow into intake which advances SOC | restricts flow from intake manifold which has minimal effect on SOC |

Figure 15:
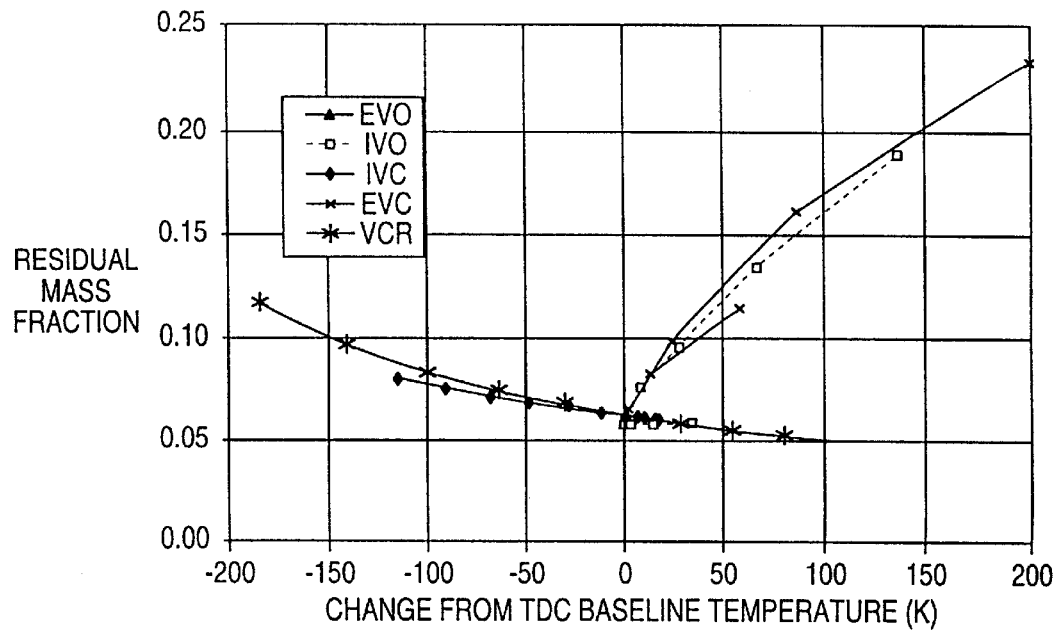
FIG. 15 is a graph showing the effects of changing intake and exhaust valve opening and closing events, and variable compression ratio, on the residual mass fraction and temperature at top dead center.

As shown in FIG. 15, exhaust valve closing (EVC) plays a significant role in determining the amount of combustion products that remain in, or are made available to, the combustion chamber from one combustion event to the next event, i.e. the residual mass fraction (RMF). The residual exists at a higher temperature than the incoming charge and therefore heats the charge for the next combustion event. Thus, the timing of exhaust valve closing can be used to adjust the in-cylinder temperature and therefore controlling the SOC. In order to "heat up" a cold cylinder (e.g. one that is beginning to misfire) the residual mass fraction can be increased in the individual cylinder by an early exhaust valve closing event. These hot residuals will increase the reheat of the incoming charge and tend to advance the start of combustion thereby, for example, restoring a misfiring cylinder. As shown in FIG. 15, advancing EVC traps hot residual in the cylinder while retarding EVC allows hot exhaust to be blown back into the cylinder (in this case, exhaust manifold pressure (EMP)>IMP). The baseline EVC is the optimum of these two effects: trapping the minimum amount of residual and resulting in the lowest TDC temperature. Similarly, advancing IVO allows some of the hot residual in the cylinder to be blown back in to the intake, again because EMP>IMP, causing the TDC temperature to increase. Lowering compression ratio, discussed more fully hereinbelow, by, for example, advancing IVC, will also increase residual in the cylinder, but to a lesser extent. Adjusting the timing of exhaust valve closing may also be used to effectively compensate for the small geometric and operational variations between the cylinders to permit the engine to be "tuned" cylinder-to-cylinder. Any other means for effectively increasing or decreasing the RMF may be used to advance or retard the SOC, respectively.

Figure 16:
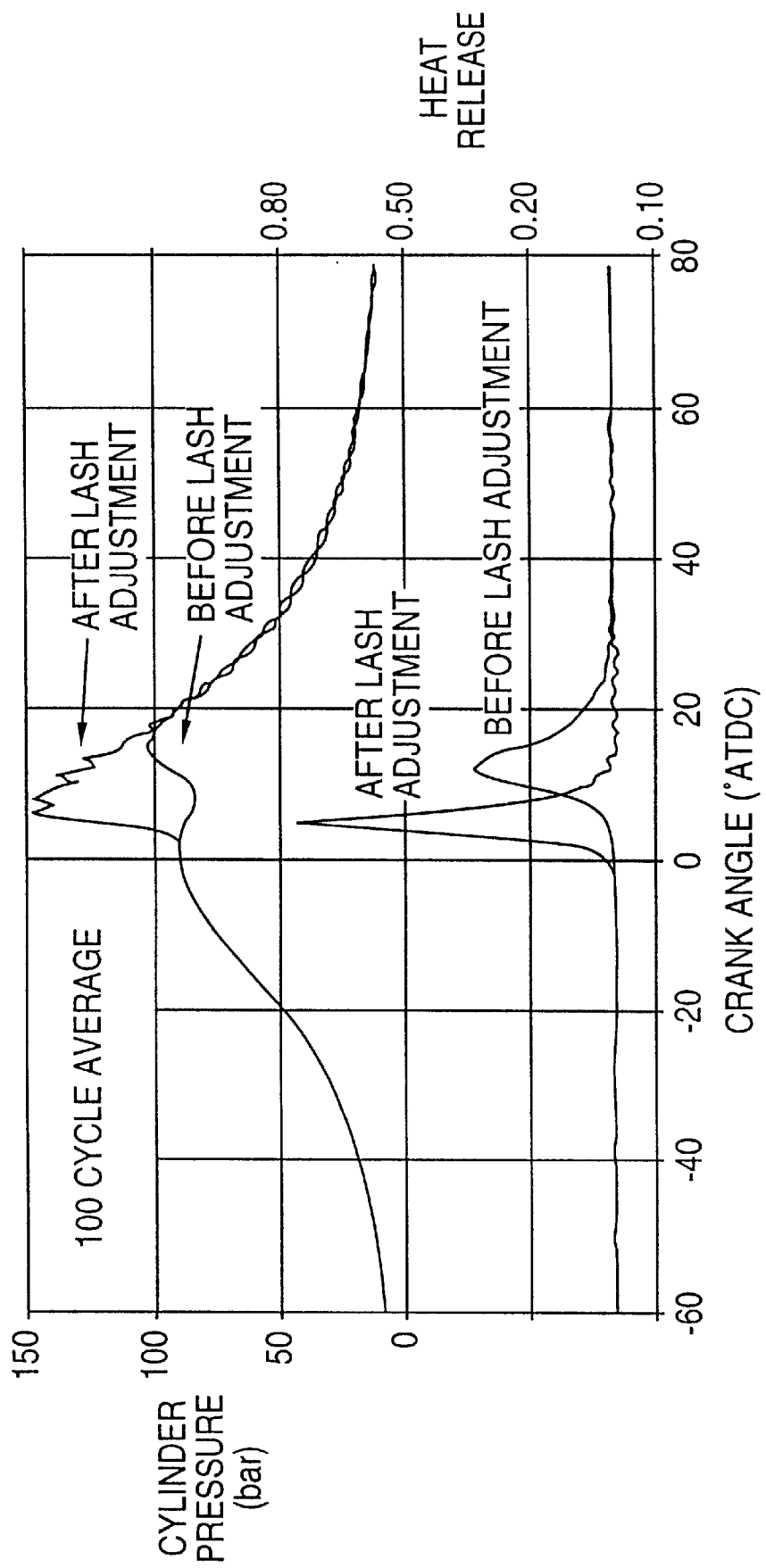
FIG. 16 is a graph showing both cylinder pressure and heat release as a function of crank angle for different exhaust valve lash settings.

One method of implementing this strategy has been successfully tested on a multi-cylinder PCCI engine. This technique involved the increase of the exhaust valve lash setting. Opening up the lash effectively closes the exhaust valve early and advances the start of combustion as desired. Applicants have determined that reducing the exhaust valve event by 10 degrees leads to slightly higher surface temperatures and 22 degree warmer inlet temperatures. Given the dramatic effect that 22 degree IMT swings have on combustion (FIGS. 7c–7f), this method would indicate a potential for tuning the multi-cylinder engine with valve lash adjustments. As shown in FIG. 16, shortening the duration that an exhaust valve is open by increasing the lash does indeed advance combustion. Ultimately, cylinder-to-cylinder variations can be controlled passively by any means which can adjust the static exhaust valve closing. It could also be controlled actively if it is coupled with some diagnostic measurements. If control exists on all cylinders then this technique could also be used to effect the overall start of combustion within the engine.

Another method of controlling in-cylinder temperature by controlling the residual mass fraction (RMF) is to compress a pocket of residual gas from the previous cycle in a chamber positioned separate from the incoming charge. The proportion of trapped residual to fresh charge can be manipulated by the size of such a chamber. The mass of hot exhaust could be as large as (½)(1/CR) and therefore ≈1/30 of the chamber mass if all the TDC volume is in such a chamber. The structure of such a chamber will have to be managed to make at least a portion of the hot gas survive the compression process without completely mixing with the incoming charge. If the trapped exhaust is mixed very early in the compression process, the high temperature required to initiate the fast reactions will not be reached. The timing of flows into and out of such a chamber may help manage the timing of the beginning of rapid energy release in cylinder. Additional sources of local heat input may be able to supply such a fast reaction initiation. This might be a heated glow plug or a thermally isolated mass.

The residual mass fraction is also sensitive to the exhaust manifold back pressure (EMP). By increasing EMP relative to IMP, the residual mass fraction can be increased thus increasing the temperature of the charge which, in turn, advances combustion. Applicants have determined that raising EMP does have the expected result of advancing SOC. However, applicant also showed that SOC advanced only by about 4° with a 3 bar increase in EMP for a four cycle engine. Applicants have determined that the increase in temperature is nearly linear with increase in EMP, with all other things being held constant. For a 1 bar increase in EMP, temperature at TDC increased about 10 K. Therefore, considering the practical range of EMP, controlling EMP seems to be a relatively weak lever in controlling SOC on a four cycle engine. Moreover, a very substantial BSFC penalty is paid when using EMP to increase TDC temperature in a four cycle engine. The BSFC would be significantly higher than using either exhaust valve closing or variable compression ratio. Although the effect of increasing EMP is the same as advancing EVC, i.e. trapping more hot residual mass in the cylinder, the BSFC is much higher because, when EMP is increased, the piston has to work against that pressure through the entire exhaust stroke. If the engine has turbomachinery, then further complications would arise with trying to use EMP to control SOC. However, using an exhaust restriction may still be viable on a two-cycle engine.

Figure 17:
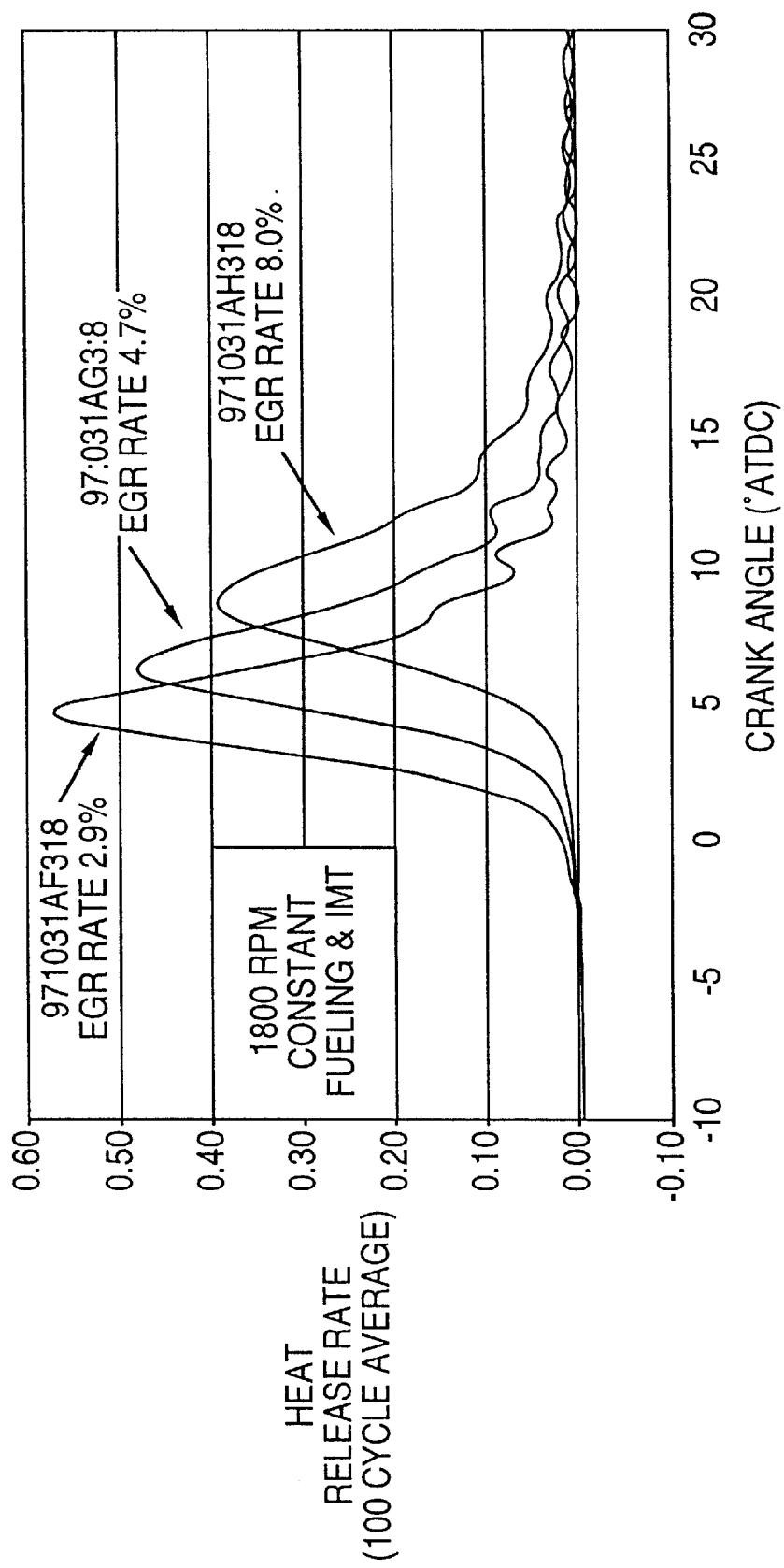
FIG. 17 is a graph showing the effects of varying exhaust gas recirculation (EGR) on the location of the heat release rate relative to the crank angle and the effect of variations in EGR on the magnitude of the heat release rate.
Figure 18:
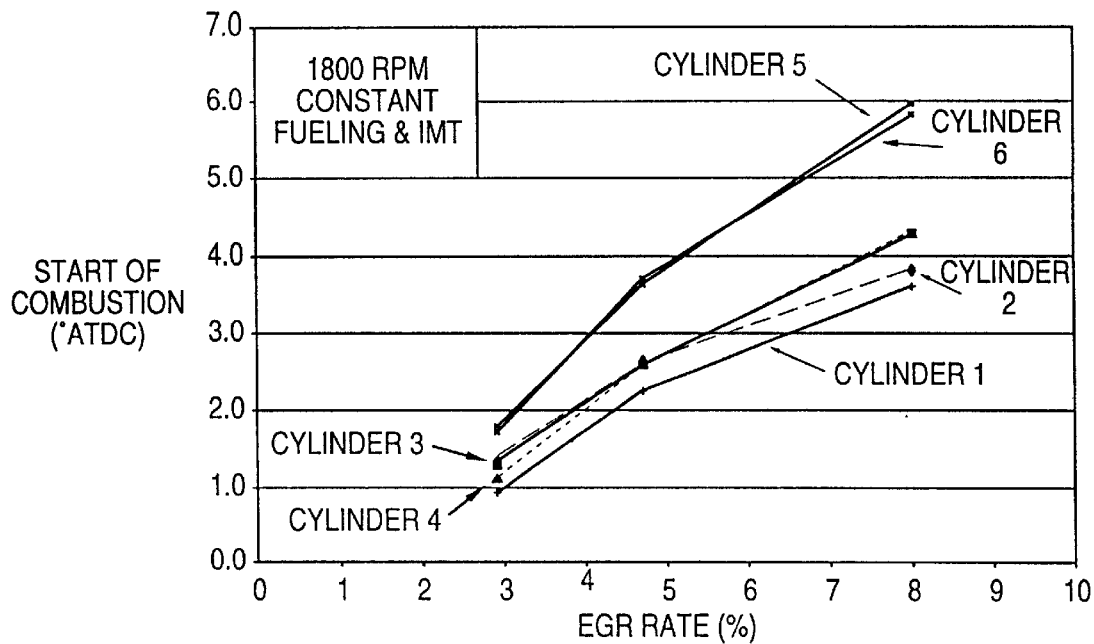
FIG. 18 is a graph showing the effect of varying the EGR rate on the timing of the start of combustion.

Another important way to control intake temperature is by using hot exhaust gas recirculation (EGR). As shown in FIG. 1b, a high pressure EGR circuit 54 may be used to direct hot exhaust gas from upstream of turbine 25 into the intake system 23. EGR circuit 54 includes a high pressure EGR control valve 60 for controlling the recirculation of exhaust gas. A low pressure EGR circuit 62 and control valve 64 may be used to direct a flow of low pressure EGR from downstream of turbine 25 into the intake system 23. Applicants have shown that EGR is especially effective in increasing the intake manifold temperature when introduced upstream of the compressor 24 (assuming the effect of adding EGR is not cancelled by additional charge air cooling). Exhaust gas recirculation (EGR) has more utility in PCCI engines because the exhaust gas of such an engine will contain less particulates and thus the exhaust gas can be recirculated to the ideal upstream location (intake of compressor of turbocharger). The intake of the compressor is the best location because the pressure differential is almost always favorable. The fresh intake air and hot EGR mixture will get compressed by the compressor thereby providing heating and mixing. By introducing the EGR upstream of the compressor and increasing the compressor inlet temperature, the result is a much higher compressor outlet temperature than if the EGR is introduced after the compressor. Introducing EGR into the intake of the compressor is very difficult in normal diesel engines because the particulates in the exhaust gases of the engine "gum up" the compressor. In a PCCI engine, however, the virtually particulate free exhaust could be introduced upstream of the compressor without significant problems. Also, as shown in FIGS. 16, 17 and 18, applicants have determined that, regardless of the technique used to introduce exhaust products, e.g. EGR, RMF, etc., by adding exhaust products while maintaining the temperature of the charge by, for example, injecting a cooling diluent, such as air and/or water, the combustion rate can be slowed thus increasing the combustion duration, retarding combustion and decreasing the amount of heat release.

Figure 19:
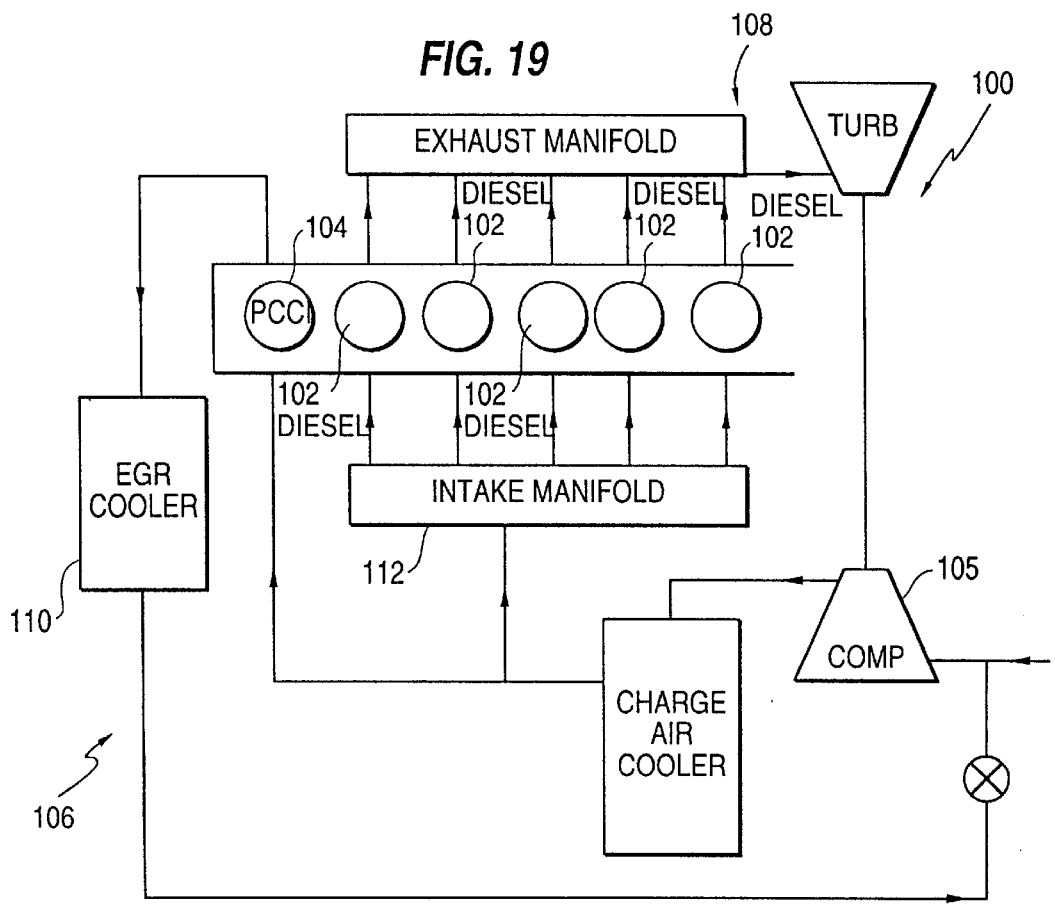
FIG. 19 is a schematic of an improved engine of the present invention having one cylinder operating under PCCI conditions to optimize the use of EGR.

Referring to FIG. 19, an improved engine 100 is shown which benefits from the PCCI engine and control system of the present invention by operating a limited number of a plurality of cylinders in a PCCI mode while operating the remainder of the cylinders in a diesel mode. Specifically, for example, five cylinders 102 in a six cylinder engine may be operated in the diesel mode while one cylinder 104 is operated in a PCCI mode. This engine also includes an EGR system 106 associated only with the PCCI cylinder 104 and separate from an exhaust system 108 associated with the diesel cylinders 102. The pressure of the piston in the PCCI cylinder 104 is used to force the exhaust gas into the intake system. The EGR system 106 includes an EGR cooler 110 utilizing, for example, engine coolant, which cools PCCI exhaust gas before recirculating the gas to the upstream side of a compressor 105. Of course, the exhaust gas could be delivered to the intake manifold 112 serving only diesel cylinders 102. A well known problem confronted in the use of EGR in diesel engines is the excessive amounts of particulates and NOx present in diesel engine exhaust gas. The improved engine 100 permits a diesel engine to benefit from EGR while substantially avoiding the drawbacks associated with heavy particulate diesel exhaust thereby providing a less complex and costly system. For example, as discussed hereinabove, the PCCI EGR from cylinder 104 could more easily be introduced upstream of the compressor without fouling the compressor. Also, the low NOx emissions of the PCCI EGR reduce the formation nitric acid thereby reducing corrosion in the engine. Applicants have shown that the engine of FIG. 19 lowers the brake specific NOx emissions while only negligibly increasing the brake specific fuel consumption.

Figure 20:
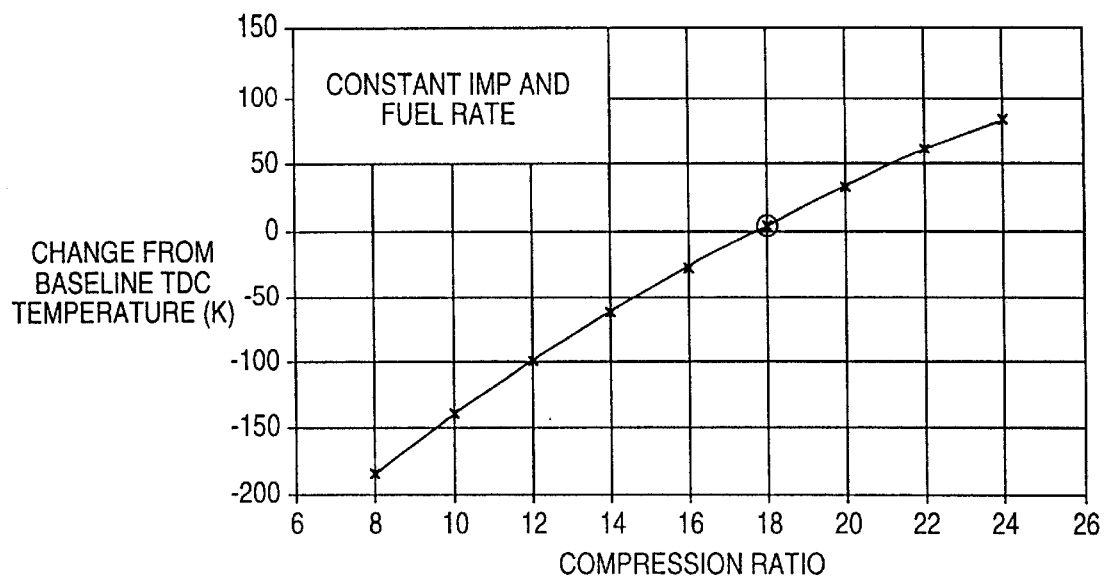
FIG. 20 is a graph showing the effects of changing compression ratio on the temperature at top dead center.
Figure 21:
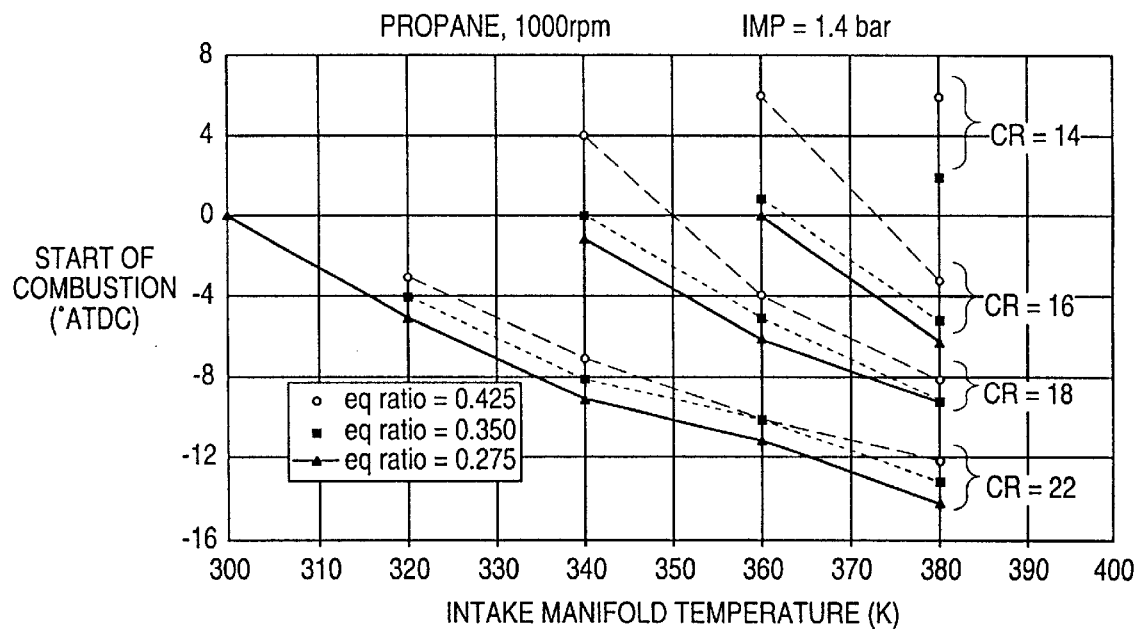
FIG. 21 is a graph showing the start of combustion as a function of intake manifold temperature and the effects of changing the compression ratio on the start of combustion and intake manifold temperature.

Perhaps one of the most effective control features for varying the temperature at TDC and therefore the SOC is variable control of the compression ratio (CR) of a cylinder. By varying the effective or the geometric compression ratio, both the temperature and the pressure histories can be controlled. Increasing the compression ratio advances the combustion event. Decreasing the compression ratio retards it. For certain purposes, the compression ratio may range from 24:1 (to promote cold starting) to 12:1 (to permit control over the start of combustion and limit the peak combustion pressures). The range of compression ratios would depend on, among other factors, the type of fuel used (more specifically its autoignition properties), for example, natural gas or propane. Applicants have determined the effect of compression ratio on PCCI combustion. For example, referring to FIG. 20, applicants have shown that varying the compression ratio is a large lever in changing in-cylinder temperature and therefore SOC. As shown in FIG. 21, applicants have shown that variations in compression ratio significantly affects the location of the SOC relative to TDC.

The compression ratio can be varied by varying the geometric compression ratio, i.e. using a control mechanism to vary the physical dimensions/shape of the combustion chamber. The present invention includes a compression ratio varying device 38 for varying the geometric or the effective volume of the combustion chamber during engine operation to achieve a desired SOC. The compression ratio varying device may be a mechanical device for causing compression heating of the charge near TDC by changing the geometric volume of the combustion chamber. As shown in FIGS. 22a–22d, the compression ratio varying device may include a movable auxiliary piston or plunger which moves to extend into the combustion chamber at a crank angle near TDC to decrease the combustion chamber volume thereby increasing the compression ratio and heating the charge sufficiently to allow ignition to start. The key function of the plunger is to displace some of the charge near TDC. Therefore, the shape and location of the plunger in the combustion chamber will not be critical to its function, except to the extent that the plunger affects the crevice volume.

The size of the plunger will be based on the desired compression ratio control range and may be estimated by the following example:

Swept volume (displacement) per cylinder=1,000 cc=1 l.
TDC clearance volume=100 cc
Compression ratio=(1000 cc+100 cc)/100.0 cc=11.0
If the plunger volume=30 cc, then the effective compression ratio with plunger fully extended=(1000 cc+100 cc)/(100 cc−30 cc)=15.7.

For a given set of conditions, the modified compression ratio should be sufficient to allow a large enough increase in temperature and pressure to cause compression ignition for a fuel/air mixture that would not ignite without the plunger. Of course, the engine's compression ratio and the size of the plunger are easily changed during the design stage of the engine. Also, different fuels and intake temperatures could require different plunger sizes and compression ratios.

As shown in FIG. 22a, the plunger 150 may be positioned in a bore 152 in the cylinder head 154 and operated by a cam 156 rotated in predetermined timed relationship to the movement of the engine piston 158. A retraction spring 160 biases the plunger toward cam 156 to increase the size of combustion chamber 162. This particular arrangement is advantageous in that cam driven plunger 150 can put work back into the camshaft as the plunger retracts. Also, some of the work that plunger 150 does on the charge can be extracted by the engine piston, as long as plunger 150 does not retract until late in the expansion stroke, or after the expansion stroke.

Alternatively, referring to FIG. 22b, a plunger 170 may be hydraulically operated by a pressurized supply of fluid, e.g. fuel, delivered to a chamber 174 by a hydraulic circuit 172 connected to, for example, a jerk pump or common rail system. FIG. 22c, illustrates another hydraulically actuated embodiment in which a plunger 180 is assisted by a spring 182, positioned in a chamber 184 formed adjacent one end of plunger 180, to allow energy to be stored in the spring. In this system a retaining mechanism, e.g. hydraulic, electromagnetic or mechanical, (not shown) maintains the plunger in the unextended position. When the piston is near TDC, a hydraulic fluid supply system 186 forces plunger 180 down (at this point the retaining system no longer holds the plunger). This downward motion is heavily assisted by spring 182. After combustion, plunger 180 moves back up recompressing spring 182 thereby returning energy to the spring. To optimize this energy extraction process, the hydraulic chamber 184 bleeds down at a rate controlled by a valve 188.

FIG. 22d illustrates yet another embodiment in which a spring 190, biasing a plunger 192 into the extended position, is strong enough to overcome the gas pressure in the combustion chamber before combustion. Near TDC, a bleed down valve 194, connecting a chamber 196 is opened and the spring 190 pushes plunger 192 into the extended position in the combustion chamber 162 causing the charge to ignite and the pressure in the combustion chamber 162 to increase. As a result, plunger 192 is pushed back up against spring 190. If needed, a high pressure supply 200 supplies hydraulic fluid to chamber 196 to ensure plunger 192 moves back up into the retracted position. If the gas pressure is sufficient to move the plunger back up into the retracted position, a low pressure hydraulic fill supply 202, including a one-way valve 204, may be used to fill the chamber 196 below plunger 192.

Figure 23:
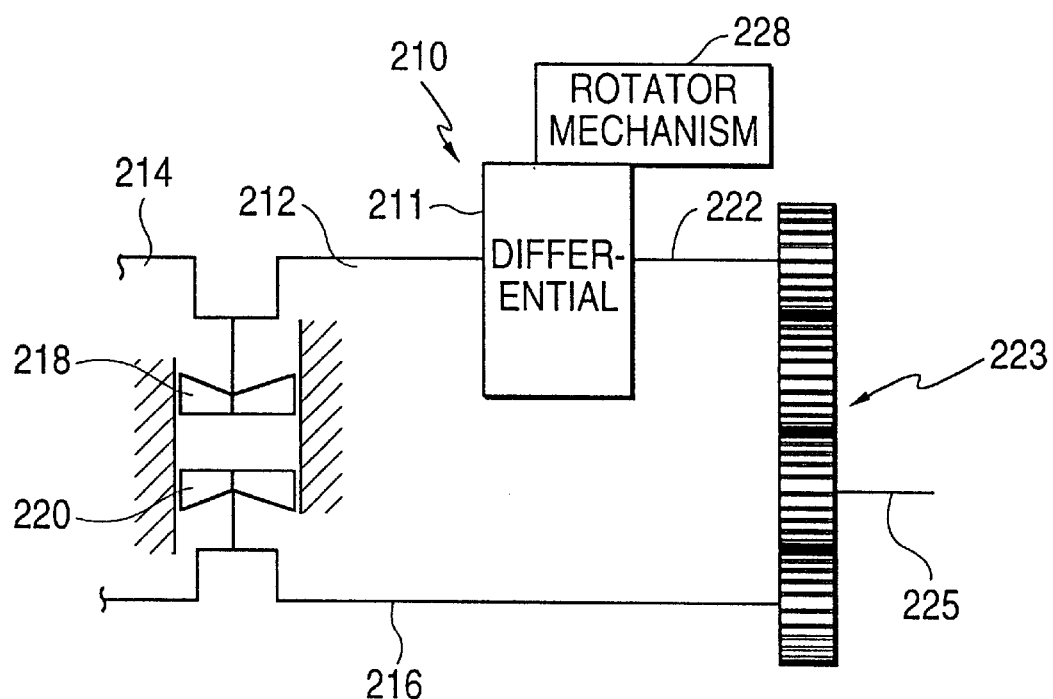
FIG. 23 is a schematic diagram of an opposed piston PCCI engine of the present invention including a variable phase shifting mechanism for varying the compression ratio.
Figure 24:
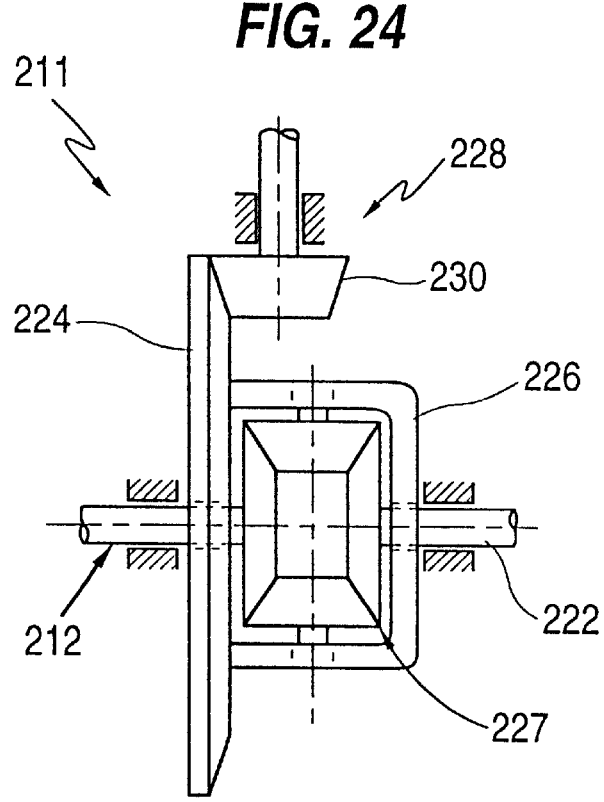
FIG. 24 is a side view of the differential mechanism used in the variable phase shifting mechanism of FIG. 23.

The compression ratio may also be varied by providing an opposed piston engine design having variable phase shifting to permit the compression ratio to be varied during operation by changing the phase of rotation between two crankshafts. The opposed piston engine may be of the type disclosed in U.S. Pat. No. 4,010,611 or of the interconnected cylinder type with variable phasing as disclosed in U.S. Pat. No. 4,955,328, the entire contents of both of these references being hereby incorporated by reference. Alternatively, referring to FIG. 23, the compression ratio could be varied using a phase shifting mechanism 210 including a conventional differential assembly 211 connected between an input shaft portion 212 of one of the crankshafts 214, 216 associated with respective pistons 218, 220 and an output shaft portion 222 of the same crankshaft 214 to permit the portions of the crankshaft to be rotatively shifted relative to one another. Crankshafts 214 and 216 are connected via a conventional gear assembly 223 for transferring power to a driven shaft 225. As shown in FIG. 24, the differential 211 includes a ring gear 224 mounted on one end of input shaft portion 212, an arm 226 extending from ring gear 224 and a gear assembly 227 mounted on the opposing ends of shafts portions 212, 222. A rotator mechanism 228, including a pinion gear 230, is operatively connected to ring gear 224 to rotate the ring gear when a change in the phasing between the crankshafts is desired. As long as ring gear 224 remains stationary, shafts portions 212, 222 remain in phase. When ring gear 224 is rotated by rotating pinion gear 230, arm 226 rotates causing a change in the phasing between shaft portions 212, 222. The rotator mechanism 228 would, therefore, be used to adjust the relative phasing of the input shaft to the output shaft, thereby adjusting the phasing of the two crankshafts and the compression ratio. In addition, two crankshafts per cylinder could be used to eliminate the inherent side thrust imparted by the crankarm in the single crankshaft design. The effect of the maximum possible compression ratio on the sensitivity to CR on phasing should be noted. It might be advantageous to have a geometry where the pistons interfere with each other at "zero" phasing. Of course, this set up would operate with non-zero phasing all the time.

Figure 25:
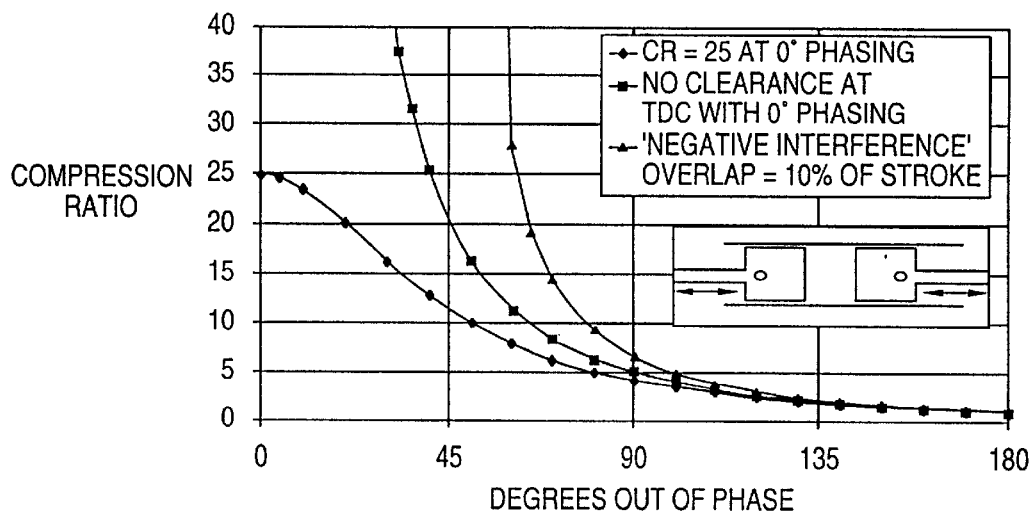
FIG. 25 is a graph showing compression ratio as a function of the degrees out of phase of two pistons in the opposed piston engine, for example, of FIG. 23 illustrating various compression ratio settings.

Applicants have determined how the change in phasing of an opposed piston engine changes the compression ratio. This effort includes three studies as shown in FIG. 25. In the first, when the two pistons were in phase, i.e. both pistons reach TDC at the same time, the compression ratio was 25:1. In the second, when the pistons were in phase they would come together and just touch at TDC. With a flat top piston there would be no volume between the pistons and, assuming no crevice volume, the compression ratio would become infinite. The third case assumes negative interference so that the pistons would come in contact while out of phase to some degree. For this case, the overlap was about 10% of the stroke causing the pistons to contact at 46° out of phase. Of course, engine geometry (bore, stroke, connecting rod length) will also effect CR versus phasing; these values were kept constant in this study.

These results indicate that the compression ratio could be varied over a very large range using an opposed piston arrangement with variable phasing. Also, the slope of the change in compression ratio with phasing depends on the amount of clearance or negative clearance between the pistons at TDC with 0° phasing. Thus, in a practical application, it would be desirable to strike a balance between the range of phasing needed to cover the desired range of compression ratio and the precision with which the phasing needs to be controlled, i.e. the slope of the curve in FIG. 25 should be optimized. Thus, ideally, the slope of the curve would be steep enough that the desired range of compression ratio could be achieved within a limited amount of phasing, and not so steep that the phasing needs to be too precise.

Figure 26:
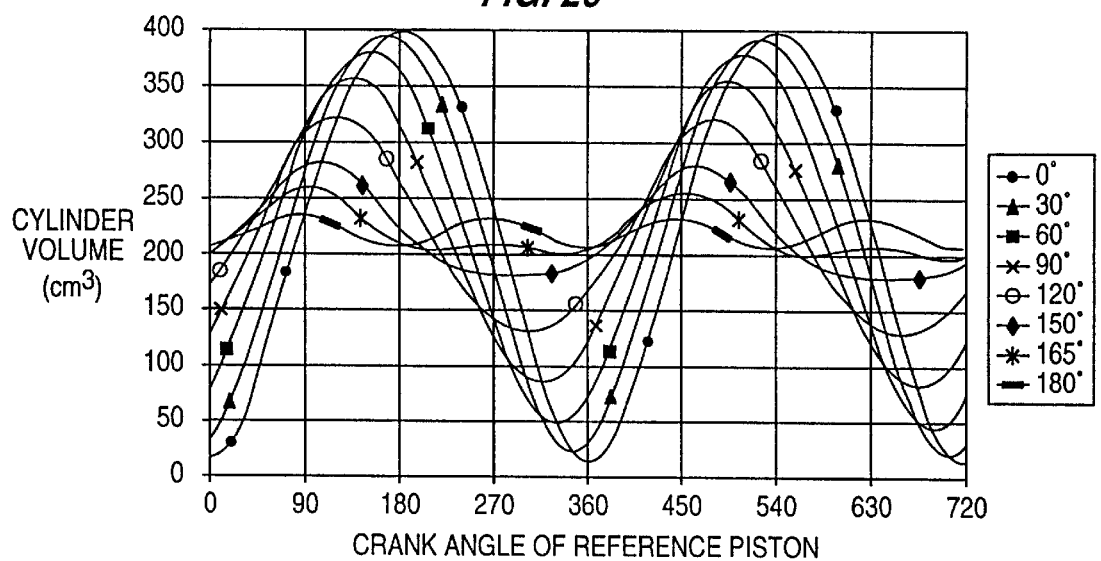
FIG. 26 is a graph showing cylinder volume as a function of crank angle of a reference piston in an opposed piston PCCI engine which shows that the compression ratio decreases as the pistons become more out of phase.

Referring to FIG. 26, it is very clear that as the pistons become more and more out of phase that the compression ratio decreases. It is also clear that there is very little change in shape of the cylinder volume versus crank angle curve for phasing angles less than about 120°. As a result, the variation in phasing can be used to control compression ratio over a large range without any affect in the cylinder volume versus crank angle. An opposed piston system with variable phasing clearly provides the desired flexibility to achieve a broad range of compression ratio values.

The effective compression ratio may be varied with variable valve timing. Specifically, as shown in Table I, advancing of the intake valve closing lowers the effective CR while significant retarding of the IVC also reduces effective CR. However, changing valve events can have a very large effect on the breathing of an engine, and thus the air/fuel ratio, in comparison to varying the geometric compression ratio (assuming that the fuel flow rate is held constant). The steepest change in airflow with TDC temperature is when IVC is changed. As IVC becomes earlier, the TDC temperature is lowered, but airflow is severely restricted possibly undesirably changing the equivalence ratio. In this case, an increase in boost accompanying earlier IVC could be used to maintain a constant air flow rate. Similarly with EVC, as EVC is changed the amount of residual trapped in cylinder changes, and therefore breathing is affected. The slope of the IVC line is roughly twice that of EVC and IVO while varying the geometric compression ratio does not have an effect on airflow. In terms of changing TDC temperature without effecting airflow, variable geometric compression ratio appears to be the most effective of the control features.

Figure 28:
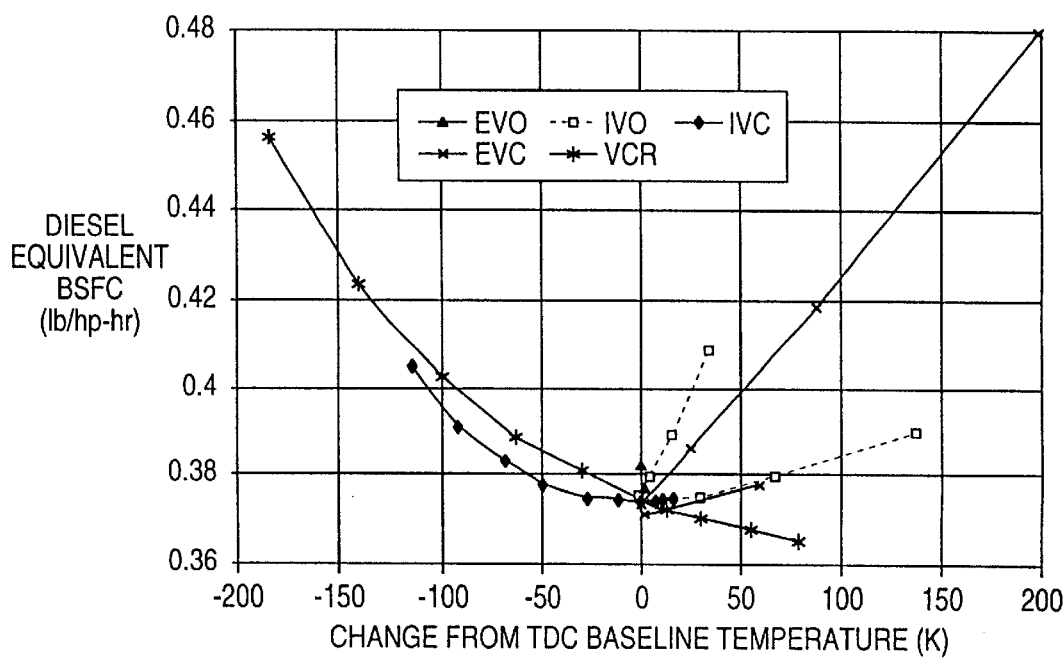
FIG. 28 is a graph showing the effects of changes and intake in exhaust valve opening and closing events, and varying the compression ratio, on the diesel equivalent brake specific fuel consumption and TDC temperature.

Referring to FIG. 28, changing any of the valve events or compression ratio has a definite effect on BSFC. In order to get the best BSFC, increasing compression ratio would be a better choice than changing exhaust valve closing when a higher temperature is needed. A very large BSFC penalty would be paid if EVC is advanced to increase the temperature at TDC. If a lower temperature is needed, advancing IVC is the best method whereas varying the geometric compression ratio could also be an option since it results in only somewhat higher BSFC.

Figure 27:
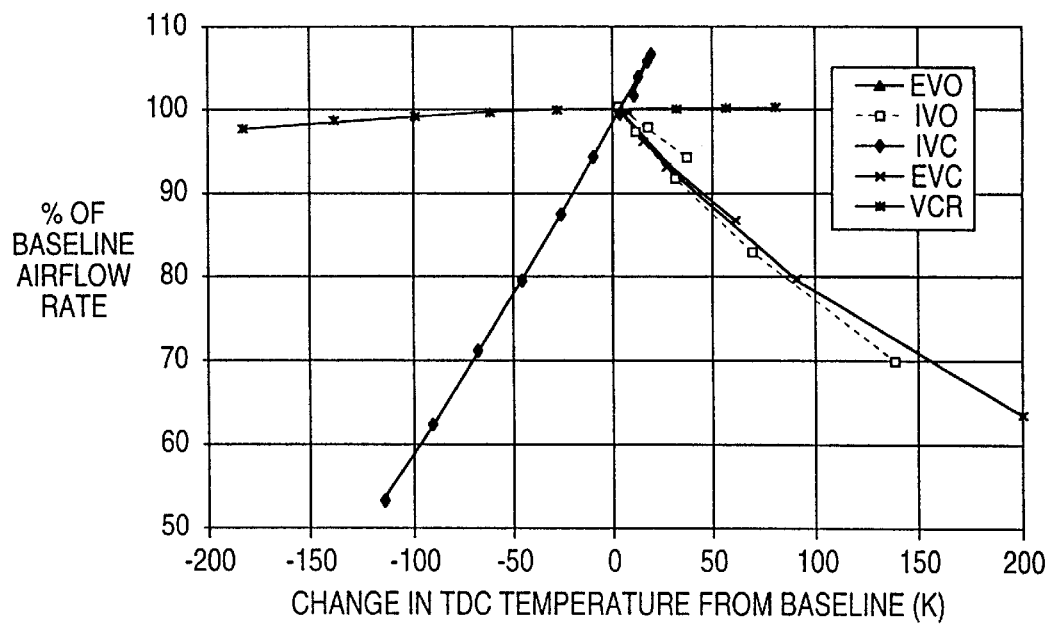
FIG. 27 is a graph showing the effects of changing intake and exhaust valve opening and closing events, and varying the compression ratio, on the percent of baseline airflow rate and the TDC temperature.
Figure 29:
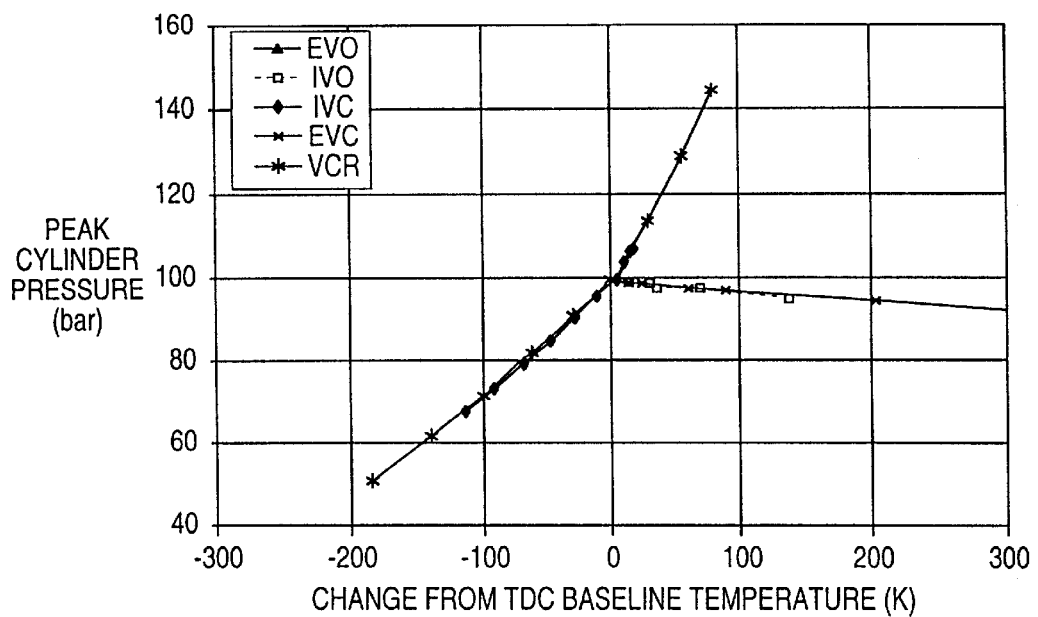
FIG. 29 is a graph showing the effects of changes and intake in exhaust valve opening and closing events, and variations in compression ratio, on peak cylinder pressure and TDC temperature.

Applicants have also determined, as expected, that changing the effective compression ratio has a large effect on peak cylinder pressure, as shown in FIG. 29. IVC has an almost identical curve as VCR, confirming the fact that changing IVC really changes the effective compression ratio. Because the heat release starts 5° ATDC in this case, the cylinder pressure trace appears to be "double-humped": the first peak at TDC is due to compression; the second peak after TDC is due to combustion. The appearance of two slopes of VCR and IVC lines is due to the absolute peak cylinder pressure occurring either on the combustion hump (CR<18) or the compression hump (CR>18). In order to increase the temperature at TDC from the baseline without undesirably affecting peak cylinder pressure, changing EVC or IVO would be the best strategy. However, this strategy may result in an undesirable increase in BSFC (FIG. 28) and may also change the engine breathing (FIG. 27).

Applicants have also determined that very high compression ratios are needed for combustion at low intake temperatures. For example, it has been found that at intake temperatures of 0, 20, and 40° F., no combustion occurs when the corresponding compression ratios are below 35, 33, and 30, respectively. At warmed up conditions, the desired compression ratio is approximately 15, which means that a change of approximately 20 compression ratios would be needed to cover these conditions. Due to the very high compression ratios required under these conditions, peak cylinder pressures are also high and in some cases greater than 200 bar. As a result, intake air heaters and/or some other method of starting in cold conditions may be more practical than using variable compression ratio alone. Also, maintaining a lower compression ratio will allow a higher GIMEP to be achieved before hitting the peak cylinder pressure limit.

Figure 30:
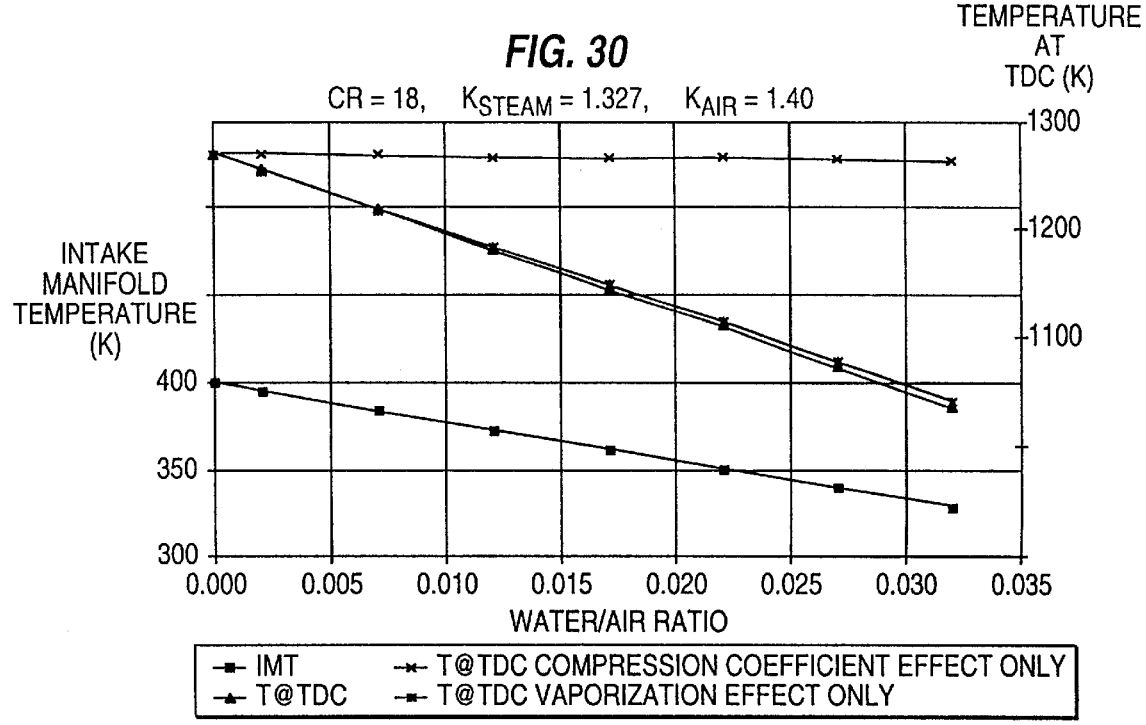
FIG. 30 is a graph showing the effects of water injection on intake manifold temperature and temperature at top dead center.

Another method of controlling the temperature is to introduce water into the intake manifold or directly into the cylinder. Applicants have shown that when the nitrogen in the intake air is completely replaced with water, the water will likely result in a lower flame temperature (205 K lower) due to dissociation. Also, in applicants study, the ignition delay increased slightly (by 0.04 msec) and the peak reaction rate dropped by about 50%. Also, when water was added into the intake manifold, e.g. water fumigation, the chemical effect, although small, is to slightly retard the SOC. However, liquid water injection into the intake manifold effectively cools the intake manifold due to the vaporization of the liquid to steam. As a result, IMT and TDC temperatures are significantly decreased as shown in FIG. 30. The impact of water injection on temperature at TDC is mostly due to the decrease in IMT, not due to the change in the ratio of specific heats. The effect on IMT should be viewed as an upper limit.

It should be noted that applicants have shown that PCCI can be maintained without adverse thermal effects on the piston 14 (FIG. 1a). Even though PCCI combustion can create knock intensity levels 10–20 times higher than the safe level experienced in spark-ignited engines, both aluminum and steel pistons do not reach excessive temperature levels. In applicants' preferred embodiment, the temperatures resulting from autoignition in PCCI combustion are much lower than the temperatures experienced in spark-ignited engines since, in applicants' preferred embodiment, PCCI combustion operates under such lean conditions.

Pressure Control

The SOC may also be controlled by controlling the pressure in the combustion chamber. One way of controlling in-cylinder pressure is to use a compression ratio varying device to vary the pressure in the combustion chamber. Although varying the compression ratio ultimately varies both the pressure and temperature of the charge, the pressure is directly changed. An increase in the compression ratio will tend to increase the pressure at TDC, and a decrease in compression ratio will decrease pressure at TDC. Applicants have shown that increasing the in-cylinder pressure advances the start of combustion and decreasing the in-cylinder pressure retards the SOC. Any of the compression ratio varying devices discussed hereinabove with respect to temperature control may be used.

Figure 31A:
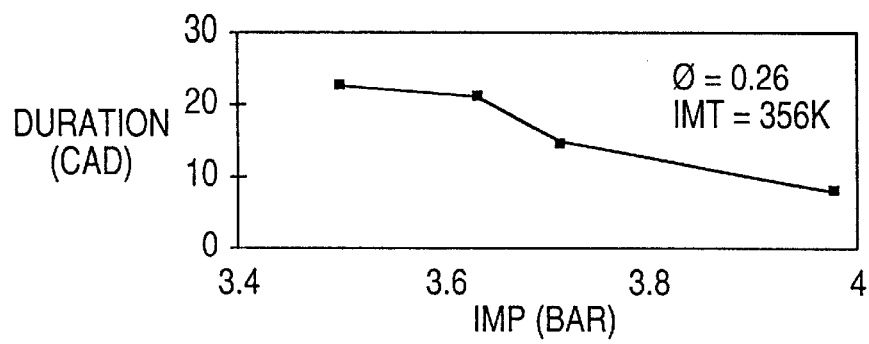
FIG. 31a is a graph showing the combustion duration in crank angle degrees as a function of intake manifold pressure (IMP)
Figure 31B:
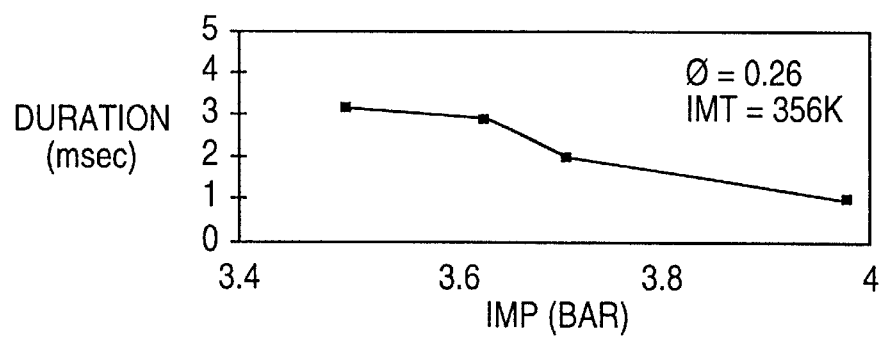
FIG. 31b is a graph showing combustion duration in time as a function of IMP.
Figure 31C:
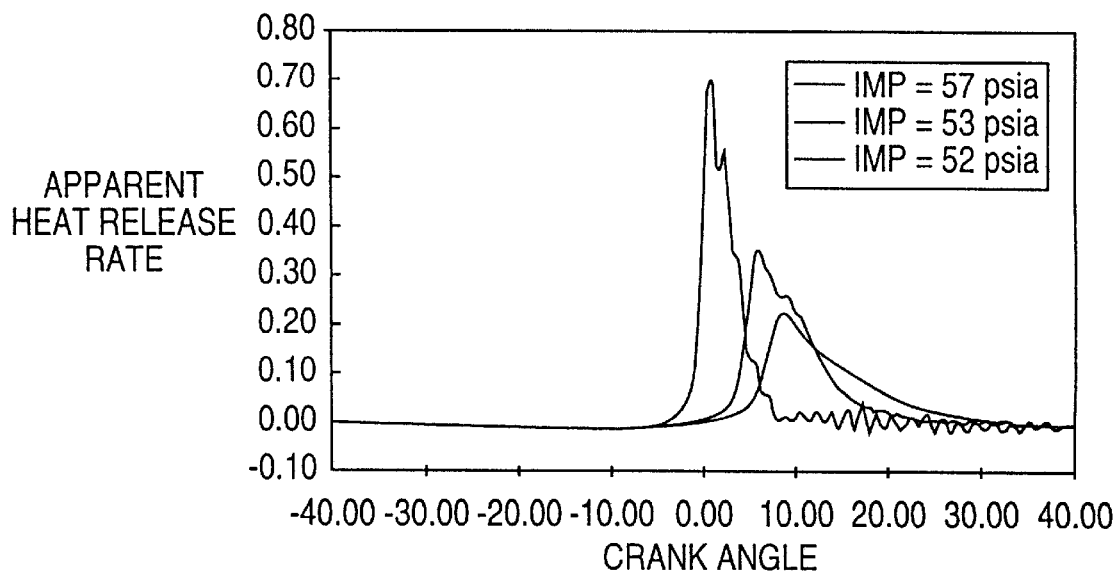
FIG. 31c is a graph showing the effect of changes in IMP on the magnitude and timing or location of the heat release rate.
Figure 31E:
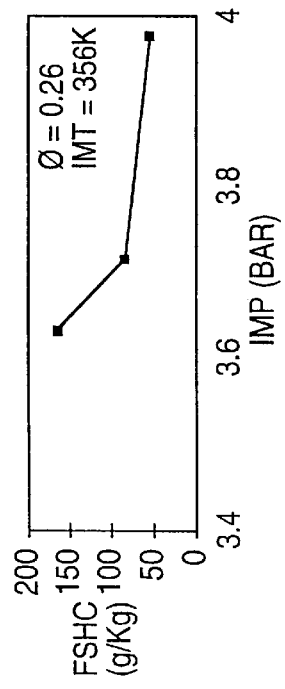
FIG. 31e is a graph showing fuel specific hydrocarbons as a function of IMP.
Figure 31D:
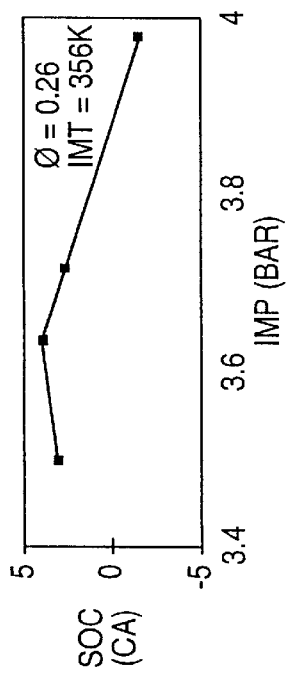
FIG. 31d is a graph showing the start of combustion timing and crank angle degrees as a function of IMP.
Figure 31F:
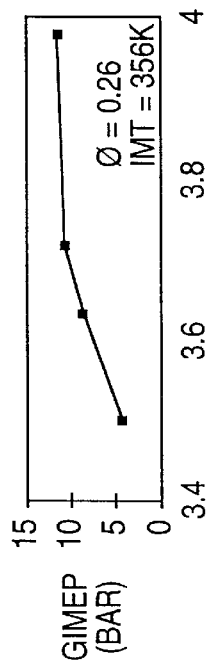
FIG. 31f is a graph showing GIMEP as a function of IMP.
Figure 31H:
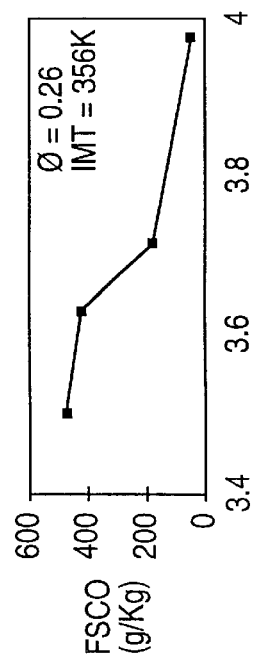
FIG. 31h is a graph showing fuel specific carbon monoxide as a function of IMP.
Figure 31G:
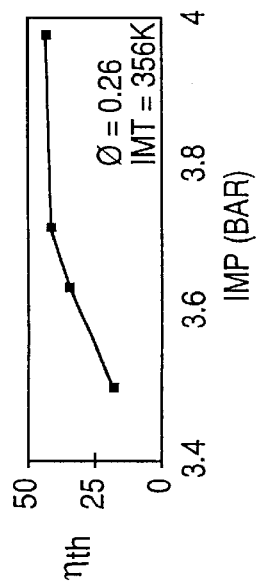
FIG. 31g is a graph showing gross indicated thermal efficiency as a function of IMP.

A second way of controlling the in-cylinder pressure is to vary to the intake manifold, or boost, pressure (IMP). The timing of the SOC has been shown to be a function of pressure. Applicants have determined the effects of varying IMP on combustion and engine operation. The engine conditions for one engine study were 1200 RPM, 355.7 K<IMT<357.4 K, $0.256<\phi<0.263$. IMP was varied. Maintaining these conditions while increasing IMP required increasing air flow and fuel flow. FIGS. 31a and 31b show that the duration of heat release decreases as IMP increases both in the crank angle domain and the time domain. FIG. 31d shows that SOC occurs earlier as IMP increases. FIG. 31c, showing results from another study, clearly indicates that increasing the boost pressure significantly advances the heat release event. FIG. 31e shows that FSHC emissions decrease as IMP increases, indicating more complete combustion. FIG. 31f shows that GIMEP increases as IMP increases, mostly due to the increase in complete combustion, and, to a lesser extent, more fuel. FIG. 31g shows that gross indicated thermal efficiency increases as IMP increases, partly due to more complete combustion. FIG. 31h shows that FSCO emissions decrease as IMP increases, apparently due to more complete combustion. FIG. 31i shows that FSNOx emissions are not significantly affected by IMP. FIG. 31j shows that coefficient of variation (COV) of GIMEP decreases as IMP increases. FIG. 31k shows that PCP increases as IMP increases. FIG. 31l shows that estimated noise increases as IMP increases. FIG. 31m shows that as IMP increases, smaller gains in GIMEP cause larger rises in PCP. This effect is due to the earlier SOC that occurs as IMP increases.

One study varied the pressure at BDC of the compression stroke. The study was performed using a compression ratio of 14.5:1, an engine speed of 1200 rpm, a BDC compression temperature of 389 K, an equivalence ratio of 0.3285, and no heat transfer. The fuel used was propane and the pressure at BDC was varied while all other parameters were held constant. This study clearly revealed that as pressure at BDC increases,the SOC becomes earlier. In addition, for BDC pressures less than 1.75 bar, less than 10% of the fuel energy was released, while for BDC pressures greater than P=1.75 bar, virtually all of the fuel energy was released. This indicates that the combustion is highly sensitive to changes in pressure. At very low pressures, very little of the fuel burns, leading to high FSHC emissions. Since none of the fuel is burning at these low pressures, no carbon monoxide is produced. As the pressure increases (while maintaining IMT constant), a higher percentage of the fuel is burned, which leads to decreased production of carbon monoxide and lower FSHC. Above a certain critical pressure, all of the fuel burns completely, leading to extremely low FSHC and FSCO emissions. Also, a very small change in BDC pressure leads to a very large change in peak cycle temperature (PCT). The results of the simulation indicate that at low peak cycle pressures (PCP), the fuel does not burn. Hence, the pressure peaks at the isentropic compression. As pressure is increased, a higher percentage of the fuel energy is released, causing the cylinder pressure to rise above the isentropic compression pressure. As pressure increases further, all of the fuel energy is being released and further increases in pressure raise the PCP due to isentropic effects.

Clearly, varying IMP can be an effective way of controlling the SOC and the duration of combustion. Increasing the IMP tends to advance SOC while decreasing the duration of heat release. Likewise, decreasing the IMP tends to retard SOC while increasing the duration of heat release. In a typical application, for a constant torque condition, the fuel flow rate would remain virtually constant, and the boost pressure would be increased to advance the start of combustion or decrease the boost to retard the start of combustion. For example, an air compressor, a turbocharger, a supercharger such as driven by an engine power take-off, or an electrically powered compressor, could be used. For a given power level, and, therefore, for a given fuel flow rate, there typically exists a preferred intake pressure and temperature. At very low loads, it may be desirable to control the intake manifold pressure with a throttle 53 (FIG. 1a) in the same way that the intake pressure is controlled on a current production spark ignited engine. Throttle 53 would also be used when operating a multi-mode PCCI engine in a spark ignited mode as described hereinbelow. Of course, a throttle could alternatively be located at other locations in the intake system, such as in the intake manifold.

Air/Fuel Mixture Autoignition Properties

Another strategy for controlling the start and duration of combustion is to vary the air/fuel mixture autoignition properties. The autoignition properties of the air/fuel mixture may be controlled by injecting a gas, e.g. air, oxygen, nitrogen, ozone, carbon dioxide, exhaust gas, etc., into the air or air/fuel mixture either in the intake system, e.g. preferably in the port using, for example, injector 42, or in the cylinder directly using, for example, injector 40, thereby providing control over the start of combustion and the combustion rate.

Figure 32:
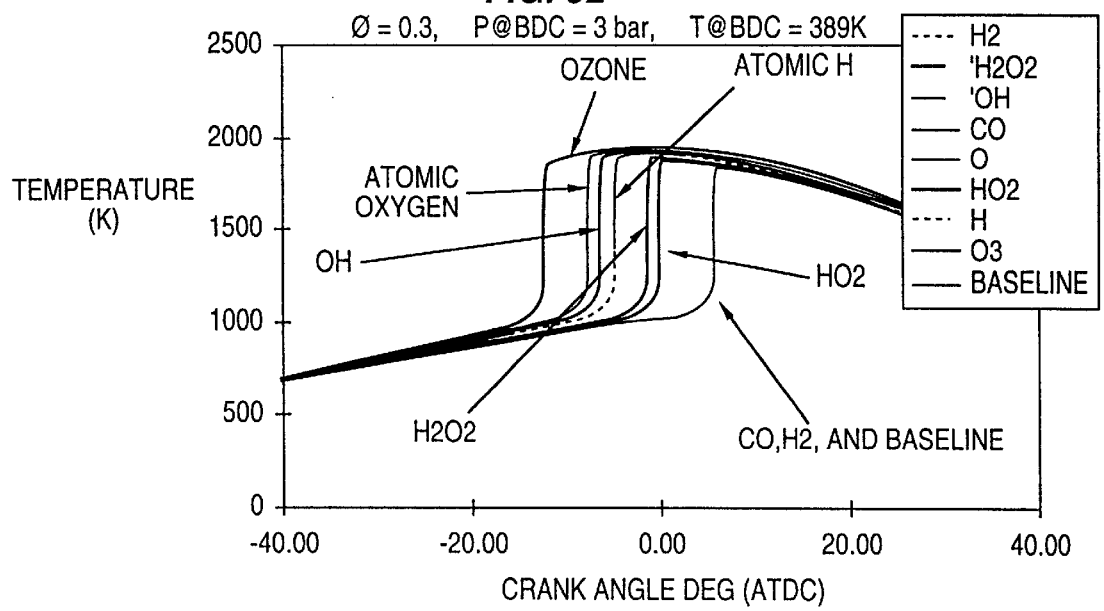
FIG. 32 is a graph showing the effect of various trace species on a start of combustion and temperature.

Applicants have examined the effect of adding reactive species to the air/fuel mixture on the combustion process. One study was performed using an equivalence ratio of 0.3, a temperature at BDC of 389 K, pressure at BDC of 3 bar, and propane as the fuel. The compression ratio was 14.5, and the engine speed was 1800 RPM. The engine geometry used was for a Cummins C series engine. The nitrogen, oxygen, and fuel mole fractions were held constant at 0.771, 0.216, and 0.0123, respectively, for all cases. The mole fraction for the reactive species added was 0.000411 for all cases. The reactive species examined were $H_2$, $H_2O_2$, OH, CO, O, $HO_2$, H, and $O_3$. FIG. 32 shows the temperature versus crank angle. Although CO and $H_2$ advanced the SOC by less than 0.5 crank angle degrees, all other species significantly advanced the SOC, with $O_3$ (ozone) causing the largest change in the SOC. Therefore, small concentrations of most common radicals will cause significant changes in the SOC.

Figure 33:
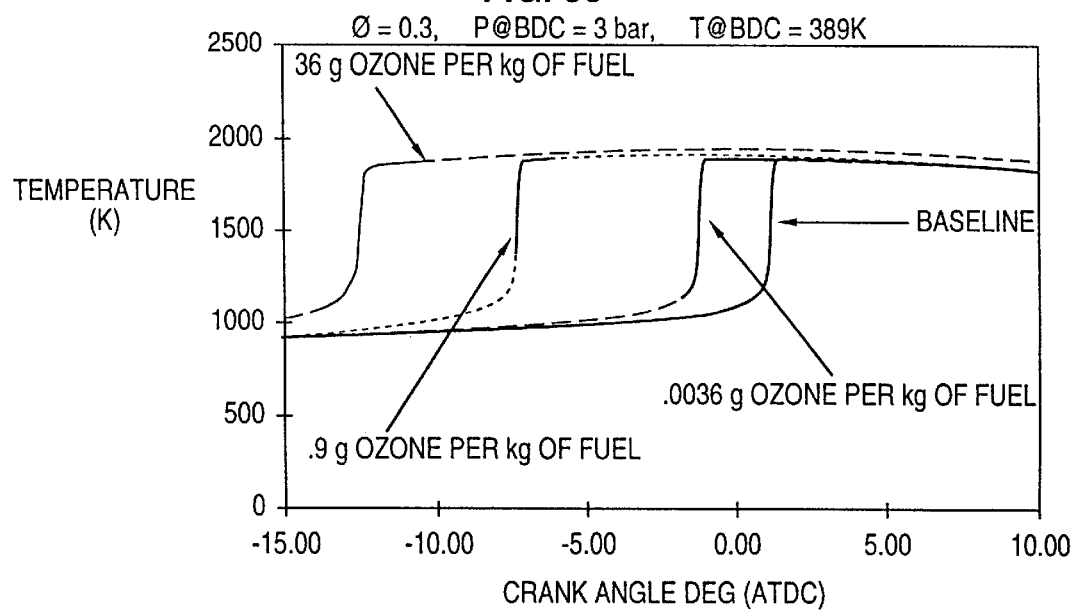
FIG. 33 is a graph showing the effects of additional amounts of ozone on advancing the start of combustion.

Thus, applicants have determined that the addition of very small quantities of ozone advances the SOC by significant amounts. Applicants have also shown that virtually all of the ozone will be consumed by the combustion process and that the change in the SOC will diminish as the amount of ozone added increases. Specifically, FIG. 33 illustrates the effects of additional ozone on advancing the SOC. The increase in temperature indicates the start of the combustion event.

Given the significant effect additional ozone has on the SOC, ozone can be used in several ways to advantageously control the combustion in a PCCI engine. First, by adding different amounts of $O_3$ to the intake ports, one, several, or all cylinders could have their SOC adjusted. Second, adding $O_3$ to the intake could be used as a cold starting aid for PCCI and diesel engines. Third, adding $O_3$ to the exhaust of an engine would allow a catalyst to light earlier thus possibly significantly reducing cold start emissions on catalyst-equipped spark ignited engines, diesel engines and PCCI engines. $O_3$ could be produced "on board" through a simple electro-chemical reaction. Ozone generators are commercially available. Also, the ignition delay of a diesel engine could be reduced by adding $O_3$ to the intake. This would reduce the premixed burn fraction which would then lower NOx emissions and reduced noise.

Applicants have shown that increasing the oxygen concentration advances the SOC. However, applicants have determined that oxygen enrichment from 20.7 percent to 21.65 percent will advance the SOC by less than one crank angle degree, and oxygen enrichment from 20.7 percent to 23.7 percent will advance the SOC by less than 1.5 crank angle degrees. Therefore, combustion may be controlled to a limited degree by modifying the oxygen concentration of the intake air. This may be done by adding oxygen (or an oxygen rich gas mixture) to the intake or by selectively removing nitrogen from the intake air (using a membrane for example). Applicants have also shown that increasing the percent of nitrogen in the intake charge from 78.6 percent to 80.6 percent resulted in the retardation of the SOC by less than 2 crank angle degrees at 1800 rpm. It was also noted the same percentage increase of $N_2$ in the fresh charge lowers the FSNOx from 0.144 to .0.048 grams of NOx per Kg of fuel.

Another method of varying the effect of oxygen on the combustion process is to dilute the mixture with EGR. In one study, an engine EGR system was plumbed from the exhaust manifold to the compressor inlet. Because the EGR is mixed in upstream of the aftercooler, and in the present study, the aftercooler exit temperature was controlled and held fixed, the EGR should not have significantly effected the temperature at SOC. During this study, fuel rate and intake manifold temperature were held constant. As the EGR rate was increased, exhaust manifold pressure decreased, which in turn decreased air flow on this turbocharged engine. The fuel rate was held constant, so the fresh equivalence ratio increased. In spite of the increased equivalence ratio, SOC retarded as the EGR rate increased, most likely due to the diluent effect of the EGR. As expected, SOC retarded as the EGR rate increased. However, as EGR rate increased, CO and HC emissions also increased. Also, as EGR rate increased, the spread in SOC between cylinders increased. In a similar study, the SOC was held constant by adjusting IMT. As the EGR rate was increased, exhaust manifold pressure decreased, which in turn decreased air flow. The fuel rate was held constant thus causing the equivalence ratio to increase. In addition, as the EGR rate increased from about 7 to 13% EGR, there was a sharp rise in the cylinder to cylinder variation in SOC. Ultimately, a higher IMT was required to maintain constant SOC as the EGR rate increased, in spite of an increase in equivalence ratio. This requirement was due to the diluent effect of increased EGR on the intake air.

Figure 34:
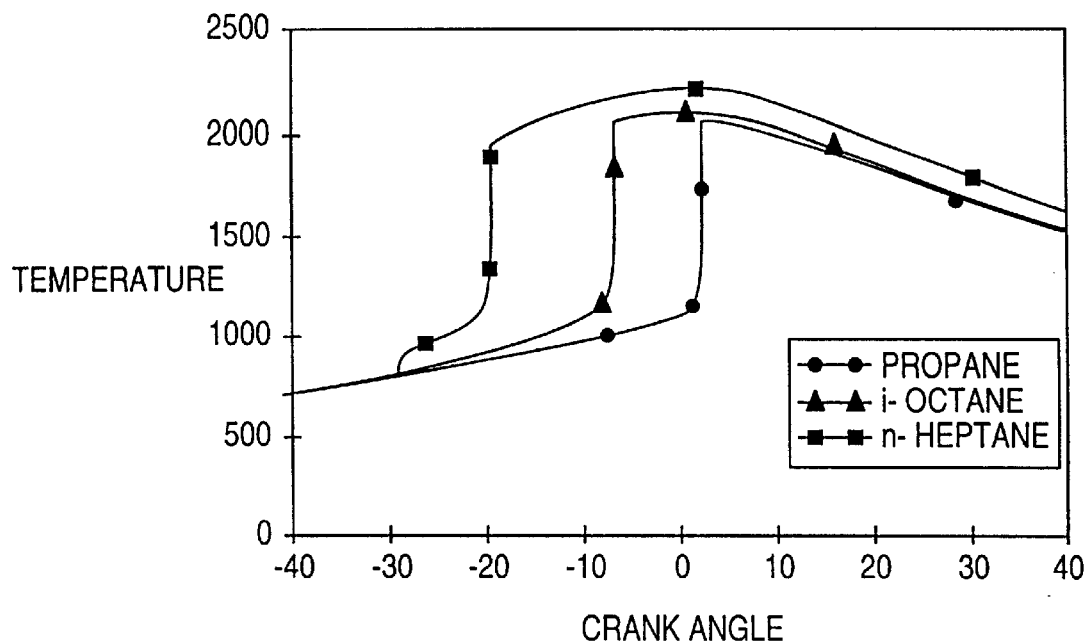
FIG. 34 is a graph showing the effect of varying the type of fuel used in the present PCCI engine on the start of combustion wherein the increase in temperature indicates the start of combustion.

Another technique for modifying the autoignition properties of the air/fuel mixture to control SOC and the duration of combustion is to vary the octane, methane or cetane number of the charge by, for example, by providing two or more fuels have different octane, methane or cetane numbers. The fuel supply can be either selectively switched between the fuels or the fuels can be mixed. This technique makes it possible to retard or advance the combustion event. For example, a fuel which tends to autoignite more readily (lower octane or methane number, or higher cetane number) could be controllably mixed with a fuel that tends to autoignite less readily (or a fuel that ignites at a high temperature and a fuel that ignites at a low temperature could be used) to enable direct control over the timing of ignition and rate of combustion by changing the ratio of the fuels that are present in the combustion chamber during the combustion event. As shown in FIG. 34, propane, octane and heptane have significantly different effects on the SOC. The same effect may be achieved by using a fuel additive, such as a controlled amount of propane, ethane, or other hydrocarbons, such as engine lubricating oil, that change the autoignition properties of the fuel to advance or retard the start of combustion. Of course, any method that changes the fuel's octane/methane number or the activation energy of the fuel can be used to advance/retard combustion. Applicants have determined that there is a significant sensitivity of start of combustion to octane number. This effect was independent of intake manifold temperature. Moreover, in one study, the start of combustion was retarded approximately 7° for an increase in octane number from 80 to 100.

Achieving dynamic control over individual cylinder combustion in a multi-cylinder PCCI engine will be critical to achieving improved combustion. Since many of the gases/fluids discussed hereinabove, e.g. fuel, ozone, oil, water, etc. have now been shown to significantly affect the SOC and/or rate of combustion, these additives can be used to advantageously balance combustion between the cylinders in a multi-cylinder engine running on PCCI principles. For example, by injecting a liquid or gas diluent, such as a less reactive fuel, water, uncooled or cooled exhaust products, air and/or nitrogen either into the intake air or directly into the charge in the cylinder, the SOC can be retarded. Also, by injecting, for example, a more reactive fuel, ozone, oil and/or oxygen into the charge the SOC can be advanced. FIG. 1b illustrates one system for balancing combustion between cylinders of a multi-cylinder engine. The system uses port injection of fuel on the engine with two types of supplies per cylinder—supply 32 to inject liquid fuel and supply 34 to inject gaseous fuel. Although the supplies 32 and 34 are shown feeding into a single passage for delivery to the intake port, the supplies may include separate delivery passages connected to the intake port at different locations. Liquid fuel will decrease intake charge temperature by the heat of vaporization of the liquid fuel. The temperature at TDC compression, and therefore SOC, can be controlled by varying the amount of liquid versus gaseous fuel. Also, it should not matter if the liquid vaporizes in the port or during compression. The gaseous and liquid fuel can be the same fuel in different states, e.g. propane, or different fuels, e.g. gaseous natural gas and liquid gasoline, such as indolene. It is important that the port injection system have good separation between cylinders and sequential (timed to intake event) injection is likely to be required. During operation, a cylinder that is "going out" would be given more gaseous fuel and a cylinder that is "too hot" would be given more liquid. This method can be used to achieve about a 20 degree temperature difference. One of the supplies could be lubricating oil or ozone while the other supply could be a fuel having a high resistance to ignition, e.g. a high octane number, to permit the SOC to be effectively controlled by varying the amount of oil or ozone added to the mixture. Also, by using the engine's lubricating oil supply, or using ozone created by the engine during operation, an additional supply of fuel/additive can be avoided.

Equivalence Ratio

Another control variable that applicants have shown can be effectively used to control the SOC and combustion duration or heat release rate is the equivalence ratio $\phi$ of the fuel/air mixture. Equivalence ratio is equal to fuel/air ratio divided by stoichiometric fuel/air ratio (if<1, fuel deficient; if>1, fuel excess). Combustion needs to be slowed down in a PCCI engine because fast combustion leads to high noise, lowered efficiency and high peak cylinder pressure. If different temperatures and/or equivalence ratios can be achieved throughout the charge of air/fuel at or near point of ignition, the resulting rate of combustion will possibly be slowed down thus advantageously lengthening the duration of combustion. The equivalence ratio could be increased by increasing the fuel flow to the cylinder without a corresponding increase in intake air flow, or by decreasing the intake air flow. The equivalence ratio could be lowered by decreasing the fuel flow to the cylinder without a corresponding decrease in air flow, or increasing the air flow rate. Variations in the quantity of fuel delivered to a cylinder is varied by controlling the operation of fuel control valves 39, 41, and/or fuel injectors 35, 36 in a known manner. The variations in the air flow rate could be achieved by, for example, variably controlling compressor 24 to vary boost pressure.

Figure 35:
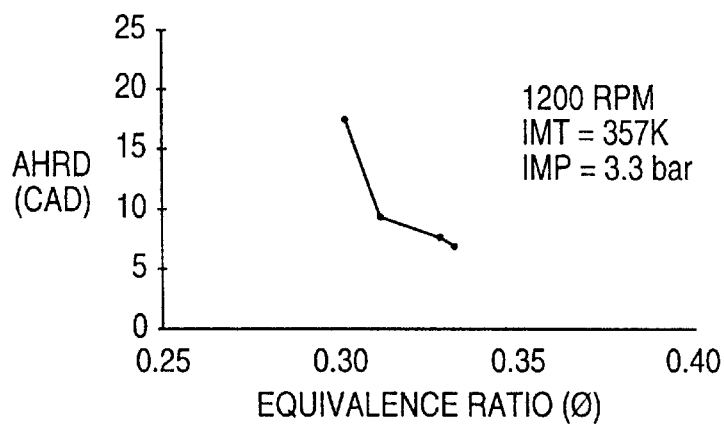
FIG. 35 is a graph showing the apparent heat release duration as a function of equivalence ratio.
Figure 36:
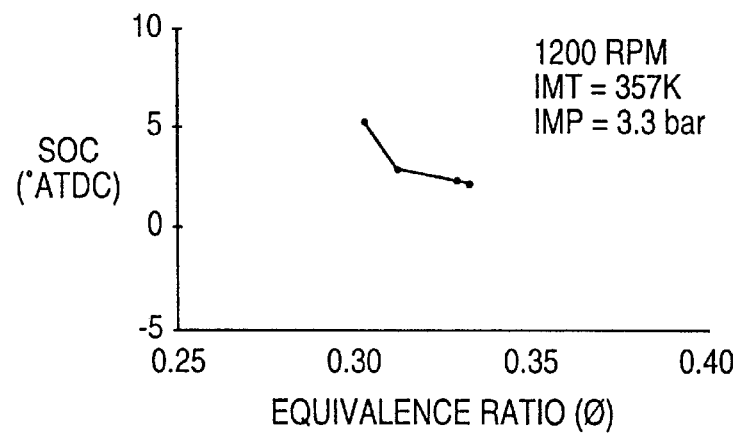
FIG. 36 is a graph showing the start of combustion in crank angle degrees as a function of equivalence ratio.
Figure 37:
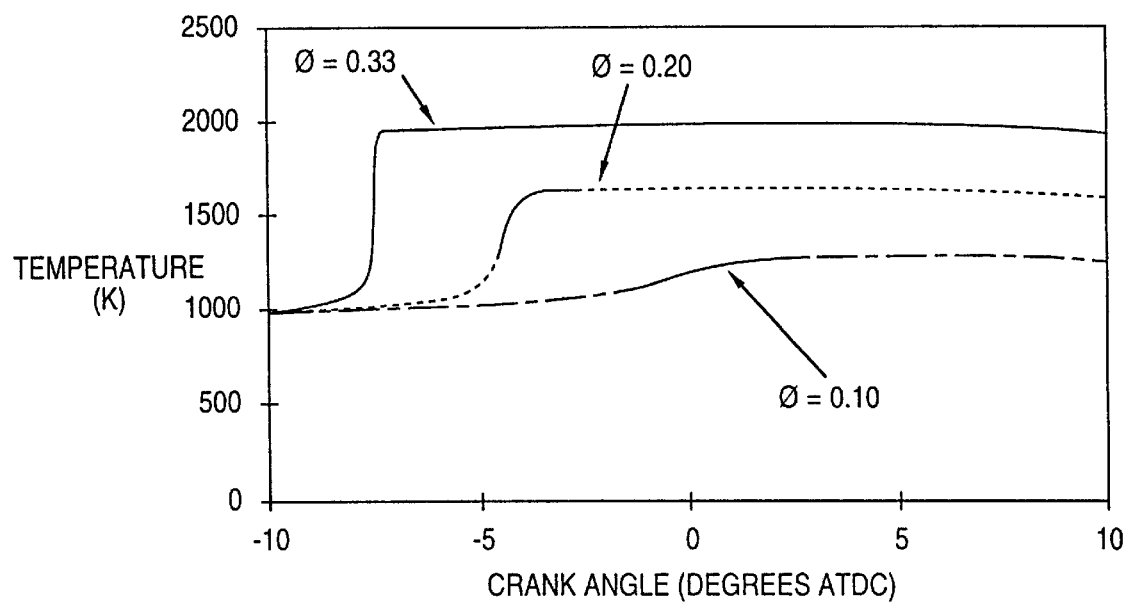
FIGS. 37 is a graph showing the effects of variations in equivalence ratio on the start of combustion wherein an increase in temperature indicates the start of combustion.

To test the lower limit for equivalence ratio, applicants conducted engine studies to determine whether acceptable PCCI combustion could be obtained with an extremely lean mixture. The results indicate that very stable combustion can be achieved at an extremely lean equivalence ratio of 0.05 while obtaining a heat release duration of approximately 30 degrees. Also, as shown in FIGS. 35 and 36, the results indicated that the start of combustion advances and the apparent heat release duration decreases as equivalence ratio increases, i.e. air/fuel mixture becomes richer. Applicants have clearly shown, as indicated in FIG. 37, where cylinder temperature increases indicate the heat release event. Moreover, referring to FIG. 38, the apparent heat release duration becomes longer as equivalence ratio decreases, i.e. air/fuel mixture becomes leaner. Also, applicant have shown that for a four stroke engine that both peak cylinder pressure and GIMEP increase as equivalence ratio becomes richer. With respect to a two-stroke engine, applicant have determined that as equivalence ratio increases, GIMEP increases.

Studies were also conducted to investigate whether the equivalence ratio affects the amount of fuel burned in PCCI combustion. The results indicated that as equivalence ratio becomes richer, the percentage of fuel energy showing up as apparent heat released increases at first and then levels off near 80%. This number can never reach 100% because of heat transfer. With respect to emissions, as equivalence ratio becomes richer, fuel specific hydrocarbon emissions decrease. In addition, as equivalence ratio became richer, average noise levels increased, and GIMEP increased. As equivalence ratio becomes richer, the average knock intensity increases. As equivalence ratio became richer, the cycle-to-cycle combustion variation, as measured by the coefficient of variation (COV) of GIMEP, generally decreased. In fact, the COV's of GIMEP, for the conditions of the study, stayed below the combustion stability limit (in this case defined as 5%), where a COV above the limit indicates unacceptable stability.

Studies were performed to determine the effect that variations in equivalence ratio have on thermal efficiency in PCCI combustion. An equivalence ratio study was performed while matching the following parameters: speed, IMT, IMP, engine oil temperature, and engine water temperature. Equivalence ratio was increased by holding air flow constant and increasing fuel flow to the engine. As fuel flow increased and equivalence ratio became richer, gross indicated thermal efficiency increased at first and finally leveled off. Engine work output increased with respect to increased fuel flow as more fuel was burned. At the leaner equivalence ratios, a significant amount of fuel is left unburned. At the richer equivalence ratios, the percentage of fuel that is being burned levels off as noted hereinabove, and the gross indicated thermal efficiency levels off because the increase in engine output is being offset by the additional fuel input.

In addition, an engine study was conducted with the engine cycle running from bottom dead center of the compression stroke to BDC of the expansion stroke. The study was conducted using a compression ratio of 14.5:1, an engine speed of 1200 RPM, a BDC compression temperature of 389 K, pressure at BDC of 4.31 bar, and no heat transfer. The fuel used was propane. The equivalence ratio was varied while all other parameters were held constant. It was discovered that the percent of energy released slowly tapered off as the equivalence ratio drops below 0.15. This data indicates that for a given temperature and pressure, there is a lower limit to the equivalence ratio of a mixture that will burn completely. Also, it was shown that FSCO emissions are very high at equivalence ratios below 0.15. This data indicates that only a small amount of the fuel burns to completion at these low equivalence ratios for this temperature and pressure. In addition, the FSHC decrease slightly as the equivalence ratio is varied from 0.05 to 0.4. Thus, most of the fuel reacts regardless of the equivalence ratio. It was also shown that SOC occurs earlier as equivalence ratio increases. The study showed that peak cylinder temperature gradually increases as equivalence ratio is increased showing the increased amount of energy available to be released. Peak cylinder pressure (PCP) gradually increases as equivalence ratio is increased showing the increased amount of energy available to be released. At equivalence ratios greater than or equal to 0.18, virtually all of the available fuel energy is released, leading to a nearly linear increase in PCP as equivalence ratio increases.

Applicants have determined that it may be possible, although not necessarily desirable, to maintain PCCI combustion at very rich equivalence ratios, e.g. 0.5, if IMP and IMT are sufficiently low to prevent the peak cylinder pressure limit from being exceeded. It will be difficult to start an engine at the low boost and IMT levels needed for maintaining low cylinder pressures at such rich equivalence ratios. The very advanced heat release, loud knock, and combustion roughness make running at this condition undesirable. A lower CR for retarding SOC may improve these aspects.

Also, by varying the level of charge stratification, the temperature and equivalence ratio distribution can be altered to permit control of the combustion rate and/or the start of combustion. An auxiliary combustion chamber concept may be a mechanism for achieving the desired stratification, thereby enabling better control over the start of combustion. For example, conventional auxiliary combustion chamber designs typically used on small engines having indirect injection (IDI), and large spark ignited engines using natural gas fuel, could be used.

Figure 39:
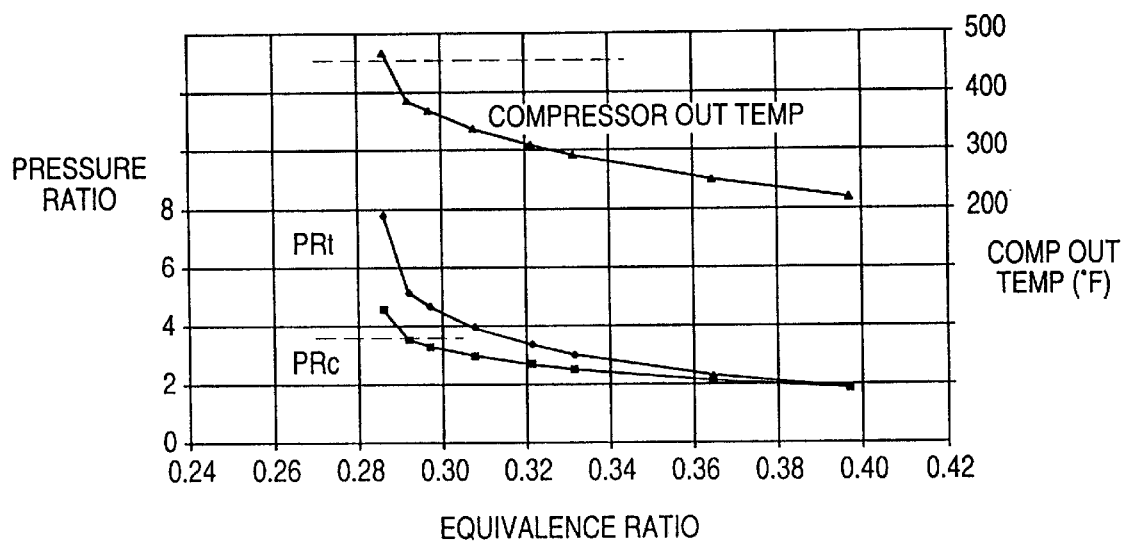
FIG. 39 is a graph showing the effects of equivalence ratio on the compressor pressure ratio and the compressor outlet temperature.

In order to operate under the desired lean conditions for optimal PCCI combustion, substantial air flow must be provided to the intake manifold. A turbocharger could provide the needed air flow for a multi-cylinder PCCI engine. Applicants' original target was to reach an equivalence ratio of 0.40 or leaner. Referring to FIG. 39, applicants have shown that operating at leaner than an equivalence ratio of 0.29 would violate the compressor pressure ratio limit of the available turbocharger. Applicant determined that turbine pressure ratios are very high at lean equivalence ratios. As a result, the exhaust manifold pressure is very high which causes a large BSFC penalty. Because of the relatively cool exhaust temperatures produced by PCCI combustion, very small turbine cases are needed which result in high exhaust manifold pressures.

Figure 40:
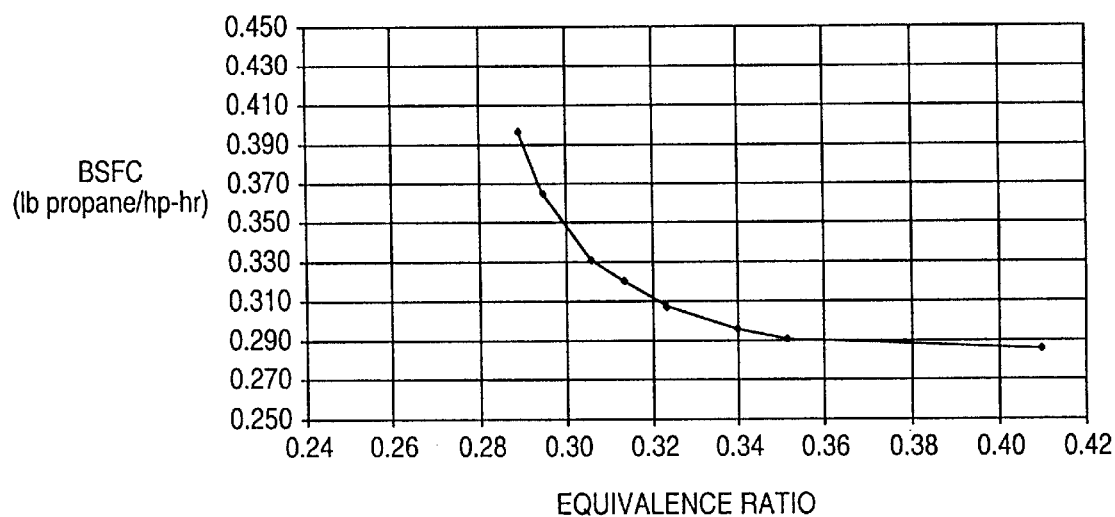
FIG. 40 is a graph showing the effects of varying the equivalence ratio on the brake specific fuel consumption.
Figure 41:
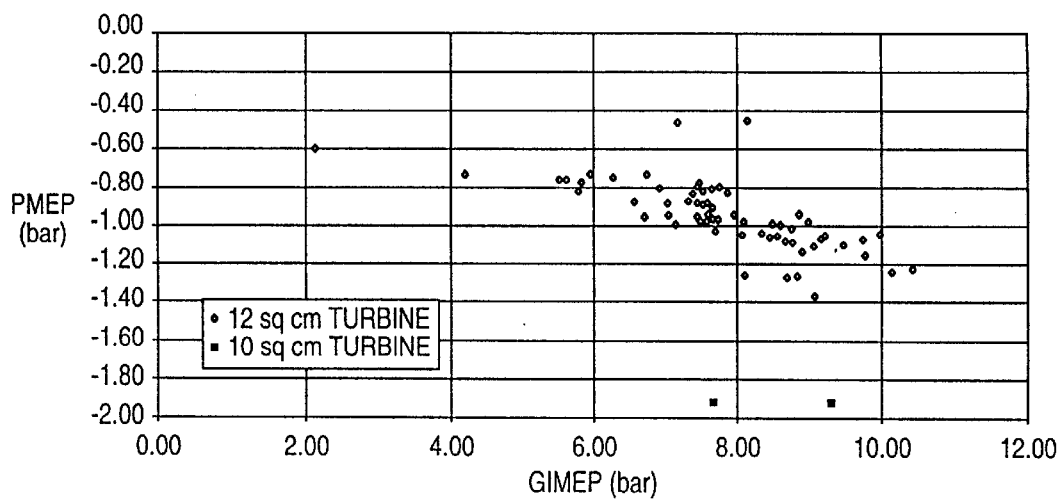
FIG. 41 is a graph showing the differences in pumping mean effective pressure and GIMEP for two differently sized turbine casings.
Figure 42:
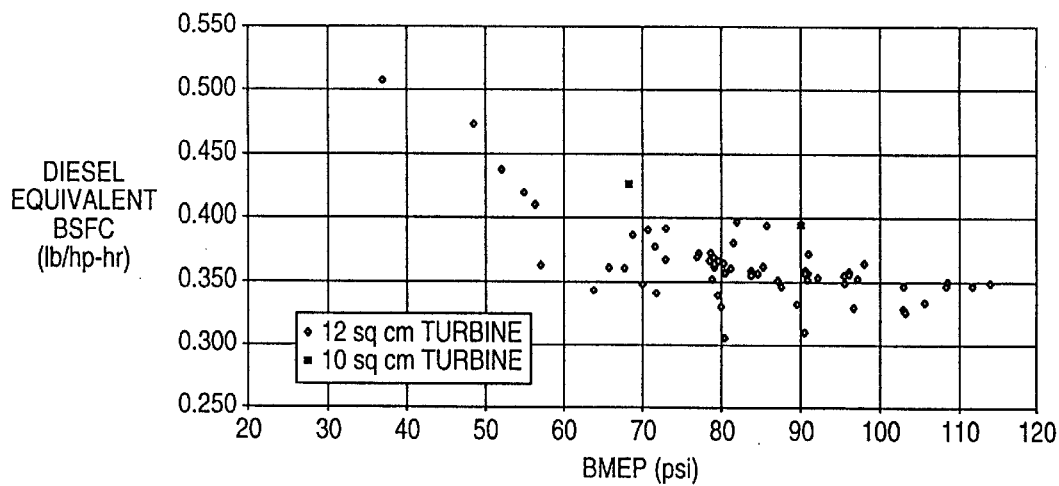
FIG. 42 is a graph showing the diesel equivalent BSFC and BMEP for two differently sized turbine casings.
Figure 43:
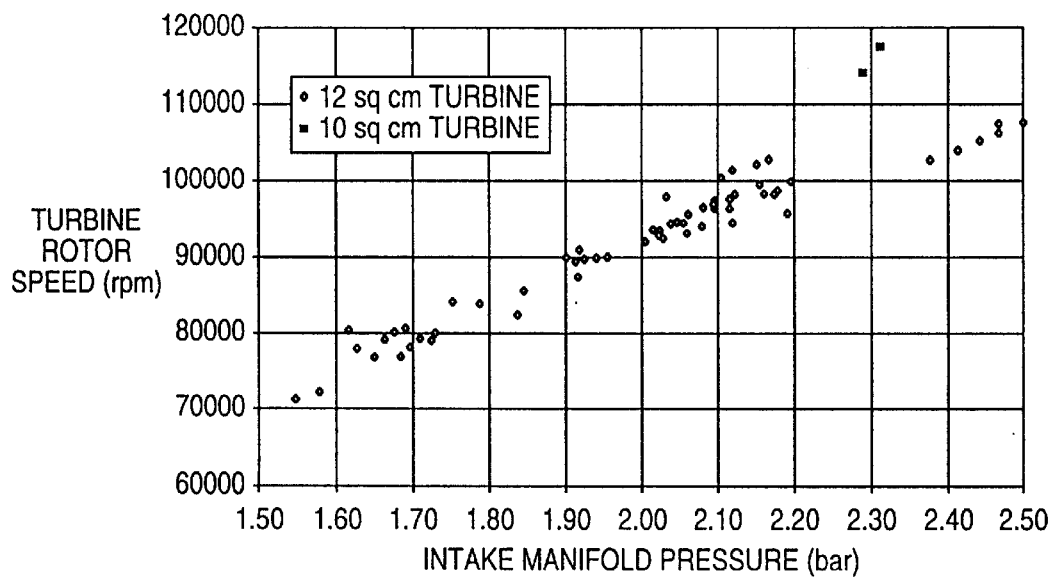
FIG. 43 is a graph showing the turbine rotor speed and intake manifold pressure for two differently sized turbine casings.

Applicants have determined that it would be desirable to operate under slightly leaner conditions than the original target. At an equivalence ratio less than 0.4, a smaller turbine casing was used to decrease the compressor pressure ratio and exhaust manifold pressure ratio, but a high BSFC penalty is paid, as shown in FIG. 40. FIGS. 41 and 42 illustrate the higher PMEP losses with the smaller turbine casing and the higher BSFC. Also, with the smaller turbine casing, the rotor speed is much higher and, in fact, near the limit on rotor speed as seen in FIG. 43 (rotor speed limit 120–125 k rpm range). Applicants discovered that there is a lower limit on the size of the turbine casing used due to the losses incurred with the high back pressure and with reaching the rotor speed limit.

In order to avoid this problem with the high back pressure and rotor speed limiting airflow, one possible solution is to use a mechanically driven supercharger in conjunction with a turbocharger. The supercharger would be upstream of the compressor so that the turbine bears less of a burden for producing boost. Some BSFC penalty would be incurred for the shaft work absorbed by the supercharger; however, the BSFC penalty is less than the very high penalty incurred with the very small turbine. Because the supercharger is driven mechanically from the shaft, there should be no trouble getting the desired air flow. The turbine then can be sized somewhat larger, and should not approach the speed limit and should not have extremely high back pressure.

Applicants have also determined the effect of engine speed on SOC. The time of autoignition depends on the temperature and pressure histories. By changing the engine speed, these histories are changed. It is possible to advance the combustion event by reducing the engine speed, and to retard the combustion event by increasing the engine speed. Specifically, a 75% increase in engine speed, from 1000 to 1750 resulted in a 1.5% increase in the start of combustion pressure and a 2.8% increase in the start of combustion temperature. In addition, a 75% increase in engine speed decreased the heat release rate duration by 0.81 ms (only a 23% decrease) which corresponds to an increase in heat release duration of 1.7 crank angle degrees (only an 8% increase). Given this minimal impact of engine speed on the SOC and heat release, and the inability to effectively vary engine speed in many practical engine applications, engine speed is not viewed as an effective combustion control variable. However, one example where engine speed could be used to provide some control over combustion is in an application where the engine drives a generator or alternator.

Figure 44:
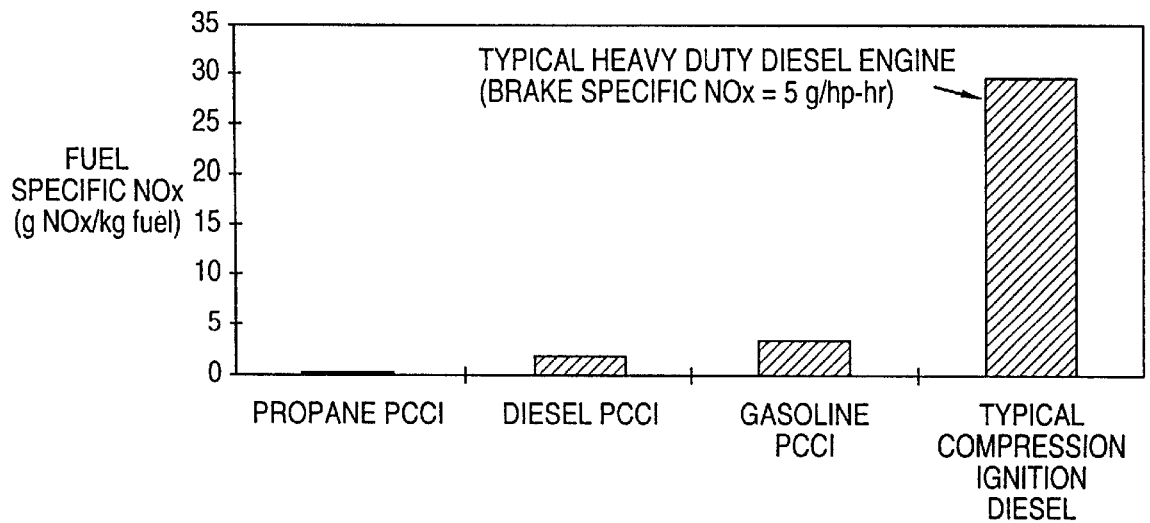
FIG. 44 is a graph showing the fuel specific oxides of nitrogen emissions for PCCI combustion with various fuels in comparison to a typical compression ignition diesel engine.

As discussed hereinabove, the foregoing control variables are used to control the SOC and the duration of combustion to achieve optimum PCCI combustion. One key consequence of efficient, optimum combustion is reduced emissions. Applicants have shown that a PCCI engine can achieve NOx emission levels that are well below any other NOx emission levels ever demonstrated by applicants using diesel and natural gas engines, and well below future emissions standards as shown in FIG. 44. The use of propane as the fuel resulted in the lowest NOx emissions relative to diesel fuel and gasoline.

Figure 45:
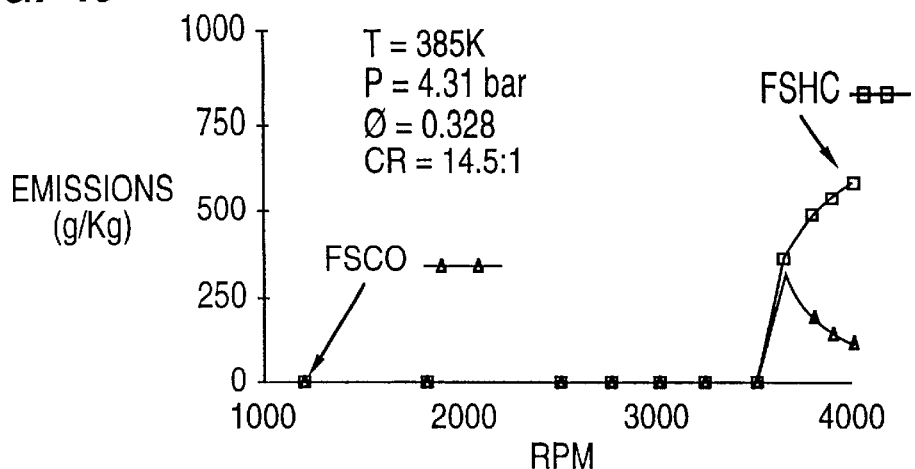
FIG. 45 is a graph showing emissions as a function of engine speed.
Figure 46:
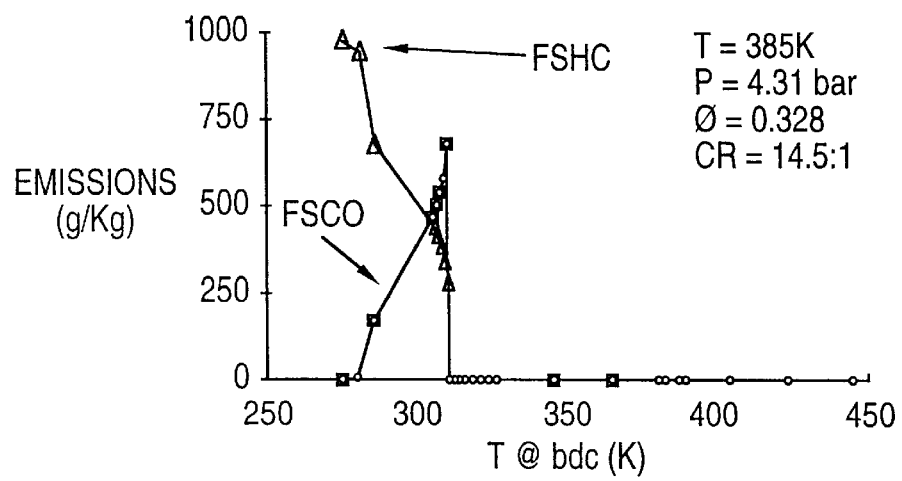
FIG. 46 is a graph showing emissions as a function of temperature at bottom dead center.
Figure 47:
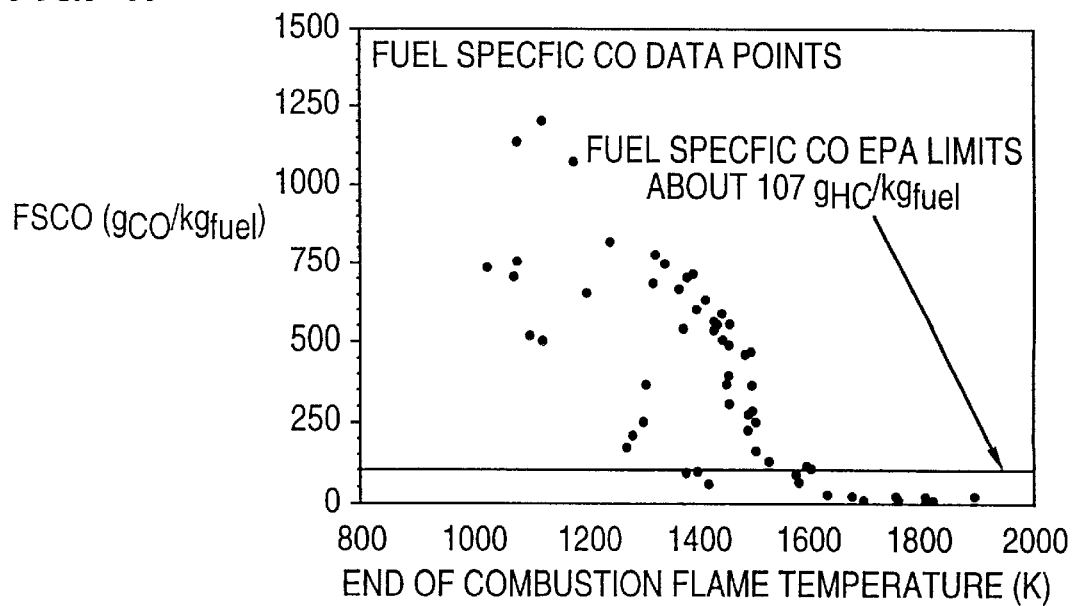
FIG. 47 is a graph showing fuel specific carbon monoxide as a function of end of combustion flame temperature.

Applicants have also determined the effect of the control variables and other factors on emissions of a PCCI engine. Engine speed has little effect on the quantity of NOx emissions. Although a 75% increase in engine speed approximately tripled the FSNOx, the levels of NOx emissions produced were still extremely low. Also, as equivalence ratio becomes richer, fuel specific NOx generally increases, but still remains at extremely low levels. Referring to FIG. 45, applicants have determined that engine speed appears to affect FSCO and FSHC emissions more significantly. As shown, below a certain critical speed, virtually all of the fuel burns, FSHC are low and FSCO is low. Just above the critical speed, the fuel partially burns, resulting in higher FSCO emissions. As engine speed continues to increase, the percentage of the fuel that burns continues to drop, resulting in lower FSCO emissions. These emissions also vary as the temperature at BDC varies. Referring to FIG. 46, at very low temperatures, very little of the fuel burns, leading to high FSHC emissions. Since none of the fuel is burning at these low temperatures, no carbon monoxide is produced. As the temperature increases, a higher percentage of the fuel is burned, which leads to increased production of carbon monoxide and lower FSHC. Finally, above a certain critical temperature, all of the fuel burns completely, leading to extremely low FSHC and FSCO emissions. In fact, as shown in FIG. 47, applicants have shown that all data points with end of combustion flame temperatures above 1600 K had acceptable CO emissions. It has been shown that both high temperature and the hydroxyl radical (OH) are critical for the desired oxidation of CO. Importantly, as equivalence ratio becomes richer, fuel specific CO decreases, while the concentration of $CO_2$ in the exhaust increases. In one study, all points taken with an equivalence ratio<0.2 had CO emissions above the EPA CO limit.

Figure 48A:
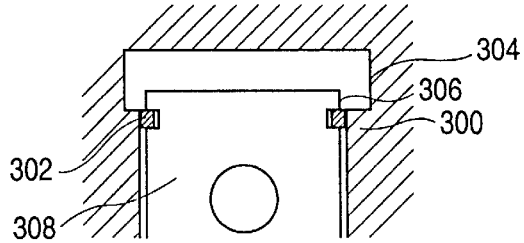
FIGS. 48a–50b are partial cross sectional views of a single cylinder of the PCCI engine of the present invention showing an alternative embodiment including various crevice minimizing features.
Figure 48B:
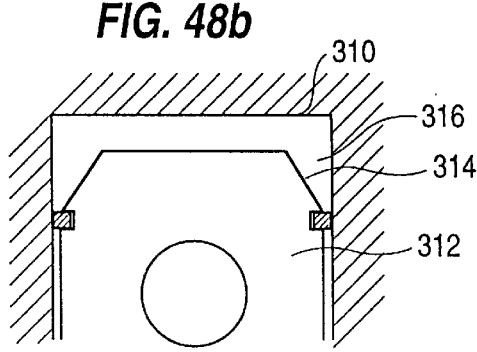

As equivalence ratio becomes richer, fuel specific HC decreases. Clearly, unburned hydrocarbons (UHC) are a key concern for PCCI engines since reducing unburned hydrocarbons is essential to the commercial feasibility of a PCCI engine. Applicants have determined that UHC, and CO, is formed in small crevices positioned in the components forming the combustion chamber, i.e above the top ring of the piston between the piston and the liner; between the cylinder head and the cylinder liner; and around the components mounted in the cylinder head. The crevices prevent the volume of mixture in the crevice from reaching a sufficiently high temperature necessary for burning of the HC and oxidation of the CO. For example, applicants have shown that similar pistons with different crevice volumes have different UHC levels. The present PCCI engine may include one of several designs to minimize UHC. The present crevice minimizing designs result in a low crevice volume; keep the fuel away from any existing crevices; or cause the mixture in the crevice volume to burn appropriately. The designs shown in FIGS. 48a and 48b are most easily implemented in a ported two stroke cycle engine. Referring to FIG. 48a, in one embodiment, the engine has a single piece head and liner combination 300, although a two-piece system could be used. Just above the top ring 302 (at TDC), the bore 304 increases to eliminate the crevice around the top land 306 of piston 308. There are no crevices in the cylinder head, as it is a single piece without valves, gaskets, etc.

Figure 49:
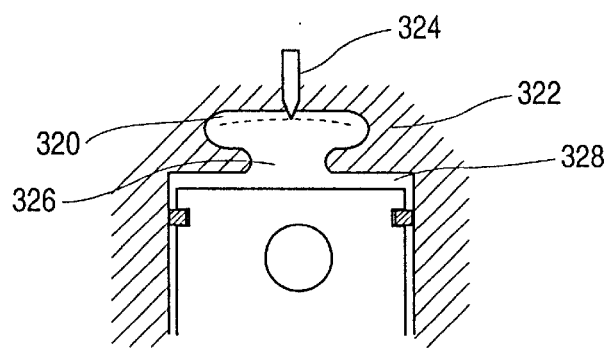

Referring to FIG. 48b, a second embodiment of the crevice minimizing design may similarly include a one-piece head and liner 310. However, in this embodiment, the piston 312 has a very aggressive cutback 314 forming the top land to enlarge the crevice volume 316 between the top land and the liner. The crevice volume 316 is now so large that it will no longer quench combustion in this area thus allowing fuel in this volume to burn resulting in reduced UHC. FIG. 49 illustrates yet another embodiment including a cup or chamber 320 formed in the cylinder head 322 of the engine. The fuel injector 324 is positioned to inject fuel directly into cup 320 early in the compression stroke. Because air is pushed into cup 320, the fuel does not exit the cup. After compression ignition occurs, the products can pass through the relatively large passage or throat 326 between the cup 320 and the main cylinder 328. The fuel is well mixed because of the turbulence of the air entering the cup. Because there are no crevices in the cup and because the fuel does not leave the cup until after combustion is completed, UHC are extremely low. The cup could easily be coated with a thermal barrier coating to reduce heat losses.

Figure 50A:
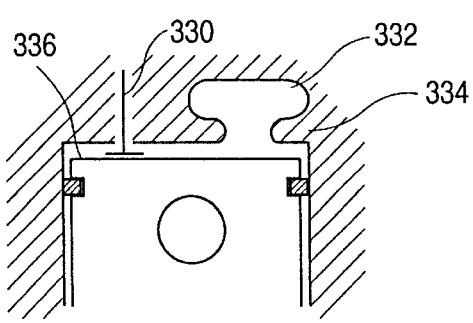
Figure 50B:
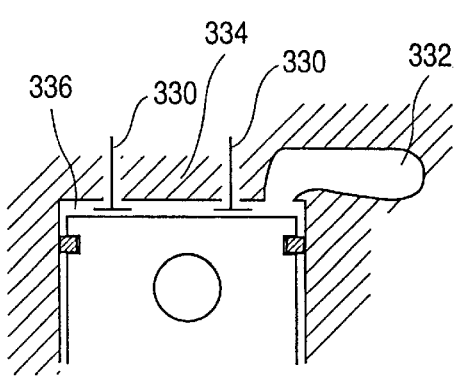

FIGS. 50a and 50b illustrate a cup design for a four stroke engine. The exhaust and intake valves 330 are arranged around a cup 332 in the head 334. Cup 332 may be positioned directly above the combustion chamber 336 as shown in FIG. 50a or offset to allow more room for the valves 330 as shown in FIG. 50b. Another possibility is to include a small auxiliary valve in the cup to allow the products to exit the cup more efficiently. This valve could open after the main exhaust valve opens so that the auxiliary exhaust valve in the cup would not open against a high pressure. In this case, the auxiliary exhaust valve could be electronically operated. The timing of opening and closing of this valve could be used to vary the residual mass fraction which would allow control over the SOC using this auxiliary valve. Also, an opposed piston engine, as discussed hereinabove, may be used to substantially reduce the crevice volume by avoiding a cylinder head and the associated crevices.

Now referring to FIG. 1a, another embodiment of the present invention for reducing emissions is disclosed. Specifically, this embodiment controls UHC and CO by heating the upper portion of the cylinder liner 49 to cause oxidation of the charge in the crevices. A heater 51 is incorporated into the upper part of the liner. The heater could be any type of heater capable of effectively producing heat, such as an electrical resistance heater. The heater heats the gas in the crevice above the top ring when the piston nears TDC. This heating will cause the gas to be less dense resulting in a smaller mass of charge remaining in the crevice. The charge leaving the crevice will be at a higher temperature due to the heating thus increasing the tendency of the charge to react and form $CO_2$ instead of CO and UHC.

Also, a glow plug may be used to heat the combustion gases to reduce emissions by enabling a larger portion of the crevice volume to be burned. It has been determined by applicants that a glow plug will have only a slight impact on the SOC. Since SOC changes only slightly when the glow plug is turned on, it does not appear that the glow plug is initiating combustion. It is more likely that when the glow plug, which was located in a spacer plate, is turned on, it gradually warms up the gas in the crevice volume. This increase in temperature is sufficient to speed up the onset of rapid combustion, and burn more of the fuel than would have been burned without the glow plug on, resulting in a slight increase in GIMEP.

The present engine, as shown in FIGS. 1a and 1b, may also be operated as a multi-mode engine which changes modes of operation based on the operating conditions or needs of the particular application. For instance, the engine may be operated on diesel fuel only as a conventional diesel engine, as a modified diesel engine with diesel fuel being injected earlier in the compression event than the conventional diesel engine, as a spark-ignited engine using spark plug 56 (FIG. 1a) or as a PCCI engine. This type of spark ignited/compression ignited DI (direct injection) variable compression ratio engine provides a combination of low emissions, high power density, and ease of starting.

This engine operates in the following different modes depending on the current operating conditions/needs of the engine.

1) Medium compression ratio (~10:1), early injection (fuel injected during intake stroke or very early in the compression stroke) nearly homogeneous:
   a) Overall lean mixture, spark ignited—allows low NOx, high brake mean effective pressure (BMEP) operation, as well as medium BMEP operation.
   b) Stoichiometric mixture, spark ignited—allows high NOx high BMEP transient operation, as well as low NOx operation with a 3 way catalyst.
2) High compression ratio (~15:1), early injection, nearly homogeneous, very lean ($\phi<0.5$), compression ignition—allows very low NOx medium BMEP and low BMEP operation.
3) High compression ratio (~15:1), late injection, stratified charge:
   a) Spark ignited—allows medium NOx, medium BMEP unthrottled operation, and low BMEP operation.
   b) Compression ignition—allows medium NOx medium and low BMEP unthrottled operation.
4) Low compression ratio (~8:1), early injection, nearly homogeneous, spark ignited:
   a) Lean burn—allows very high BMEP operation.
   b) Stoichiometric—allows very high BMEP operation.
5) Medium compression ratio (~10:1), late injection, stratified charge, spark ignited—allows medium NOx, medium and low BMEP, and high BMEP operation.
6) Very high compression ratio (~20:1), lean burn, early injection, nearly homogeneous, compression ignition—allows the engine to be started in PCCI mode.

The key here is to take full advantage of the variable compression ratio. Starting of the engine can be achieved with spark ignition at a lower compression ratio and then transitioning to high compression ratio, lean PCCI operation for low NOx. For less severe (e.g. not as cold) conditions, engine starting could be achieved directly with very high compression ratio PCCI operation. At low and medium loads, the engine can operate in a PCCI mode as the compression ratio is adjusted to keep the start of combustion near the optimum crank angle. For high load requirements, the air/fuel ratio can be enriched, compression ratio lowered, and the engine can be spark ignited. In order to handle sudden transients, the engine may go into one of the late injection modes where richer air/fuel ratios are possible without engine damage.

In the multi-mode engine, ECU 20 (FIG. 1) functions with a control strategy for controlling the various controlled features of the engine to effectively switch between, and operate in, the different modes in order to achieve a variety of objectives. For example, the multi-mode engine achieves low NOx emissions in the PCCI mode while enhancing startability by providing a high compression ratio or spark ignition. In addition, the engine can achieve a high cylinder pressure at high BMEP by switching to a lower compression ratio spark-ignited mode. The multi-mode engine also permits stable combustion to occur after switching to late injection which results in a stratified charge by rapidly adjusting the compression ratio. Also, fuel consumption can be effectively controlled using high compression, PCCI operation and stratified charge operation requiring no throttling which have excellent thermal efficiency. This operation also improves transient response by going from PCCI to late injection, stratified charge to suddenly enrich the mixture. This multi-mode engine can also effectively minimize knock, and therefore knock damage, by effectively operating at lean PCCI or stratified charge or low compression ratio, lean burn or stoichiometric conditions. Of course, the engine operates to effectively control the start of combustion during PCCI operation by varying, for example, as discussed hereinabove, the temperature and/or the equivalence ratio and/or the pressure and/or the air/fuel mixture autoignition properties. This engine could run on a variety of fuels like gasoline or diesel fuel.

Another operating mode is dual injection in which an early injection is used to create a lean charge for PCCI operation. A second, late injection then adds a small amount of stratified fuel which can be either spark or compression ignited to help ignite the remaining fuel. This mode is similar to diesel pilot operation but would only be used during transition between the different modes of operation or during engine starting. Applicants have studied the effects of diesel pilot operation on emissions. FIG. 51 shows a comparison of the normalized heat release rate versus crank angle for the three different diesel pilot injection quantities into a PCCI engine operating on propane. A micro-pilot injection of 0.1% resulted in good heat release placement with no measurable increase in FSNOx. A diesel pilot of an amount estimated to supply 3.6% of the fuel energy resulted in a heat release curve having substantially the same shape as the previous case. The SOC is slightly more advanced than that of the 0.1% case despite a lower IMT and constant equivalence ratio. Also, FSNOx emissions have increased over the 0.1% case from zero to 3.9 g/kg. The final curves illustrates the heat release for a case with ~18% of the fuel energy coming from the diesel pilot. The heat release rate curve is shaped the same as the classic diesel heat release rate curve with a premixed burn spike and a diffusion burn region. Also, the FSNOx (15.3 g/kg) and FSHC (478 g/kg) are significantly higher than in the cases with smaller diesel pilots.

With respect to diesel pilot injection, as the percentage of fuel energy from the pilot increases, the start of combustion (SOC) becomes more advanced, despite the lowering of IMT and a constant equivalence ratio. This earlier SOC is caused by the diesel fuel autoigniting earlier than the propane. As the percentage of pilot increases, the heat released by the pilot during the compression stroke increases, leading to higher temperatures earlier in the cycle. Higher temperatures increase the chemical reaction rates of reactions involving propane, leading to earlier autoignition of the propane. Therefore, extremely low NOx levels and good heat release placement can be achieved when using a very small diesel pilot or micropilot, preferably less than 4% of the total fuel energy.

Applicants have also studied the control of noise associated with PCCI combustion. Level of noise generated by PCCI combustion is related to the knock intensity. Thus, as knock intensity is decreased, noises decreases. As shown in FIGS. 4a, 4c and 6, lowering cylinder pressure, for example, by retarding the SOC, substantially decreases the knock intensity and, therefore, noise. The present engine and control system permits continuous PCCI combustion with minimal noise by avoiding excessive peak cylinder pressures while maintaining the required cylinder pressure necessary for efficient, low emission PCCI combustion and the desired power output.

The control system of the present invention operates to actively and variably control the mixture's temperature, pressure, autoignition characteristic and equivalence ratio to ensure that the combustion event occurs between 20 crank angle degrees BTDC and 35 crank angle degrees ATDC. The control system achieves this function by using combustion sensor 16, e.g. pressure sensor, to signal the start of combustion or the location of the heat release event for each cycle. Also, ECU 20, which receives the signals from sensor 16, determines whether the SOC is occurring within a predetermined crank angle range and determines whether the duration of combustion is within a predetermined desired crank angle range. One conventional way for the ECU to determine the optimum SOC would be to use a look-up table. If the SOC and/or the duration of combustion are outside the predetermined crank angle range, then ECU 20 determines the appropriate control variable or variables to adjust, and generates and sends the appropriate signal 22 to the chosen control mechanism or mechanisms, e.g. air cooler 28, heater 30, glow plug 44, fuel control valves 39, 41, variable compression ratio device 38, etc., as discussed hereinabove. The control variables are varied as required to maintain the timing of the start of PCCI combustion preferably between 20 crank angle degrees BTDC and 10 crank angle degrees ATDC, and to maintain the duration of combustion in the range of 5–30 crank angle degrees.

Applicants have determined that, in order to initiate and maintain PCCI combustion upon start-up in a cold engine, the conditions in the cylinders, e.g. temperature and/or pressure, must be actively influenced. For example, the intake air temperature could be raised using heater 30 and/or a glow plug 44, and/or the in-cylinder walls heated using a cylinder wall heater 51 and/or an engine coolant/lubricating oil heater. Also, the in-cylinder pressure and temperature could be increased using variable compression ratio device 38. Another effective control feature for enhancing startability is to add small amounts of ozone to the intake air supply using injector 42, or into the cylinder using injector 40. Alternatively, or additionally, one of the fuel supplies could have a high autoignition property, e.g. low octane number. Also, the engine may be operated in a non-PCCI, for example, as a spark-ignition, dual fuel or diesel engine, during starting of the engine. One or a combination of these controls are varied, in accordance with the principles discussed hereinabove with respect to each control feature, to cause PCCI combustion to occur. As the engine starts, the ECU will monitor the start of combustion and duration of combustion by receiving combustion data, e.g. pressure signals, from sensor 16 throughout engine operation.

Figure 8:
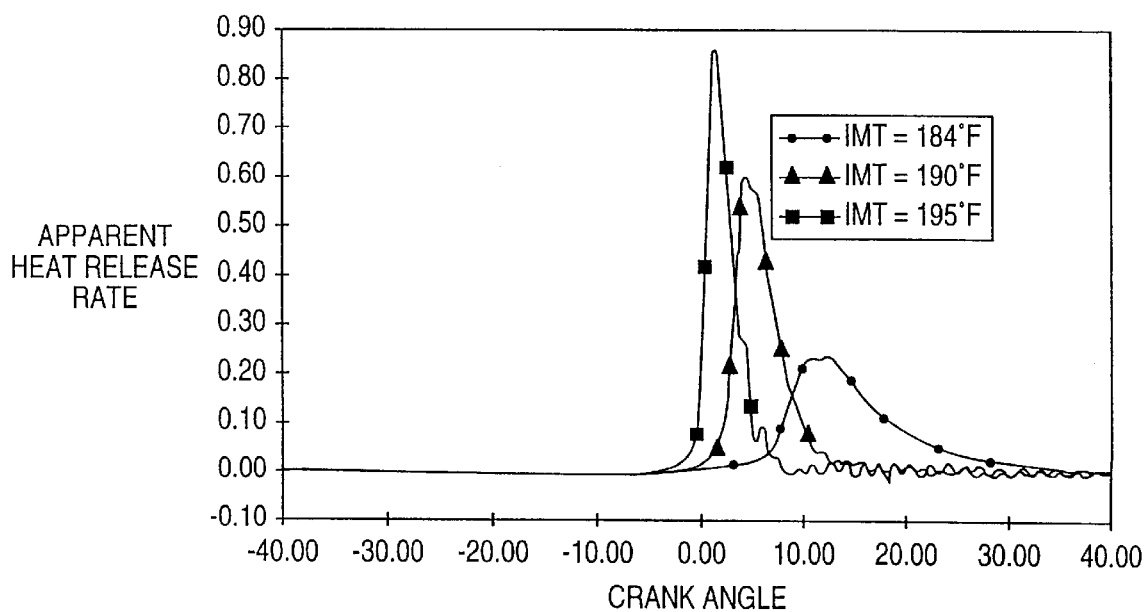
FIG. 8 is a graph showing apparent heat release rate as a function of crank angle for three different intake manifold temperatures.

Once the engine is warmed up, the SOC and duration of combustion will vary due to the sensitivity of PCCI combustion to the temperature and pressure history. Small variations in the numerous factors affecting temperature and pressure history, such as combustion chamber wall temperature, IMT, equivalence ratio, IMP, etc. result in significant variation in the SOC and the duration of combustion. During operation, the control system of the present invention will vary one or more of the control variables, that is, temperature, pressure, air/fuel mixture autoignition properties and/or equivalence ratio, using the various control mechanisms discussed hereinabove, in such a manner to maintain the SOC and duration of combustion in the desired ranges. For example, applicants have shown that SOC can be advanced from 5° ATDC to 0.5° BTDC by increasing the IMT from 184° F. to 195° F., as shown in FIG. 8. Applicants have also shown that increasing CR, which raises the in-cylinder temperatures, can be used to advance SOC. For example, FIG. 21 shows that increasing CR from 14:1 to 22:1 advanced the SOC from 2° ATDC to 13° BTDC when the equivalence ratio was 0.35 and IMT was 380 K. In addition, applicants have shown that increasing RMF to raise the temperature of the charge also can be used to advance SOC. When RMF was increased by adjusting exhaust valve lash from 0.025" to 0.046", the SOC advanced from 6.4° ATDC to 1.7° ATDC, as shown in FIG. 16. Heat transfer to the charge, whether from active heating elements or hot surfaces such as the combustion chamber walls, has also been shown to advance SOC. Applicants have also shown that, with a glow plug installed in the combustion chamber, the SOC retarded from 0.6° ATDC to 1.5° ATDC after the glow plug had been turned off, as shown in FIG. 11. Applicants have determined, as shown in FIG. 9, that increasing combustion chamber wall temperatures from 400 K to 933 K can advance the SOC from 7° ATDC to 14° BTDC.

With respect to pressure control, increasing IMP serves to advance the SOC. FIG. 31c, for example, shows that increasing IMP on the single cylinder engine from 52 psia to 57 psia caused the SOC to advance from 3.7° ATDC to 1.5° BTDC. Any method of affecting cylinder pressure, such as varying compression ratio or changing valve timing, both illustrated above, can be used to control SOC.

Figure 38:
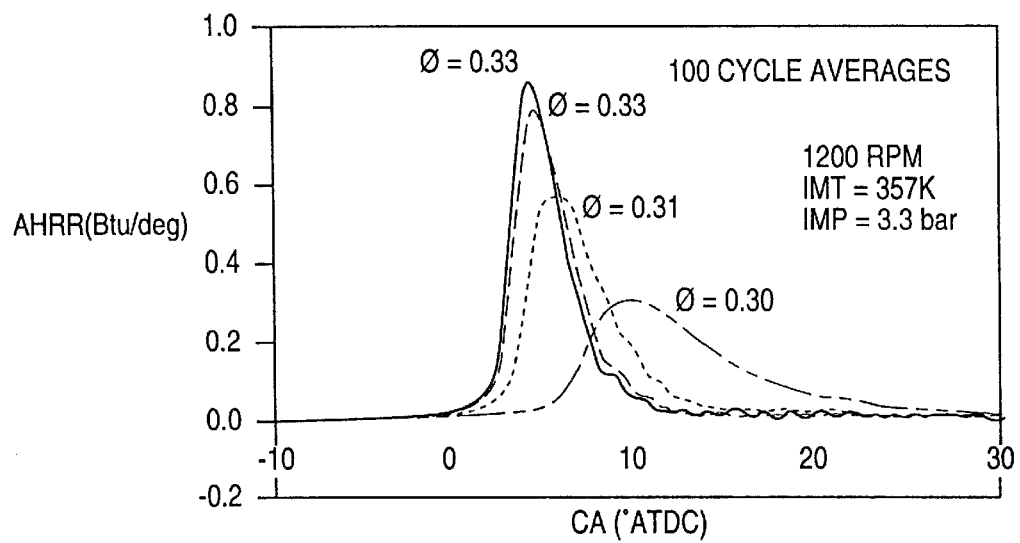
FIG. 38 is a graph showing the effects of variations in the equivalence ratio on the magnitude and timing, or location, of the heat release rate.

With respect to equivalence ratio, applicants have determined, as shown in FIG. 38, show that increasing equivalence ratio from 0.30 to 0.33 by increasing fuel flow to the engine advanced the SOC from 5.5° ATDC to 2.0° ATDC. Also, varying the autoignition properties of the air/fuel mixture by the addition of reactive species or even diluent can affect SOC. Applicants have shown that for the case shown in FIG. 33, increasing the amount of ozone added to the charge from 0 to 36 g/kg of fuel had the effect of advancing SOC from 1° ATDC to 12.5° BTDC. In one study where diesel fuel was used in a pilot injection to initiate SOC in an air-propane mixture, the amount of pilot used affected SOC. For example, when pilot quantity was increased from approximately 0.1% to 18% of the total fuel energy, the SOC advanced from 2° ATDC to 10° BTDC. In one study, EGR was used as a diluent to retard SOC while holding IMT constant with an aftercooler. As shown in FIG. 17, when EGR rate was increased from 2.9% to 8.0%, the SOC retarded from 1.2° ATDC to 4.2° ATDC. Applicants have shown that increasing the air/fuel mixture's resistance to autoignition by increasing octane number, for example, can be used to retard SOC. Also, applicants have shown that when octane number was increased from 80 to 100, the SOC retarded from 14° BTDC to 7° BTDC for a case where IMT plus reheat was 311 K.

Of course, any of these control variables could be adjusted in the opposite direction from the above examples to achieve the opposite effect on SOC if necessary. For example, rather than increasing IMT to advance SOC, IMT could be decreased to retard SOC. Also, the magnitudes of such variations would be increased or decreased as necessary to maintain the desired SOC.

Applicants have shown that the combustion or heat release duration can be affected by varying different parameters. As SOC is retarded, the heat release duration increases. For example, FIG. 8 shows that as SOC is retarded, by reducing IMT from 195 degrees F. to 184 degrees F., the duration increases from approximately 6 degrees to approximately 24 degrees. Similarly, increasing the equivalence ratio decreases the heat release duration. Applicants also believe that increasing the degree of temperature and equivalence ratio stratification of the charge increases the heat release duration. However, given the difficulty of measuring the degree of temperature or equivalence ratio stratification more work is needed to quantify the level of stratification.

Of course, given the relationship between SOC and duration, any control strategy that retards SOC should also increase the duration. By maintaining the SOC and the duration of combustion in the desired ranges while controlling the equivalence ratio to ensure lean burn conditions, the control system minimizes NOx emissions. Also, the present engine design, also reduces UHC and CO emissions by minimizing the crevices in the cylinder thereby minimizing the unburned gases as shown in FIGS. 48a–50b.

During operation, balancing the combustion processes between the cylinders of the engine of FIG. 1b can be accomplished by varying any of the control variables used to control the SOC, as discussed hereinabove. The ECU 20 compares the SOC and duration of combustion data provided by sensor 16 for each cylinder. When the data indicates that the SOC and/or duration of combustion of one or more cylinders is occurring outside a predetermined crank angle range, the ECU will determine the appropriate control variable or variables most effective for the given operating conditions and generates a control signal for controlling the control variable to cause the SOC and/or duration of combustion to adjust so as to fall within the desired range. Applicants have determined that cylinder balancing is best achieved by controlling equivalence ratio, adding ozone to the mixture, controlling individual heaters associated with each cylinder intake port, varying compression ratio using device 38 or variable valve timing, adding oil via pilot injection or port fuel injection, port injection of water and/or any of the methods discussed hereinabove for varying EGR or RMF. Any of these or other forms of combustion control could be used alone, or in a variety of combinations, to enhance combustion balancing control. For example, the combustion control provided by the multiple fuel/additive system described hereinabove could be enhanced by providing variable valve timing and/or combustion chamber surface temperature cooling, e.g. engine coolant, or piston cooling nozzle control. Also, one or more glow plugs 44 (FIG. 1a) may be used as an inexpensive, easy method of achieving at least partial control over combustion balancing between the cylinders. It may also be possible to control the EGR rate for each cylinder in order to balance combustion quality.

Industrial Applicability

The present PCCI engine and control system may be used in any stationary or nonstationary power plant, including any automotive, industrial, marine or military application. The present PCCI engine and control system is especially advantageous in any power generation application where low emissions are desirable.

We claim:

1. An internal combustion engine operable in a premixed charge compression ignition mode, comprising:

an engine body;

a combustion chamber formed in the engine body for containing a mixture of fuel and air;

combustion history control means for controlling a combustion history of future combustion events to optimize engine operation, said combustion history control means including at least one of a temperature control means for varying the temperature of the mixture of fuel and air, a pressure control means for ultimately varying the pressure of the mixture, an equivalence ratio control means for varying an equivalence ratio of the mixture and a mixture autoignition property control means for varying an autoignition property of the mixture;

engine operating condition detecting means for detecting an engine operating condition indicative of the combustion history and generating an engine operating condition signal indicative of said engine operating condition; and processing means for receiving said engine operating condition signal, determining a combustion history value based on said engine operating condition signal, and generating one or more control signals based on said combustion history value, said one or more control signals controlling at least one of said temperature control means, said pressure control means, said equivalence ratio control means and said mixture autoignition property control means to variably control the combustion history of future combustion events.

2. The engine of claim 1, wherein said processing means compares said combustion history value to a predetermined desired combustion history value and generates said one or more control signals based on the comparison of said combustion history value to said predetermined desired combustion history value, said at least one control signal controlling said at least one of said temperature control system, said pressure control system, said equivalence ratio control system and said mixture autoignition property control system to cause said combustion history value to approach said predetermined desired combustion history value.

3. The engine of claim 1, wherein said engine operating condition detecting means includes a start of combustion sensor for sensing the start of combustion and generating a start of combustion signal, said combustion history value being determined based on said start of combustion signal.

4. The engine of claim 3, wherein said processing means compares said combustion history value to a predetermined desired combustion history value and generates said one or more control signals based on the comparison of said combustion history value to said predetermined desired combustion history value, said at least one control signal controlling said at least one of said temperature control system, said pressure control system, said equivalence ratio control system and said mixture autoignition property control system to cause said combustion history value to approach said predetermined desired combustion history value.

5. The engine of claim 3, wherein said start of combustion sensor is a cylinder pressure sensor.

6. The engine of claim 3, wherein said combustion history control means includes said temperature control means and said pressure control means.

7. The engine of claim 6, wherein said pressure control means includes a compression ration varying means for varying at least one of an effective compression ratio varying means for varying at least one of an effective compression ratio and a geometric compression ration so as to selectively vary the pressure in said combustion chamber to control a timing of the start of combustion.

8. The engine of claim 7, wherein said compression ration varying means includes a plunger movabley counted on said engine body adjacent said combustion chamber, said plunger movable from a retracted position into an extended position toward said combustion chamber to decrease the size of said combustion chamber and increase the geometric compression ratio.

9. The engine of claim 8, wherein said plunger is hydraulically actuated into the extended position.

10. The engine of claim 7, wherein said engine is an opposed piston engine.

11. The engine of claim 10, wherein said opposed piston engine includes a first piston mounted on a first crankshaft and a second piston mounted on a second crankshaft opposite said first piston, said combustion chamber being formed between said first and said second pistons, said compression ratio varying device including a phase shifting mechanism for varying a relative phase of rotation between said first and said second crankshafts.

12. The engine of claim 1, wherein said engine operating condition detecting means is a cylinder pressure sensor.

13. The engine of claim 1, wherein said combustion history control means includes said temperature control means and said equivalence ratio control means.

14. The engine of claim 1, wherein said combustion history control means includes said temperature control means and said mixture autoignition property control means.

15. The engine of claim 14, further including an intake air system for delivering intake air to said combustion chamber, wherein said mixture autoignition property control means includes a delivery device mounted on said engine body for delivery a reactive fluid into at least one of said intake system and said combustion chamber to control at least one of a timing of a start of combustion and a duration of combustion.

16. The engine of claim 15, wherein said delivery device delivers ozone to advance the timing of the start of combustion.

17. The engine of claim 15, wherein said delivery device delivers ozone to advance the timing of the start of combustion.

18. The engine of claim 14, further including an intake air system for delivery intake air to said combustion chamber and an exhaust gas system for directing exhaust gas from said combustion chamber, wherein said mixture autoignition property control means includes an exhaust gas recirculation system for delivering exhaust gas from said exhaust gas system to said intake air system to dilute said intake air so as to control a timing of a start of combustion.

19. The engine of claim 14, further including an intake air system for delivery intake air to said combustion chamber and a fuel supply system connected to said intake air system for directing fuel into one of said intake air system and said combustion chamber, said mixture autoignition property control means including a first fuel supply having a first autoignition property and a second fuel supply having a second autoignition property different from said first auotignition property.

20. The engine of claim 1, wherein said combustion history control means includes said pressure control means and said equivalence ratio control means.

21. The engine of claim 1, wherein said combustion history control means includes said pressure control means and said mixture autoignition property control means.

22. The engine of claim 1, wherein said combustion history control means includes said equivalence ratio control means and said mixture autoignition property control means.

23. The engine of claim 1, further including an intake air system for delivering intake air to said combustion chamber, wherein said combustion history control means includes said temperature control means, said temperature control means including at least one of an intake air temperature control means for controlling the temperature of the intake air or the mixture of air and fuel in the intake system and an in-cylinder temperature control means for controlling the temperature of the mixture in said combustion chamber.

24. The engine of claim 23, wherein said temperature control means includes said intake air temperature control means, said intake air temperature control means including an air heater means positioned in said intake air system.

25. The engine of claim 24, wherein the engine includes a plurality of combustion chambers, said intake air system including a respective intake port associated with each of said plurality of combustion chambers for directing intake air to the respective combustion chamber, said air heater means including a respective intake air heater positioned in each respective intake duct.

26. The engine of claim 23, wherein said intake air temperature control means further includes an air cooler positioned in said intake air system.

27. The engine of claim 23, further including an exhaust gas system for directing exhaust gas from said combustion chamber, wherein said temperature control means includes said intake air temperature control means, said intake air temperature control means including an exhaust gas recirculation system for delivering exhaust gas from said exhaust gas system to said intake air system to control intake air temperature.

28. The engine of claim 27, further including an air compressor positioned in said intake air system for compressing the intake air, said exhaust gas recirculation system delivering exhaust to said intake air system upstream of said air compressor.

29. The engine of claim 23, wherein said temperature control means includes said intake air temperature control means, said intake air temperature control means including a water injection device for injecting water into said intake air system.

30. The engine of claim 23, wherein the engine includes a plurality of combustion chambers, said intake air system including one or more air manifolds for delivering intake air to said plurality of combustion chambers, further including a fuel supply system connected to said intake air system upstream of said one or more air manifolds for directing fuel into said intake air system.

31. The engine of claim 30, wherein said fuel supply system includes a first fuel supply and a second fuel supply, said first and said second fuel supplies having different autoignition properties.

32. The engine of claim 23, wherein said temperature control means includes said in-cylinder temperature control means, said in-cylinder temperature control means including a residual mass fraction control means for varying a residual mass fraction of combustion products remaining in said combustion chamber from one combustion event to a subsequent combustion event.

33. The engine of claim 32, further including an exhaust port formed in said engine body and an exhaust valve operable to open and close said exhaust port, wherein said residual mass fraction control means varies a timing of closing of said exhaust port by said exhaust valve to vary the amount of said residual mass fraction.

34. The engine of claim 23, wherein said engine body includes combustion chamber walls forming said combustion chamber, said temperature control means including said in-cylinder temperature control means, said in-cylinder temperature control means including a combustion chamber wall temperature control means for varying the temperature of said combustion chamber walls.

35. The engine of claim 34, wherein said combustion chamber wall temperature control means includes a coolant temperature control system for varying the temperature of engine coolant to vary the temperature of said combustion chamber walls.

36. The engine of claim 34, wherein said combustion chamber wall temperature control means includes an electric heater mounted on said engine body adjacent said combustion chamber walls.

37. The engine of claim 23, wherein said engine body includes an engine block, a cylinder formed in said engine block and a cylinder head, said temperature control means includes said in-cylinder temperature control means, said in-cylinder temperature control means including a glow plug mounted in said cylinder head for heating the mixture of air and fuel in said combustion chamber.

38. The engine of claim 23, further including a rotatable crankshaft mounted on said engine body, a cylinder formed in said engine body and a piston operatively connected to said crankshaft for reciprocal movement in said cylinder, wherein said temperature control means includes said in-cylinder temperature control means, said in-cylinder temperature control means including a compression ratio varying means for varying at least one of an effective compression ratio and a geometric compression ratio of said cylinder.

39. The engine of claim 38, wherein said compression ratio varying means includes a plunger movably mounted on said engine body adjacent said combustion chamber, said plunger movable from a retracted position into an extended position toward said combustion chamber to decrease the size of said combustion chamber and increase the geometric compression ratio of said cylinder.

40. The engine of claim 39, wherein said plunger is hydraulically actuated into the extended position.

41. The engine of claim 38, wherein said engine is an opposed piston engine.

42. The engine of claim 41, wherein said opposed piston engine includes a first piston mounted on a first crankshaft and a second piston mounted on a second crankshaft opposite said first piston, said combustion chamber being formed between said first and said second pistons, said compression ratio varying device including a phase shifting mechanism for varying a relative phase of rotation between said first and said second crankshafts.

43. The engine of claim 38, further including an intake port formed in said engine body and an intake valve operable to open and close said intake port, wherein said compression ratio varying means varies the timing of closing of said intake port by said intake valve to vary the effective compression ratio.

44. The engine of claim 23, wherein said temperature control means includes said in-cylinder temperature control means, said in-cylinder temperature control means including an injector for injecting a fluid into said combustion chamber to vary the temperature of the mixture of air and fuel.

45. The engine of claim 6, further including an intake air system for delivery intake air to said combustion chamber, wherein said pressure control means includes an intake air pressure control means for varying the pressure of the intake air in said intake air system to vary the pressure of the mixture in the combustion chamber.

46. The engine of claim 45, wherein said intake air pressure control means includes a turbocharger mounted in said intake air system.

47. The engine of claim 46, wherein said intake air pressure control means further includes a bypass circuit for bypassing exhaust gas around said turbocharger and a waste gate valve positioned in said bypass circuit for varying exhaust flow through said bypass circuit.

48. The engine of claim 45, wherein said intake air pressure control means includes a throttle valve positioned in said intake air system.

49. The engine of claim 1, further including an intake air system for delivering intake air to said combustion chamber, wherein said combustion history control means includes said mixture autoignition property control means, said mixture autoignition property control means including a delivery device mounted on said engine body for delivering a reactive fluid into at least one of said intake system and said combustion chamber to control at least one of a timing of a start of combustion and a duration of combustion.

50. The engine of claim 1, further including an intake air system for delivering intake air to said combustion chamber and an exhaust gas system for directing exhaust gas from said combustion chamber, wherein said combustion history control means includes said mixture autoignition property control means, said mixture autoignition property control means including an exhaust gas recirculation system for delivering exhaust gas from said exhaust gas system to said intake air system to dilute said intake air so as to control a timing of a start of combustion.

51. The engine of claim 1, further including an intake air system for delivering intake air to said combustion chamber and a fuel supply system connected to said intake air system for directing fuel into one of said intake air system and said combustion chamber, wherein said combustion history control means includes said mixture autoignition property control means, said mixture autoignition property control means including a first fuel supply having a first autoignition property and a second fuel supply having a second autoignition property different from said first auto ignition property.

52. The engine of claim 1, further including a combustion chamber crevice minimizing means for minimizing the formation of unburned hydrocarbons in combustion chamber crevices during combustion.

53. The engine of claim 52, wherein said engine body includes a cylinder block including a cylinder and a cylinder head, further including a piston reciprocally mounted in said cylinder to form said combustion chamber, said crevice minimizing means including a cutback formed in said piston adjacent said combustion chamber for enlarging a crevice volume.

54. The engine of claim 52, wherein said engine body includes a cylinder block including a cylinder and a cylinder head, said crevice volume minimizing means including a combustion cup formed in said cylinder head in communication with said combustion chamber.

55. The engine of claim 52, wherein said engine body includes a cylinder block including a cylinder and a cylinder head, further including a piston reciprocally mounted in said cylinder to form said combustion chamber, said crevice minimizing means including a heater means positioned adjacent said combustion chamber for heating the mixture in the crevices.

56. The engine of claim 1, further including a rotatable crankshaft and a piston operatively connected to said crankshaft for reciprocal movement through a top dead center position, wherein said one or more control signals controls at least one of said temperature control means, said pressure control means, said equivalence ratio control means and said mixture autoignition property control means to variably control the combustion history of future combustion events to cause the start of combustion to occur between 20 crank angle degrees before said top dead center position and 10 crank angle degrees after said top dead center position.

57. The engine of claim 56, wherein said one or more control signals controls at least one of said temperature control means, said pressure control means, said equivalence ratio control means and said mixture autoignition property control means to variably control the combustion history of future combustion events to cause combustion to occur over a range of 5–30 crank angle degrees.

58. The engine of claim 1, further including a plurality of combustion chambers, at least one of said plurality of combustion chambers operating in a premixed charge compression ignition mode and the remaining combustion chambers operating in a diesel mode.

59. The engine of claim 58, further including an exhaust gas recirculation system connected to said at least one cylinder operating in a premixed charge compression ignition mode.

60. The engine of claim 1, wherein said engine body includes an engine block and a plurality of cylinders formed in said engine block, each of said plurality of cylinders including a combustion chamber, said temperature control means including a cylinder temperature compensating means for heating the mixture of air and fuel in at least two of said combustion chambers to compensate for heat loss.

61. The engine of claim 60, further including an engine coolant system formed in said engine body for circulating engine coolant, wherein said cylinder temperature compensating means includes an engine coolant control system for controlling at least one of a coolant temperature and a coolant flow rate of the coolant in said coolant system.

62. The engine of claim 1, wherein said engine includes a plurality of combustion chambers formed in the engine body, an intake air system for supplying intake air to said plurality of combustion chambers, and an exhaust system for directing exhaust gas from said plurality of combustion chambers, said combustion history control means controlling a combustion history of future combustion events in each of said plurality of combustion chambers to optimize engine operation, further including a combustion balancing means for variably adjusting operating conditions in each of said plurality of combustion chambers to achieve a similar combustion history for combustion events of said plurality of combustion chambers to balance combustion between said plurality of combustion chambers.

63. The engine of claim 62, wherein said exhaust system includes a respective exhaust port associated with each of said plurality of combustion chambers and formed in said engine body, and a respective exhaust valve operable to open and close said exhaust port at predetermined times during operation of the engine, wherein said combustion balancing means includes a variable exhaust valve timing control means associated with each of said plurality of combustion chambers for receiving a variable valve timing control signal from said processor and varying the timing of closing of said exhaust port by said respective exhaust valve to vary an amount of residual exhaust gas remaining in said combustion chamber after a combustion event so as to balance combustion events between said plurality of combustion chambers.

64. The engine of claim 62, wherein said intake system includes a respective intake port associated with each of said plurality of combustion chambers and formed in said engine body, and a respective intake valve operable to open and close said respective intake port at predetermined times during operation of the engine, wherein said combustion balancing means includes a variable intake valve timing control means associated with each of said plurality of combustion chambers for receiving a variable valve timing control signal from said processor and varying the timing of closing of said respective intake port by said respective intake valve so as to balance combustion events between said plurality of combustion chambers.

65. The engine of claim 62, wherein said combustion balancing means includes an injector mounted on said engine body for injecting a balancing fluid into one of said intake system and said plurality of combustion chambers, said balancing fluid chancing t he autoignition property of the mixture.

66. The engine of claim 65, wherein said balancing fluid is at least one of a fuel, water, oil, oxygen and ozone.

67. The engine of claim 62, wherein said intake system includes a respective intake port associated with each of said plurality of combustion chambers and form ed in said engine body, said combustion balancing means including a respective heater mounted in each of said respective intake ports for receiving heater signals for variably controlling the temperature of the intake air.

68. The engine of claim 62, wherein said combustion balancing means includes a variable compression ratio means associated with each of said plurality of combustion chambers for varying a compress ion ratio of each of said plurality of combustion chambers to maintain combustion balance between said plurality of combustion chambers.

69. The engine of claim 62, wherein said combustion balancing means includes a fuel supply system connected to said intake air system for directing fuel into said intake air system, wherein said fuel supply system includes a first fuel supply and a second fuel supply, said first and said second fuel supplies having different autoignition properties.

70. The engine of claim 62, wherein said engine body includes combustion chamber walls forming each of said plurality of combustion chambers, said combustion balancing means including a combustion chamber wall temperature control means for varying the temperature of said combustion chamber walls.

71. The engine of claim 70, further including an engine coolant system formed in said engine body for circulating engine coolant, wherein said combustion chamber wall temperature control means includes a coolant temperature control system for varying the temperature of engine coolant in said engine coolant system to vary the temperature of said combustion chamber walls.

72. The engine of claim 70, wherein said combustion chamber wall temperature control means includes an electric heater mounted on said engine body adjacent said combustion chamber for heating said combustion chamber walls.

73. The engine of claim 62, wherein said combustion balancing means includes a glow plug mounted on said engine body adjacent said combustion chamber for heating the mixture of air and fuel in said combustion chamber.

74. The engine of claim 62, wherein said combustion balancing means includes an equivalence ratio varying means associated with each of said plurality of combustion chambers for varying an equivalence ratio in each of said plurality of combustion chambers to maintain combustion balance between said plurality of combustion chambers.

75. The engine of claim 62, wherein said combustion balancing means includes a combustion chamber temperature control means associated with each of said plurality of combustion chambers for controlling the temperature of the mixture in each combustion chamber, said combustion chamber temperature control means including a residual mass fraction control means for varying a residual mass fraction of combustion products remaining in each combustion chamber from one combustion event to a subsequent combustion event to maintain combustion balance between said plurality of combustion chambers.

76. A premixed charge compression ignition internal combustion engine, comprising:
  an engine body;
  a plurality of cylinders formed in the engine body;
  a respective piston mounted in each of said plurality of cylinders for reciprocal movement, each respective piston defining a combustion chamber for containing a mixture of fuel and air;

an intake air system for supplying intake air to said plurality of cylinders;

an exhaust system for directing exhaust gas from said plurality of cylinders;

combustion history control system for controlling a combustion history of future combustion events in said combustion chamber of each of said plurality of cylinders to optimize engine operation, said combustion history control system including to optimize engine operation, said combustion history control system including at least two of a temperature control system for ultimately varying the temperature of the mixture of fuel and air, a pressure control system for ultimately varying the pressure of the mixture, and equivalence ration control system for varying an equivalence ratio of the mixture and a mixture autoignition property control system for varying an autoignition property of the mixture;

engine operating condition detecting device for detecting an engine operating condition indicative of the combustion history and generating an engine operating condition signal indicative of said engine operating condition; and a processor for receiving said engine operating condition signal, determining a combustion history value based on said engine operating condition signal, and generating one or more control signals based on said combustion history value, said one or more control signals controlling at least one of said temperature control system, said pressure control system, said equivalence ratio control system and said mixture autoignition property control system to variably control the combustion history of future combustion events.

77. The engine of claim 76, wherein said engine operating condition detecting means including a respective combustion sensor mounted in each of said plurality of cylinders for sensing at least one of a start of combustion and a duration of combustion and generating a combustion signal, said combustion history value being determined for each combustion based on said combustion signal.

78. The engine of claim 77, further including a cylinder combustion balancing means for variably adjusting operating conditions in said combustion chamber of each of said plurality of cylinders to achieve a similar combustion history for combustion events of said plurality of cylinders to balance combustion between said plurality of cylinders.

79. The engine of claim 78, wherein said exhaust system includes a respective exhaust port associated with each of said plurality of cylinders and formed in said engine body, and and exhaust value operable to open and close said exhaust port at predetermined times during operation of the engine, wherein said cylinder combustion balancing means includes a variable exhaust valve timing control means associated with each of said plurality of cylinders for receiving a variable valve timing control signal from said processor and varying the timing of closing of said exhaust port by said respective exhaust valve to vary an amount of residual exhaust gas remaining in said combustion chamber after a combustion event so as to balance combustion events between said plurality of cylinders.

80. The engine of claim 78, wherein said intake system includes a respective intake port associated with each of said plurality of cylinders and formed in said engine body, and a respective intake valve operable to open and close said respective intake port at predetermined times during operation of the engine, wherein said cylinder combustion balancing means includes a variable intake valve timing control valve timing control signal from said processor and varying the timing of closing of said respective intake port by said respective intake valve so as to balance combustion events between said plurality of cylinders.

81. The engine of claim 78, wherein said cylinder combustion balancing means includes an injector mounted on said engine body for injecting a balancing fluid into one of said intake system and said combustion chamber, said balancing fluid changing the autoignition property of the mixture.

82. The engine of claim 81, wherein said balancing fluid is at least one of a fuel, water, oil, oxygen and ozone.

83. The engine of claim 78, wherein said intake system includes a respective intake port associated with each of said plurality of cylinders and formed in said engine body, said cylinder combustion balancing means including a respective heater mounted in each of said respective intake ports for receiving heater signals for variably controlling the temperature of the intake air.

84. The engine of claim 78, wherein said cylinder combustion balancing means includes a variable compression ratio means associated with each of said plurality of cylinders for varying a compression ratio of each of said plurality of cylinders to maintain combustion balance between said plurality of cylinders.

85. The engine of claim 78, wherein said cylinder combustion balancing means includes a fuel supply system connected to said intake air system for directing fuel into said intake air system, wherein said fuel supply system includes a first fuel supply and a second fuel supply, said first and said second fuel supplies having different autoignition properties.

86. The engine of claim 78, wherein said cylinder combustion balancing means includes a glow plug mounted on said engine body adjacent said combustion chamber for heating the mixture of air and fuel in said combustion chamber.

87. The engine of claim 78, wherein said cylinder combustion balancing means includes an equivalence ratio varying means associated with each of said plurality of cylinders for varying an equivalence ratio in each of said plurality of cylinders to maintain combustion balance between said plurality of cylinders.

88. The engine of claim 78, wherein said cylinder combustion balancing means includes an in-cylinder temperature control means associated with each of said plurality of cylinders for controlling the temperature of the mixture in each combustion chamber, said in-cylinder temperature control means including a residual mass fraction control means for varying a residual mass fraction of combustion products remaining in each combustion chamber from one combustion event to a subsequent combustion event to maintain combustion balance between said plurality of cylinders.

89. The engine of claim 77, wherein said engine body includes combustion chamber walls forming said combustion chamber, said cylinder combustion balancing means including a combustion chamber wall temperature control means for varying the temperature of said combustion chamber walls.

90. The engine of claim 89, further including an engine coolant system formed is said engine body for circulating engine coolant, wherein said combustion chamber wall temperature control means includes a coolant temperature control system for varying the temperature of engine coolant is said engine coolant system to vary the temperature of said combustion chamber walls.

91. The engine of claim 89, wherein said combustion chamber wall temperature control means includes an electric heater mounted on said engine body adjacent said combustion chamber for heating said combustion chamber walls.

92. The engine of claim 77, wherein said combustion history control system includes said temperature control system, said temperature control system including at least one of an intake air temperature control means for controlling the temperature of the intake air or the mixture of air and fuel in the intake system and an in-cylinder temperature control means for controlling the temperature of the mixture in the combustion chamber.

93. The engine of claim 92, wherein said temperature control system includes said intake air temperature control means, said intake air temperature control means including at least one of an air heater positioned in said intake air system and an air cooler positioned in said intake air system.

94. The engine of claim 92, wherein said temperature control system includes said intake air temperature control means, said intake air temperature control means including an exhaust gas recirculation system for delivering exhaust gas from said exhaust gas system to said intake air system to control intake air temperature.

95. The engine of claim 92, wherein said temperature control system includes said intake air temperature control means, said intake air temperature control means including a water injection device for injecting water into said intake air system.

96. The engine of claim 92, wherein said temperature control system includes said in-cylinder temperature control means, said in-cylinder temperature control means including a residual mass fraction control means for varying a residual mass fraction of combustion products remaining in said combustion chamber from one combustion event to a subsequent combustion event.

97. The engine of claim 96, further including an exhaust port formed in said engine body and an exhaust valve operable to open and close said exhaust port in timed relation to a combustion event, wherein said residual mass fraction control means varies the timing of closing of said exhaust port by said exhaust valve to vary the amount of said residual mass fraction.

98. The engine of claim 92, wherein said engine body includes combustion chamber walls forming said combustion chamber, said temperature control system including said in-cylinder temperature control means, said in-cylinder temperature control means including a combustion chamber wall temperature control means for varying the temperature of said combustion chamber walls, said combustion chamber wall temperature control means including at least one of a coolant temperature control system for varying the temperature of an engine coolant to vary the temperature of said combustion chamber walls and an electric heater mounted on said engine body adjacent said combustion chamber for heating said combustion chamber walls.

99. The engine of claim 92, wherein said temperature control system includes said in-cylinder temperature control means, said in-cylinder temperature control means including a glow plug mounted on said engine body for heating the mixture of air and fuel in said combustion chamber.

100. The engine of claim 92, wherein said temperature control system includes said in-cylinder temperature control means, said in-cylinder temperature control means including an injector for injecting a fluid into said combustion chamber to vary the temperature of the mixture of air and fuel.

101. The engine of claim 77, wherein said pressure control system includes a compression ratio varying means for varying at least one of an effective compression ratio and a geometric compression ratio so as to selectively vary the pressure in said combustion chamber to control a timing of the start of combustion.

102. The engine of claim 101, wherein said compression ratio varying means includes a plunger movably mounted on said engine body adjacent said combustion chamber, said plunger movable from a retracted position into an extended position toward said combustion chamber to decrease the size of said combustion chamber and increase the geometric compression ratio.

103. The engine of claim 101, wherein the engine is an opposed piston engine including a first piston mounted on a first crankshaft and a second piston mounted on a second crankshaft opposite said first piston, said combustion chamber being formed between said first and said second pistons, said compression ratio varying device including a phase shifting mechanism for varying a relative phase of rotation between said first and said second crankshafts.

104. The engine of claim 77, wherein said pressure control system includes an intake air pressure control means for varying the pressure of the intake air in said intake air system to vary the pressure of the mixture in said combustion chamber.

105. The engine of claim 104, wherein said intake air pressure control means includes a turbocharger mounted in said intake air system.

106. The engine of claim 77, wherein said mixture autoignition property control system includes a delivery device mounted on said engine body for delivering a reactive fluid into at least one of said intake system and said combustion chamber to control at least one of a timing of the start of combustion and a duration of combustion.

107. The engine of claim 77, further including a fuel supply system connected to said intake air system for directing fuel into said intake air system, said mixture autoignition property control system including a first fuel supply having a first autoignition property and a second fuel supply having a second autoignition property different from said first autoignition property.

108. The engine of claim 77, further including a combustion chamber crevice minimizing means for minimizing the formation of unburned hydrocarbons in combustion chamber crevices during combustion.

109. The engine of claim 108, wherein said crevice minimizing means includes a cutback formed in said piston adjacent said combustion chamber for enlarging a crevice volume.

110. The engine of claim 108, wherein said engine body includes a cylinder block and a cylinder head, said crevice volume minimizing means including a combustion cup formed in said cylinder head in communication with said combustion chamber.

111. The engine of claim 108, wherein said engine body includes a cylinder block and a cylinder head, said crevice volume minimizing means including a heater positioned adjacent said combustion chamber for heating the mixture positioned in combustion chamber crevices.

112. The engine of claim 77, further including a rotatable crank shaft mounted on said engine body, said piston being operatively connected to said crankshaft for reciprocal movement through a top dead center position, wherein said one or more control signals controls at least one of said temperature control system, said pressure control system, said equivalence ratio control system and said mixture autoignition property control system to variably control the combustion history of future combustion events to cause the start of combustion to occur between 20 crank angle degrees before said top dead center and 10 crank angle degrees after said top dead center position.

113. The engine of claim 112, wherein said one or more control signals controls at least one of said temperature control system, said pressure control system, said equivalence ratio control system and said mixture autoignition property control system to variably control the combustion history of future combustion events to cause combustion to occur over a range of 5–30 crank angle degrees.

114. The engine of claim 77, wherein at least one of said plurality of cylinders operates in a premixed charge compression ignition mode and the remaining cylinders operate in a diesel mode.

115. The engine of claim 114, further including an exhaust gas recirculation system for receiving exhaust gas flow from said at least one cylinder operating in a premixed charge compression ignition mode and directing the exhaust gas into intake air flowing into said remaining cylinders operating in a diesel mode.

116. A multi-mode internal combustion engine capable of operating in a plurality of modes for initiating combustion, comprising:
   an engine body;
   a combustion chamber formed in the engine body;
   an intake air system for delivery intake air to said combustion chamber;
   at least one of a fuel injection means mounted on said engine body for injecting fuel into one of said combustion chamber and said intake system while the engine operates in a diesel mode and a spark-ignition means mounted on said engine body for providing a spark for initiating combustion in said combustion chamber while the engine operates in a spark-ignition mode;
   a premixed charge compression ignition mode control means for operating the engine in a premixed charge compression mode, said premixed charge compression ignition mode control means including combustion history control means for controlling a combustion history of future combustion events to optimize engine operation, said combustion history control means including at least one of a temperature control means for ultimately varying the temperature of the mixture of fuel and air, a pressure control means for ultimately varying the pressure of the mixture, an equivalence ratio control means for varying an equivalence ratio of the mixture and a mixture autoignition property control means for varying an autoignition property of the mixture, said premixed charge compression ignition mode control means including an engine operating condition detecting means for detecting an engine operating condition indicative of the combustion history and generating an engine operating condition signal indicative of said engine operating condition, and a premixed charge compression ignition processing means for receiving said engine operating condition signal, determining a combustion history value based on said engine operating condition signal, and generating one or more control signals based on said combustion history value, said one or more control signals controlling at least one of said temperature control means, said pressure control means, said equivalence ratio control means and said mixture autoignition property control means to variably control the combustion history of future combustion events; and
   a mode processing means for transferring engine operation between said premixed charge compression ignition mode and at least one of said diesel and said spark-ignition modes.

117. The engine of claim 116, further including a cylinder formed in said engine body, a rotatable crankshaft mounted on the engine body and a piston operatively connected to said crankshaft for reciprocal movement, said pressure control means including a variable compression ratio means for varying one of an effective compression ratio and a geometric compression ratio of said cylinder between a first compression ratio and a second compression ratio, said mode processing means causing said cylinder to operate in said spark-ignited mode when said cylinder is operated at said first compression ratio and transferring operation of said cylinder to said premixed charge compression ignition mode when said cylinder is operating at said second compression ratio.

118. The engine of claim 116, wherein said engine operating condition detecting means includes a start of combustion sensor for sensing the start of combustion and generating a start of combustion signal, said combustion history value being determined based on said start of combustion signal.

119. The engine of claim 118, wherein said premixed charge compression ignition processing means compares said combustion history value to a predetermined desired combustion history value and generates said at least one control signal based on the comparison of said combustion history value to said desired combustion history value.

120. A premixed charge compression ignition internal combustion engine, comprising:
   an engine body;
   a plurality of cylinders formed in the engine body;
   a respective piston mounted in each of said plurality of cylinders for reciprocal movement, each respective piston defining a combustion chamber for containing a mixture of fuel and air;
   an intake air system for supplying intake air to said plurality of cylinders;
   an exhaust system for directing exhaust gas from said plurality of cylinders;
   combustion history control system for controlling a combustion history of future combustion events in said combustion chamber of each of said plurality of cylinders to optimize engine operation, said combustion history control system including at least one of a temperature control system for ultimately varying the temperature of the mixture of fuel and air, a pressure control system for ultimately varying the pressure of the mixture, an equivalence ratio control system for varying an equivalence ratio of the mixture and a mixture autoignition property control system for varying an autoignition property of the mixture;
   engine operating condition detecting device for detecting an engine operating condition indicative of the combustion history and generating an engine operating condition signal indicative of said engine operating condition;
   a processor for receiving said engine operating condition signal, determining a combustion history value based on said engine operating condition signal, and generating one or more control signals based on said combustion history value, said one or more control signals controlling at least one of said temperature control system, said pressure control system, said equivalence ratio control system and said mixture autoignition property control system to variably control the combustion history of future combustion events; and a cylinder combustion balancing means for variably adjusting operating conditions in said combustion chamber of each of said plurality of cylinders to achieve a similar combustion history for combustion events of said plurality of cylinders to balance combustion between said plurality of cylinders.

121. The engine of claim 120, wherein said exhaust system includes a respective exhaust port associated with each of said plurality of cylinders and formed in said engine body, and an exhaust valve operable to open and close said exhaust port at predetermined times during operation of the engine, wherein said cylinder combustion balancing means includes a variable exhaust valve timing control means associated with each of said plurality of cylinders for receiving a variable valve timing control signal from said processor and varying the timing of closing of said exhaust port by said respective exhaust valve to vary an amount of residual exhaust gas remaining in said combustion chamber after a combustion event so as to balance combustion events between said plurality of cylinders.

122. The engine of claim 120, wherein said intake system includes a respective intake port associated with each of said plurality of cylinders and formed in said engine body, and a respective intake valve operable to open and close said respective intake port at predetermined times during operation of the engine, wherein said cylinder combustion balancing means includes a variable intake valve timing control means associated with each of said plurality of cylinders for receiving a variable valve timing control signal from said processor and varying the timing of closing of said respective intake port by said respective intake valve so as to balance combustion events between said plurality of cylinders.

123. The engine of claim 120, wherein said cylinder combustion balancing means includes an injector mounted on said engine body for injecting a balancing fluid into one of said intake system and said combustion chamber, said balancing fluid changing the autoignition property of the mixture.

124. The engine of claim 123, wherein said balancing fluid is at least one of a fuel, water, oil, oxygen and ozone.

125. The engine of claim 120, wherein said intake system includes a respective intake port associated with each of said plurality of cylinders and formed in said engine body, said cylinder combustion balancing means including a respective heater mounted in each of said respective intake ports for receiving heater signals for variably controlling the temperature of the intake air.

126. The engine of claim 120, wherein said cylinder combustion balancing means includes a variable compression ratio means associated with each of said plurality of cylinders for varying a compression ratio of each of said plurality of cylinders to maintain combustion balance between said plurality of cylinders.

127. The engine of claim 120, wherein said cylinder combustion balancing means includes a fuel supply system connected to said intake air system for directing fuel into said intake air system, wherein said fuel supply system includes a first fuel supply and a second fuel supply, said first and said second fuel supplies having different autoignition properties.

128. The engine of claim 120, wherein said engine body includes combustion chamber walls forming said combustion chamber, said cylinder combustion balancing means including a combustion chamber wall temperature control means for varying the temperature of said combustion chamber walls.

129. The engine of claim 128, further including an engine coolant system formed in said engine body for circulating engine coolant, wherein said combustion chamber wall temperature control means includes a coolant temperature control system for varying the temperature of engine coolant in said engine coolant system to vary the temperature of said combustion chamber walls.

130. The engine of claim 128, wherein said combustion chamber wall temperature control means includes an electric heater mounted on said engine body adjacent said combustion chamber for heating said combustion chamber walls.

131. The engine of claim 120, wherein said cylinder combustion balancing means includes a glow plug mounted on said engine body adjacent said combustion chamber for heating the mixture of air and fuel in said combustion chamber.

132. The engine of claim 120, wherein said cylinder combustion balancing means includes an equivalence ratio varying means associated with each of said plurality of cylinders for varying an equivalence ratio in each of said plurality of cylinders to maintain combustion balance between said plurality of cylinders.

133. The engine of claim 120, wherein said cylinder combustion balancing means includes an in-cylinder temperature control means associated with each of said plurality of cylinders for controlling the temperature of the mixture in each combustion chamber, said in-cylinder temperature control means including a residual mass fraction control means for varying a residual mass fraction of combustion products remaining in each combustion chamber from one combustion event to a subsequent combustion event to maintain combustion balance between said plurality of cylinders.

134. A method for controlling a combustion history of future combustion events in a combustion chamber of an internal combustion engine operable in a premixed charge compression ignition mode, comprising:

detecting an engine operating condition indicative of the combustion history;

generating an engine operating condition signal indicative of said engine operating condition;

processing said engine operating condition signal and determining an actual combustion history value based on said engine operating condition signal;

generating at least one control signal based on said actual combustion history value;

providing a combustion history control system for controlling a combustion history of future combustion events in the combustion chamber to optimize engine operation, said combustion history control system including at least one of a temperature control system for ultimately varying the temperature of a mixture of fuel and air for combustion in the combustion chamber, a pressure control system for ultimately varying the pressure of the mixture, an equivalence ratio control system for varying an equivalence ratio of the mixture and a mixture autoignition property control system for varying an autoignition property of the mixture; and providing said at least one control signal to at least one of said temperature control system, said pressure control system, said equivalence ratio control system and said mixture autoignition property control system to variably control the combustion history of future combustion events to optimize engine operation.

135. The method of claim 134, further including the steps of comparing said actual combustion history value to a predetermined desired combustion history value and generating said at least one control signal based on the comparison of said actual combustion history value to said desired combustion history value, said at least one control signal controlling said at least one of said temperature control system, said pressure control system, said equivalence ratio control system and said mixture autoignition property control system to cause said actual combustion history value to approach said predetermined desired combustion history value.

136. The method of claim 134, further including a start of combustion sensor for sensing the start of combustion and generating a start of combustion signal, said actual combustion history value being determined based on said start of combustion signal.

137. The method of claim 136, further including the step of controlling said temperature control system to cause the start of combustion to occur earlier by increasing the temperature of the mixture.

138. The method of claim 137, further including the steps of providing a rotatable crankshaft and a piston operatively connected to said crankshaft for reciprocal movement through a top dead center position and controlling said temperature control system to cause the start of combustion to occur between 20 crank angle degrees before said top dead center position and 10 crank angle degrees after said top dead center position by varying the temperature of the mixture.

139. The method of claim 136, further including the step of controlling said pressure control system to cause the start of combustion to occur earlier by increasing the pressure of the mixture.

140. The method of claim 139, further including the steps of providing a rotatable crankshaft and a piston operatively connected to said crankshaft for reciprocal movement through a top dead center position and controlling said pressure control system to vary the pressure of the mixture to cause the start of combustion to occur between 20 crank angle degrees before said top dead center position and 10 crank angle degrees after said top dead center position.

141. The method of claim 136, further including the step of controlling said equivalence ratio control system to cause the start of combustion to occur earlier by increasing the equivalence ratio of the mixture.

142. The method of claim 141, further including the steps of providing a rotatable crankshaft and a piston operatively connected to said crankshaft for reciprocal movement through a top dead center position and controlling said equivalence ratio control system to vary the equivalence ratio of the mixture to cause the start of combustion to occur between 20 crank angle degrees before said top dead center position and 10 crank angle degrees after said top dead center position.

143. The method of claim 136, further including the step of controlling said mixture autoignition property control system to increase the autoignition property of the mixture in the combustion chamber to cause the start of combustion to occur earlier.

144. The method of claim 143, further including the steps of providing a rotatable crankshaft and a piston operatively connected to said crankshaft for reciprocal movement through a top dead center position and controlling said mixture autoignition property control system to vary the autoignition property of the mixture in the combustion chamber to cause the start of combustion to occur between 20 crank angle degrees before said top dead center position and 10 crank angle degrees after said top dead center position.

145. The method of claim 136, further including the step of controlling said equivalence ratio control system to decrease the equivalence ratio of the mixture to cause a duration of combustion to increase.

146. The method of claim 145, further including the steps of providing a rotatable crankshaft and a piston operatively connected to said crankshaft for reciprocal movement, and controlling said equivalence ratio control system to vary the equivalence ratio of the mixture to cause a duration of combustion to occur over a range of 5–30 crank angle degrees.

147. The method of claim 134, further including the steps of providing an engine body containing a plurality of combustion chambers, and variably adjusting operating conditions in one or more of said plurality of combustion chambers to cause said actual combustion history value associated with each of said plurality of combustion chambers to approach a desired combustion history value for balancing combustion between said plurality of combustion chambers.

148. The method of claim 147, further including the step of providing a fuel supply system for directing fuel into air for combustion in said plurality of combustion chambers and controlling said equivalence ratio control system to vary the quantity of fuel delivered to one or more of said plurality of combustion chambers to cause said actual combustion value associated with each of said plurality of combustion chambers to approach a desired combustion history value for balancing combustion between said plurality of combustion chambers.

149. The method of claim 147, further including an intake air system for supplying intake air to said plurality of combustion chambers, wherein the step of variably adjusting operating conditions includes a step of supplying a balancing fluid into one of said intake system and at least one of said plurality of combustion chambers to change the autoignition property of the mixture for said at least one of said plurality of combustion chambers to balance combustion between said plurality of combustion chambers.

150. The method of claim 149, wherein said balancing fluid includes ozone.

151. The method of claim 147, wherein said temperature control system includes a respective heater associated with each of said plurality of combustion chambers, wherein the step of variably adjusting operating conditions includes the step of controlling said heaters to vary the temperature of the mixture in the combustion chamber to balance combustion between said plurality of combustion chambers.

152. The method of claim 151, further including an intake air system for supplying intake air to said plurality of combustion chambers, said intake air system including a respective intake port associated with each of said plurality of combustion chambers, each of said heaters being positioned along a respective intake port for heating one of the mixture and a supply of intake air.

153. The method of claim 147, wherein said pressure control system includes a respective variable compression ratio control system associated with each of said plurality of combustion chambers, said step of variably adjusting operating conditions including variably controlling a compression ratio of each combustion chamber for balancing combustion between said plurality of combustion chambers.

154. The method of claim 147, wherein said temperature control system includes a respective glow plug associated with each of said plurality of combustion chambers, said step of variably adjusting operating conditions including variably controlling said respective glow plug to vary the temperature of the mixture in the respective combustion chamber for balancing combustion between said plurality of combustion chambers.

155. The method of claim 147, further including an engine body, an exhaust port formed in said engine body and an exhaust valve means for controlling the flow through said exhaust port in timed relation to a combustion event, wherein said temperature control system includes a residual mass fraction control means for varying a residual mass fraction of combustion products remaining in at least one of said plurality of combustion chambers from one combustion event to a subsequent combustion event, said step of variably adjusting operating conditions including controlling said residual mass fraction control means to vary the flow through said exhaust port by operating said exhaust valve means to vary the amount of said residual mass fraction in a respective combustion chamber to balance combustion events between said plurality of combustion chambers.

156. The method of claim 155, wherein said exhaust valve means includes an exhaust valve operable to open and close said exhaust port in timed relation to a combustion event, said step of variably adjusting operating conditions including controlling said residual mass fraction control means to vary the timing of closing of said exhaust port by said exhaust valve to vary the amount of said residual mass fraction in a respective combustion chamber to balance combustion events between said plurality of combustion chambers.

\* \* \* \* \*